(12) United States Patent
Park et al.

(10) Patent No.: US 11,856,556 B2
(45) Date of Patent: Dec. 26, 2023

(54) METHOD AND DEVICE FOR TRANSMITTING OR RECEIVING SIGNAL IN WIRELESS COMMUNICATION SYSTEM

(71) Applicant: LG ELECTRONICS INC., Seoul (KR)

(72) Inventors: Changhwan Park, Seoul (KR); Joonkui Ahn, Seoul (KR); Seonwook Kim, Seoul (KR); Sukhyon Yoon, Seoul (KR); Seunggye Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 507 days.

(21) Appl. No.: 17/266,810

(22) PCT Filed: Aug. 8, 2019

(86) PCT No.: PCT/KR2019/010007
§ 371 (c)(1),
(2) Date: Feb. 8, 2021

(87) PCT Pub. No.: WO2020/032646
PCT Pub. Date: Feb. 13, 2020

(65) Prior Publication Data
US 2021/0345293 A1    Nov. 4, 2021

Related U.S. Application Data

(60) Provisional application No. 62/755,334, filed on Nov. 2, 2018.

(30) Foreign Application Priority Data

Aug. 9, 2018  (KR) ........................ 10-2018-0093390
Sep. 21, 2018  (KR) ........................ 10-2018-0114503

(51) Int. Cl.
*H04W 68/02* (2009.01)
*H04W 4/90* (2018.01)
(Continued)

(52) U.S. Cl.
CPC ............... *H04W 68/02* (2013.01); *H04L 5/14* (2013.01); *H04W 4/90* (2018.02); *H04W 72/21* (2023.01);
(Continued)

(58) Field of Classification Search
CPC ....... H04W 68/02; H04W 4/90; H04W 72/21; H04W 72/23; H04W 74/0833;
(Continued)

(56) References Cited

U.S. PATENT DOCUMENTS

2016/0043849 A1   2/2016 Lee et al.
2017/0013391 A1*  1/2017 Rico Alvarino ...... H04W 76/28
(Continued)

FOREIGN PATENT DOCUMENTS

WO    2013115519 A1    8/2013
WO    2017043876 A1    3/2017

OTHER PUBLICATIONS

International Search Report from PCT/KR2019/010007, dated Nov. 27, 2019.
(Continued)

*Primary Examiner* — Shailendra Kumar
(74) *Attorney, Agent, or Firm* — BRYAN CAVE LEIGHTON PAISNER LLP

(57) ABSTRACT

The present disclosure relates to a method and device for receiving a paging signal in a radio resource control (RRC) connected mode. More specifically, the present disclosure relates to a method and a device therefor, the method comprising the steps of: receiving gap configuration information indicating a gap section in a search space; when a
(Continued)

first search space related to a data signal in a specific time interval and a second search space related to the paging signal are configured in different narrowbands (NBs), monitoring the second search space in the specific time interval, wherein the first search space is not monitored in the specific time interval on the basis of the gap section; and when the first search space and the second search space are configured in one NB in the specific time interval, monitoring the first search space and the second search space in the specific time interval without applying the gap section.

12 Claims, 27 Drawing Sheets

(51) Int. Cl.
*H04L 5/14* (2006.01)
*H04W 74/08* (2009.01)
*H04W 72/21* (2023.01)
*H04W 72/23* (2023.01)

(52) U.S. Cl.
CPC ....... *H04W 72/23* (2023.01); *H04W 74/0833* (2013.01)

(58) Field of Classification Search
CPC .......... H04W 8/22; H04W 24/10; H04L 5/14; H04L 5/0048; H04L 5/0053; H04L 5/0069; H04L 5/001; H04L 5/16; H04L 5/0012; H04L 5/0092; H04L 5/0023; H04L 5/0044; H04L 27/2601; H04B 7/08
See application file for complete search history.

(56) References Cited

U.S. PATENT DOCUMENTS

| | | | |
|---|---|---|---|
| 2018/0124644 A1* | 5/2018 | Rico Alvarino | H04W 52/0209 |
| 2021/0058909 A1* | 2/2021 | Wong | H04W 72/23 |
| 2021/0194638 A1* | 6/2021 | Beale | H04L 5/006 |
| 2022/0330312 A1* | 10/2022 | Zhou | H04L 1/1854 |

OTHER PUBLICATIONS

Written Opinion of the ISA from PCT/KR2019/010007, dated Nov. 27, 2019.
CATT, "Remaining details of NR PDCCH search space", 3GPP TSG RAN WG1 Meeting #93, May 21-25, 2018, R1-1806289.
Ericsson, "Remaining issues of search space", 3GPP TSG-RAN WG1 Meeting #93, May 21-25, 2018, R1-1807247.

* cited by examiner

METHOD AND DEVICE FOR TRANSMITTING OR RECEIVING SIGNAL IN WIRELESS COMMUNICATION SYSTEM

This application is the National Stage filing under 35 U.S.C. 371 of International Application No. PCT/KR2019/010007, filed on Aug. 8, 2019, which claims the benefit of U.S. Provisional Application No. 62/755,334, filed on Nov. 2, 2018, which claims priority to Korean Patent Application Nos. 10-2018-0093390, filed on Aug. 9, 2018 and 10-2018-0114503, filed Sep. 21, 2018, the contents of which are all hereby incorporated by reference herein in their entirety.

TECHNICAL FIELD

The present disclosure relates to a wireless communication system, and more particularly to a method for transmitting and receiving a signal or a channel according to user equipment (UE) types, and an apparatus for the same.

BACKGROUND ART

Mobile communication systems were developed to provide voice services while ensuring mobility of users. However, mobile communication systems have been extended to data services as well as voice services, and more advanced communication systems are needed as the explosive increase in traffic now leads to resource shortages and users demand higher speed services.

Requirements of the next generation mobile communication systems are to support accommodation of explosive data traffics, dramatic increases in throughputs per user, accommodation of significantly increased number of connected devices, very low end-to-end latency, and high energy efficiency. To this end, various technologies such as Dual Connectivity, massive multiple input multiple output (massive MIMO), in-band full duplex, non-orthogonal multiple access (NOMA), support of super wideband, and device networking are under research.

DISCLOSURE

Technical Problem

An object of the present disclosure is to provide a method for efficiently transmitting and receiving a signal according to UE types, and an apparatus for the same.

Another object of the present disclosure is to provide a method for efficiently transmitting and receiving a paging signal or a channel, and an apparatus for the same.

Another object of the present disclosure is to provide a method for efficiently mapping physical resources when a Channel Status Information Reference Signal (CSI-RS) is configured, and an apparatus for the same.

Still another object of the present disclosure is to provide a method for effectively configuring a Channel Status Information Reference Signal (CSI-RS) for a non-BL(Band reduced and Low cost) user equipment (UE) operating in a CE (coverage extension or enhancement) mode, and an apparatus for the same.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

In accordance with a first aspect of the present disclosure, a method for receiving a paging signal by a user equipment (UE) in a radio resource control (RRC) connected mode includes receiving gap configuration information indicating a gap period of a search space, when a first search space associated with a data signal and a second search space associated with the paging signal are configured in different narrowbands (NBs) in a specific time period, monitoring the second search space in the specific time period without monitoring the first search space in the specific time period based on the gap period, and when the first search space and the second search space are configured in one NB in the specific time period, monitoring the first search space and the second search space in the specific time period without consideration of the gap period.

In accordance with a second aspect of the present disclosure, a user equipment (UE) configured to receive a paging signal in a wireless communication system includes a radio frequency (RF) transceiver; and a processor operatively connected to the RF transceiver. The processor controls the RF transceiver to implement operations including receiving gap configuration information indicating a gap period of a search space by controlling the RF transceiver; when a first search space associated with a data signal and a second search space associated with the paging signal are configured in different narrowbands (NBs) in a specific time period, monitoring the second search space in the specific time period without monitoring the first search space in the specific time period based on the gap period, and when the first search space and the second search space are configured in one NB in the specific time period, monitoring the first search space and the second search space in the specific time period without consideration of the gap period.

In accordance with a third aspect of the present disclosure, an apparatus for a user equipment (UE) in a wireless communication system includes a memory including executable codes, and a processor operatively connected to the memory. The processor may perform specific operations by executing the executable codes. The specific operations may include receiving gap configuration information indicating a gap period of a search space; when a first search space associated with a data signal and a second search space associated with the paging signal are configured in different narrowbands (NBs) in a specific time period, monitoring the second search space in the specific time period without monitoring the first search space in the specific time period based on the gap period; and when the first search space and the second search space are configured in one NB in the specific time period, monitoring the first search space and the second search space in the specific time period without consideration of the gap period.

When the first search space and the second search space are configured in different NBs in the specific time period, the first search space may be postponed to a time period in which the second search space is not configured based on the gap period.

When a time period of the second search space overlaps with a time period of physical downlink control channel (PDSCH) reception, the second search space may not be monitored in the overlapped time period.

When the UE operates in a half-duplex frequency division duplex (HD-FDD) and a time period of the second search space overlaps with a time period of physical uplink shared channel (PUSCH) transmission, the second search space may not be monitored in the overlapped time period.

When the UE operates in a half-duplex frequency division duplex (HD-FDD) and a time period of the second search space overlaps with a time period of physical random access channel (PRACH) transmission, the second search space may not be monitored in the overlapped time period.

When the UE operates in a half-duplex frequency division duplex (HD-FDD) and a time period of the second search space overlaps with a time period of PUCCH (physical uplink control channel) transmission, the second search space may not be monitored in the overlapped time period.

The first search space may be a UE-specific search space (USS), and the second search space may be a common search space (CSS).

The paging signal may include earthquake and tsunami warning system (ETWS) information or commercial mobile alert system (CMAS) information.

The UE may be configured to operate in a coverage extension (CE) mode.

Advantageous Effects

As is apparent from the above description, the embodiments of the present disclosure provide a method for efficiently transmitting and receiving a signal according to UE types, and an apparatus for the same.

The embodiments of the present disclosure can efficiently transmit and receive a paging signal or a channel.

The embodiments of the present disclosure can efficiently perform mapping of physical resources when a channel status information reference signal (CSI-RS) is configured.

The embodiments of the present disclosure can efficiently configure the CSI-RS for a non-BL(B and reduced and Low cost) UE operating in a CE (coverage extension or enhancement) mode.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the disclosure, provide embodiments of the present disclosure together with detail explanation. Yet, a technical characteristic of the present disclosure is not limited to a specific drawing. Characteristics disclosed in each of the drawings are combined with each other to configure a new embodiment. Reference numerals in each drawing correspond to structural elements.

BEST MODE

In the following description, downlink (DL) refers to communication from a base station (BS) to a user equipment (UE), and uplink (UL) refers to communication from the UE to the BS. In the case of DL, a transmitter may be a part of the BS, and a receiver may be a part of the UE. In the case of UL, a transmitter may be a part of the UE, and a receiver may be a part of the BS.

The technology described herein is applicable to various wireless access systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented as radio technology such as universal terrestrial radio access (UTRA) or CDMA2000. The TDMA may be implemented as radio technology such as global system for mobile communications (GSM), general packet radio service (GPRS), or enhanced data rates for GSM evolution (EDGE). The OFDMA may be implemented as radio technology such as the Institute of Electrical and Electronics Engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). The 3rd generation partnership project (3GPP) long term evolution (LTE) is a part of an evolved UMTS (E-UMTS) using the E-UTRA. LTE-advance (LTE-A) or LTE-A pro is an evolved version of the 3GPP LTE.

3GPP new radio or new radio access technology (3GPP NR) or 5G is an evolved version of the 3GPP LTE, LTE-A, or LTE-A pro.

Although the present disclosure is described based on 3GPP communication systems (e.g., LTE-A, NR, etc.) for clarity of description, the spirit of the present disclosure is not limited thereto. The LTE refers to the technology beyond 3GPP technical specification (TS) 36.xxx Release 8. In particular, the LTE technology beyond 3GPP TS 36.xxx Release 10 is referred to as the LTE-A, and the LTE technology beyond 3GPP TS 36.xxx Release 13 is referred to as the LTE-A pro. The 3GPP 5G means the technology beyond TS 36.xxx Release 15 and 3GPP NR refers to the technology beyond 3GPP TS 38.xxx Release 15. The LTE/NR may be called '3GPP system'. Herein, "xxx" refers to a standard specification number. The LTE/NR may be commonly referred to as '3GPP system'. Details of the background, terminology, abbreviations, etc. used herein may be found in documents published before the present disclosure. For example, the following documents may be referenced.

Figure 1:
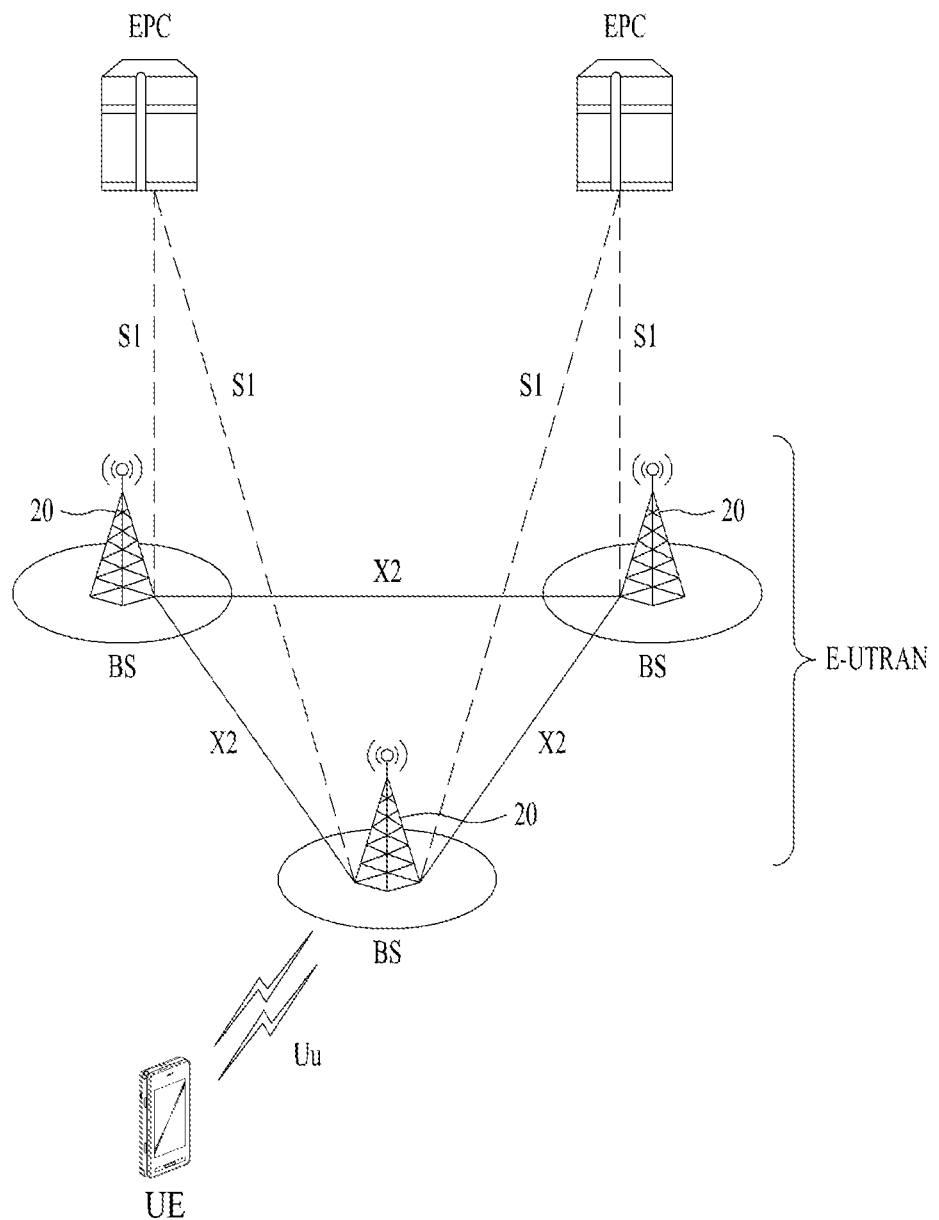
FIG. 1 is a diagram illustrating an example of a 3GPP LTE system structure.

3GPP LTE
  36.211: Physical channels and modulation
  36.212: Multiplexing and channel coding
  36.213: Physical layer procedures
  36.300: Overall description
  36.304: User Equipment (UE) procedures in idle mode
  36.331: Radio Resource Control (RRC)
3GPP NR
  38.211: Physical channels and modulation
  38.212: Multiplexing and channel coding
  38.213: Physical layer procedures for control
  38.214: Physical layer procedures for data
  38.300: NR and NG-RAN Overall Description
  38.304: User Equipment (UE) procedures in Idle mode and RRC Inactive state
  36.331: Radio Resource Control (RRC) protocol specification A. System Architecture FIG. 1 illustrates an example of the 3GPP LTE system architecture.

E-UTRAN (evolved-UMTS terrestrial radio access network) or LTE (long term evolution)/LTE-A/LTE-A Pro/5G system may be generically named an LTE system. Referring to FIG. 1, E-UTRAN includes at least one base station (BS) for providing a control plane to the user equipment (UE) 10. The UE 10 may be a fixed or mobile user equipment (UE), and may be referred to as a Mobile Station (MS), User Terminal (UT), Subscriber Station (SS), Mobile Terminal (MT), or wireless device. The BS 20 may be a fixed station communicating with the UE 10, and may be referred to as an evolved Node-B (eNB), a general Node-B (gNB), a base transceiver system (BTS), an access point (AP), etc. The BSs may be interconnected through an X2 interface. The BSs may be connected to an evolved packet core (EPC) through an S1 interface. In more detail, the BSs may be connected to a mobility management entity (MME) through an S1-MME, and may be connected to a serving gateway (S-GW) through S1-U. EPC may include an MME, an S-GW, and a packet data network-gateway (P-GW). Radio interface protocol layers between the UE and the network can be classified into a first layer L1, a second layer L2, and a third layer L3 based on the lower three layers of the well-known Open Systems Interconnection (OSI) model in the communication system. A physical (or PHY) layer belongs to the first layer and provides an information transmission service through a physical channel. A Radio Resource Control (RRC) layer belongs to the third layer and provides control radio resources between the UE and the network. The UE and the network exchange RRC messages through the RRC layer.

Figure 2:
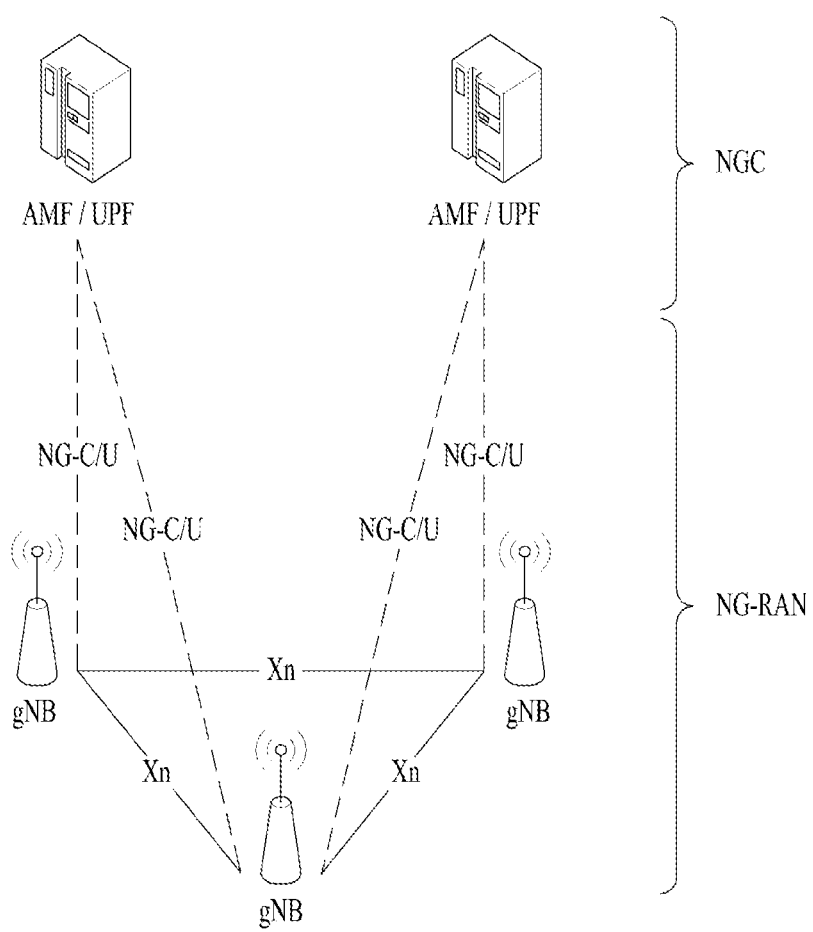
FIG. 2 is a diagram illustrating an example of a 3GPP NR system structure.

FIG. 2 illustrates an example of the 3GPP NR system architecture.

Referring to FIG. 2, a NG-RAN includes gNBs, each of which provides a NG-RA user plane (e.g., new AS sublayer/PDCP/RLC/MAC/PHY) and a control plane (RRC) protocol terminal to a UE. The gNBs are interconnected through an Xn interface. The gNB is connected to an NGC through a NG interface. More particularly, the gNB is connected to an access and mobility management function through an N2 interface and to a user plane function (UPF) through an N3 interface.

B. Frame Structures

Figure 3:
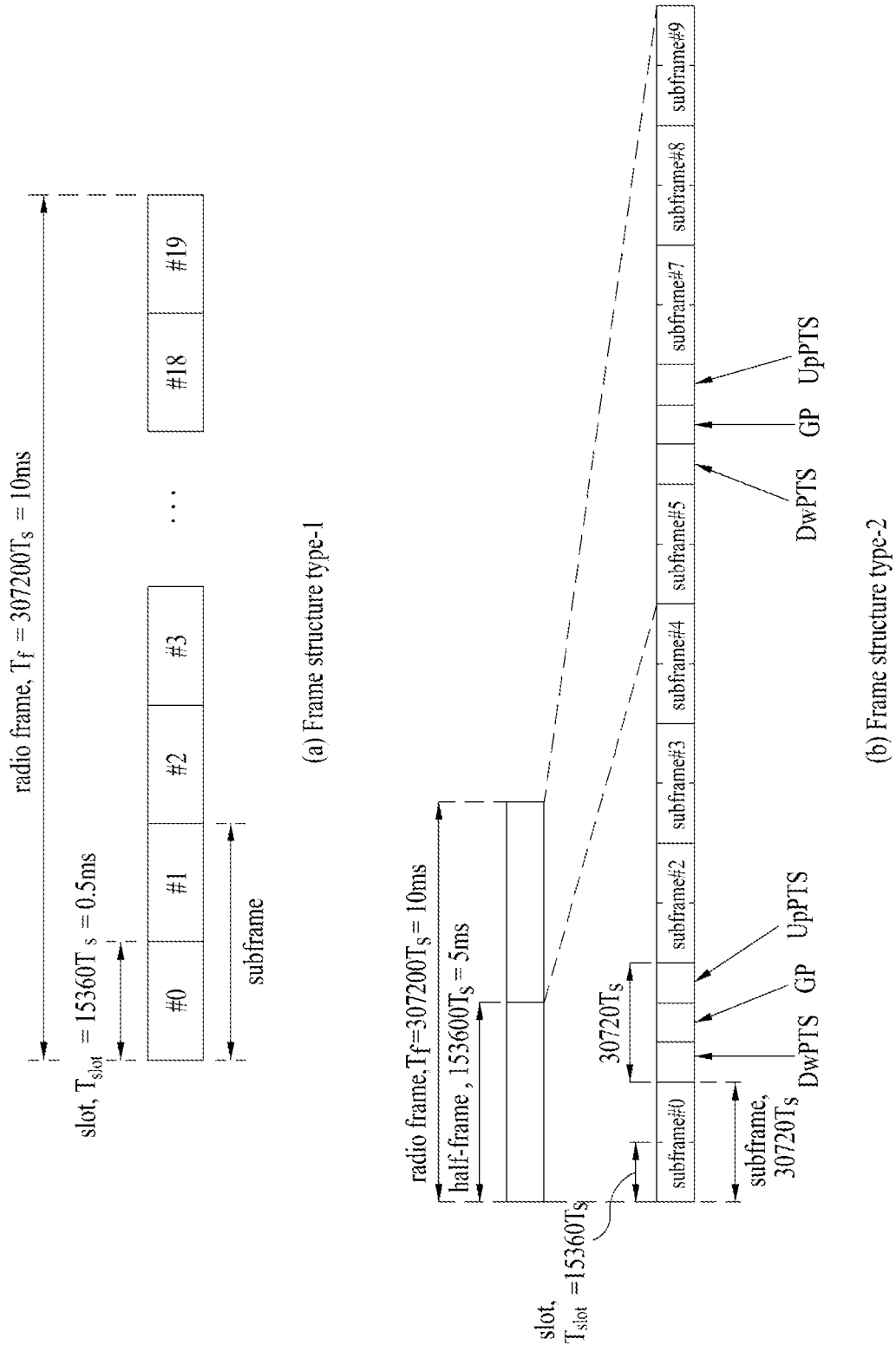
FIG. 3 is a diagram illustrating long term evolution(-advanced) (LTE-(A)) radio frame structures.

FIG. 3 illustrates radio frame structures in an LTE(-A) system. In a cellular OFDM wireless packet communication system, UL/DL data packet transmission may be achieved on a subframe (SF) basis, and the subframe may be defined as a predetermined time section including a plurality of OFDM symbols. The LTE(-A) system supports a type-1 radio frame structure for frequency division duplex (FDD) and a type-2 radio frame structure for time division duplex (TDD).

[75] FIG. 3(*a*) illustrates the type-1 radio frame structure. A DL radio frame is defined by 10 1-ms subframes. A subframe includes 2 slots in the time domain. A time taken to transmit one subframe is referred to as a transmission time interval (TTI). For example, one subframe may be 1 ms in duration, and one slot may be 0.5 ms in duration. One slot includes a plurality of OFDM symbols in the time domain by a plurality of resource blocks (RBs) in the frequency domain. Because the LTE(-A) system adopts OFDM for DL, one OFDM symbol represents one symbol interval. The LTE(-A) system adopts SC-FDMA for UL and thus an OFDM symbol may also be referred to as an SC-FDMA symbol. Further, an OFDM symbol may be generically called a symbol interval. An RB as a resource allocation unit may include a plurality of consecutive subcarriers in one slot.

FIG. 3(*b*) illustrates the type-2 radio frame structure. The type-2 radio frame includes two half frames, each half frame including five subframes. Each subframe includes a DL period (e.g., downlink pilot time slot (DwPTS)), a guard period (GP), a UL period (e.g., uplink pilot time slot (UpPTS)). One subframe includes two slots. For example, the DL period (e.g., DwPTS) is used for initial cell search, synchronization, or channel estimation at a UE. For example, the UL period (e.g., UpPTS) is used for channel estimation and UL synchronization with a UE at a BS. For example, a sounding reference signal (SRS) for channel estimation and a physical random access channel (PRACH) carrying a random access preamble for acquisition of UL transmission synchronization at the BS may be transmitted during the UL period (e.g., UpPTS). The GP is a period for canceling interference with the UL, caused by the multipath delay of a DL signal between the UL and the DL.

The radio frame structures described above are for illustrative purposes only, and the number of subframes in a radio frame, the number of slots in a subframe, and the number of symbols in a slot may vary.

Figure 4:
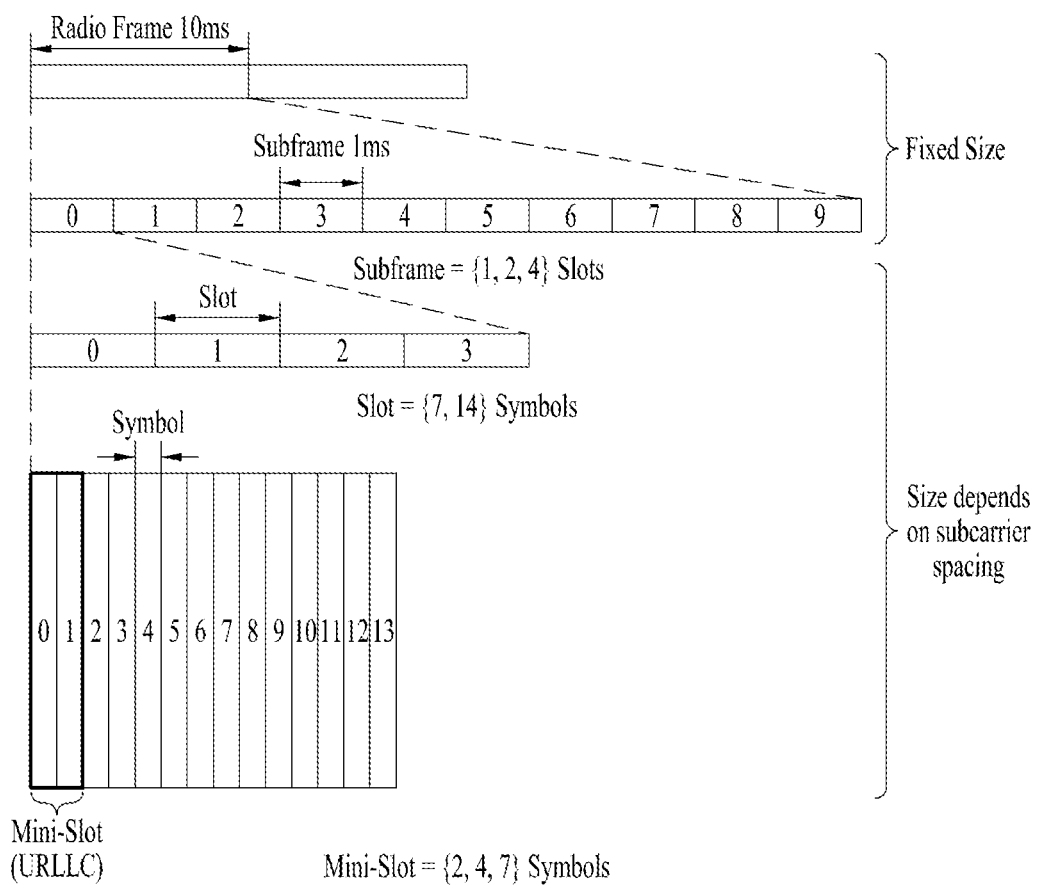
FIG. 4 is a diagram illustrating a radio frame structure in new radio access technology (NR).

FIG. 4 is a diagram illustrating a frame structure in NR.

The NR system may support multiple numerologies. A numerology may be defined by a subcarrier spacing (SCS) and a cyclic prefix (CP) overhead. Multiple SCSs may be derived by scaling a default SCS by an integer N (or p). Further, even though it is assumed that a very small SCS is not used in a very high carrier frequency, a numerology to be used may be selected independently of a frequency band. Further, the NR system may support various frame structures according to multiple numerologies.

Now, a description will be given of OFDM numerologies and frame structures which may be considered for the NR system. Multiple OFDM numerologies supported by the NR system may be defined as listed in Table 1.

TABLE 1

| μ | $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Regarding a frame structure in the NR system, the time-domain sizes of various fields are represented as multiples of a basic time unit, $T_s=1/(\Delta f_{max} \cdot N_f)$ where $\Delta f_{max}=480 \cdot 10^3$ and $N_f=4096$. DL and UL transmissions are organized into radio frames each having a duration of $T_r=(\Delta f_{max} N_f/100) \cdot T_s=10$ ms. Each radio frame includes 10 subframes each having a duration of $T_{sf}=(\Delta f_{max} N_f/1000) \cdot T_s=1$ ms. In this case, there may exist one set of frames for UL and one set of frames for DL. Further, transmission of UL frame #i from the UE should state a time $T_{TA}=N_{TA}T_s$ before the start of a corresponding DL frame. For a numerology μ, slots are numbered with $n_s^\mu \in \{0, \ldots, N_{subframe}^{slots,\mu}-1\}$ in an increasing order in a subframe, and with $n_{s,f}^\mu \in \{0, \ldots, N_{frame}^{slots,\mu}-1\}$ in an increasing order in a radio frame. One slot includes $N_{symb}^\mu$ consecutive OFDM symbols, and $N_{symb}^\mu b$ depends on a used numerology and slot configuration. The start of a slot $n_s^\mu$ in a subframe is aligned in time with the start of an OFDM symbol $n_s^\mu N_{symb}^\mu$ in the same subframe. All UEs are not capable of simultaneous transmission and reception, which implies that all OFDM symbols of a DL slot or a UL slot may not be used. Table 2 lists the number $N_{symb}^{slot}$ of symbols per slot, the number $N_{slot}^{frame,\mu}$ of slots per frame, and the number $N_{slot}^{subframe,\mu}$ of slots per subframe, for each SCS in a normal CP case, and Table 3 lists the number of symbols per slot, the number of slots per frame, and the number of slots per subframe, for each SCS in an extended CP case.

TABLE 2

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 4 illustrates an example with μ=2, that is, an SCS of 60 kHz, in which referring to Table 2 one subframe may include four slots. One subframe={1, 2, 4} slots in FIG. 2 which is exemplary, and the number of slot(s) which may be included in one subframe is defined as listed in Table 2.

Further, a mini-slot may include 2, 4 or 7 symbols, fewer symbols than 2, or more symbols than 7.

C. Physical Resources

Figure 5:
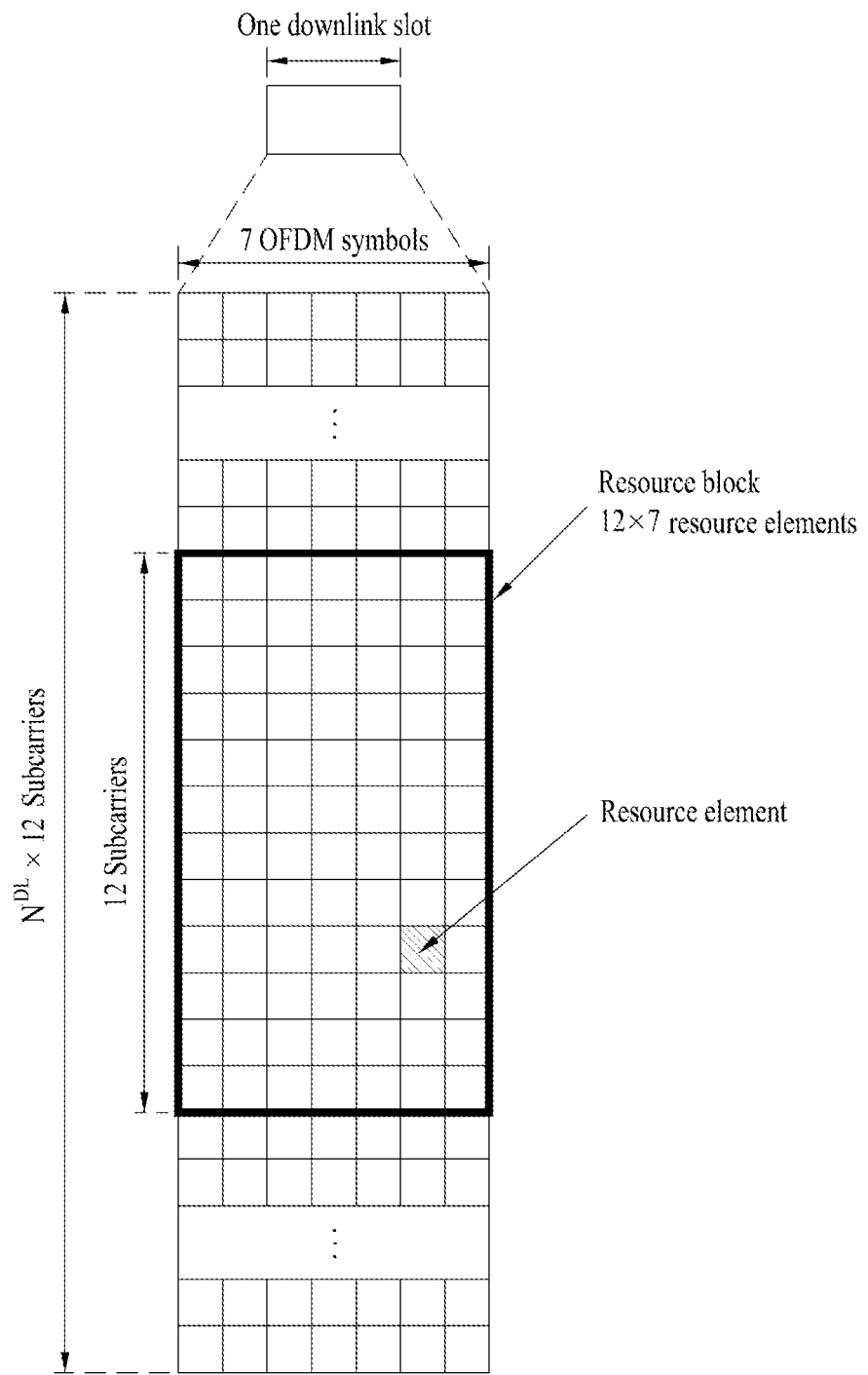
FIG. 5 is a diagram illustrating a resource grid during one downlink slot.

FIG. 5 illustrates a resource grid for the duration of one DL slot.

In FIG. 5, a DL slot includes a plurality of OFDM symbols in the time domain. One DL slot includes 7 OFDM symbols, and an RB includes, for example, 12 subcarriers in the frequency domain, which does not limit the present disclosure. Each element of the resource grid is referred to as a resource element (RE). An RB includes 12×7 REs. The number of RBs in a DL slot, NDL depends on a DL transmission bandwidth. A UL slot may have the same structure as a DL slot.

Figure 6:
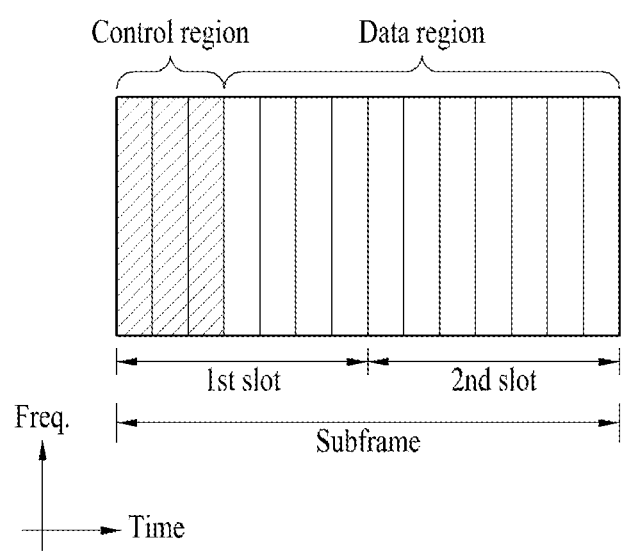
FIG. 6 is a diagram illustrating a downlink (DL) subframe structure.

FIG. 6 is a downlink subframe structure.

Referring to FIG. 6, a maximum of three OFDM symbols located in the front part of a first slot of the subframe may correspond to a control region to which a control channel is allocated. The remaining OFDM symbols correspond to a data region to which a Physical Downlink Shared CHannel (PDSCH) is allocated. A variety of downlink control channels may be used in 3GPP LTE, for example, a Physical Control Format Indicator Channel (PCFICH), a Physical Downlink Control Channel (PDCCH), a Physical hybrid ARQ indicator Channel (PHICH), etc. PCFICH carries information about the number of OFDM symbols used to transmit a control channel of a first OFDM subframe. PHICH carries a Hybrid Automatic Repeat request acknowledgment/negative-acknowledgment (HARQ ACK/NACK) signal as a response to an uplink transmission signal. Control information transmitted over a PDCCH is referred to as Downlink Control Information (DCI). DCI includes UL or DL scheduling information, or includes a UL transmission (Tx) power control command for an arbitrary UE group. PDCCH carries a variety of information, for example, resource allocation information of a downlink shared channel (DL-SCH), resource allocation information of an uplink shared channel (UL-SCH), paging information of a paging channel (PCH), a random access response transmitted over PDSCH, a set of Tx power control commands of each UE contained in a UE group, a Tx power control command, and a DL-SCH Voice over IP (VoIP) indicating resource allocation of a higher layer control message such as activation of the Tx power control command A plurality of PDCCHs may be transmitted within a control region. The UE can monitor a plurality of PDCCHs. A PDCCH is transmitted as an aggregation of one or more contiguous control channel elements (CCEs). A CCE is a logical allocation unit that is used to provide a coding rate based on a radio channel state to a PDCCH. CCE may correspond to a plurality of resource element groups (REGs). The format of PDCCH and the number of PDCCH bits may be determined according to correlation between the number of CCEs and the coding rate provided by the CCE. The BS decides a PDCCH format according to DCI to be sent to the UE, and adds a Cyclic Redundancy Check (CRC) to control information. The CRC is masked with a unique identifier (e.g., Radio Network Temporary Identifier (RNTI)) according to a PDCCH owner or a purpose of the PDCCH. For example, provided that the PDCCH is provided for a specific UE, a unique identifier of the UE (e.g., cell-RNTI (C-RNTI)) may be masked with the CRC. Alternatively, if PDCCH is provided for a paging message, a paging identifier (e.g., paging-RNTI (P-RNTI)) may be masked with a CRC. If PDCCH is provided for system information (e.g., system information block (SIB)), a system information identifier and system information RNTI (SI-RNTI) may be masked with CRC. If PDCCH is provided for a random access response indicating a response to random access preamble transmission of the UE, random access-RNTI (RA-RNTI) may be masked with CRC.

Figure 7:
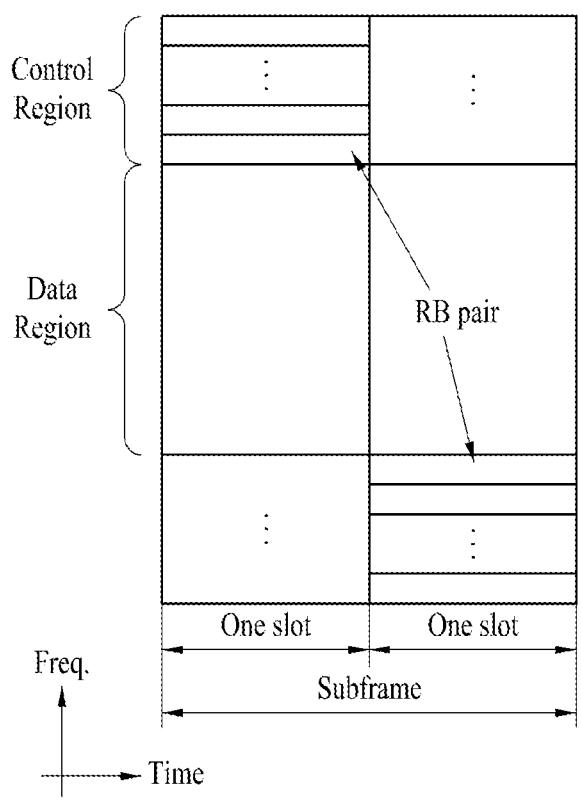
FIG. 7 is a diagram illustrating an uplink (UL) subframe structure.

FIG. 7 is a diagram illustrating an uplink (UL) subframe structure.

Referring to FIG. 7, an uplink (UL) subframe may be divided into a control region and a data region in a frequency domain. The control region may be assigned to a Physical Uplink Control Channel (PUCCH) carrying uplink control information (UCI). The data region may be assigned to a Physical Uplink Shared Channel (PUSCH) carrying user data. In order to maintain single carrier characteristics, one UE does not simultaneously transmit PUCCH and PUSCH. PUCCH for one UE may be assigned to a Resource Block (RB) pair in one subframe. RBs of the RB pair occupy different subcarriers in two slots. The RB pair assigned to PUCCH performs frequency hopping at a slot boundary.

In association with physical resources in the NR system, an antenna port, a resource grid, a resource element, a resource block, a carrier part, etc. can be considered. Hereinafter, the physical resources considerable in the NR system will be discussed. In association with the antenna port, the antenna port is defined such that the channel through which the symbol on the antenna port is transmitted can be inferred from the channel carried by another symbol on the same antenna port. With regard to two antenna ports, for example, if a large-scale property of a radio channel on which a symbol is transmitted through one of the antenna ports can be inferred from a radio channel on which a symbol is transmitted through the other antenna port, then the two antenna ports can be considered quasi-co-located. The large-scale property includes at least one of delay spread, Doppler spread, frequency shift, average received power, and received timing.

Figure 8:
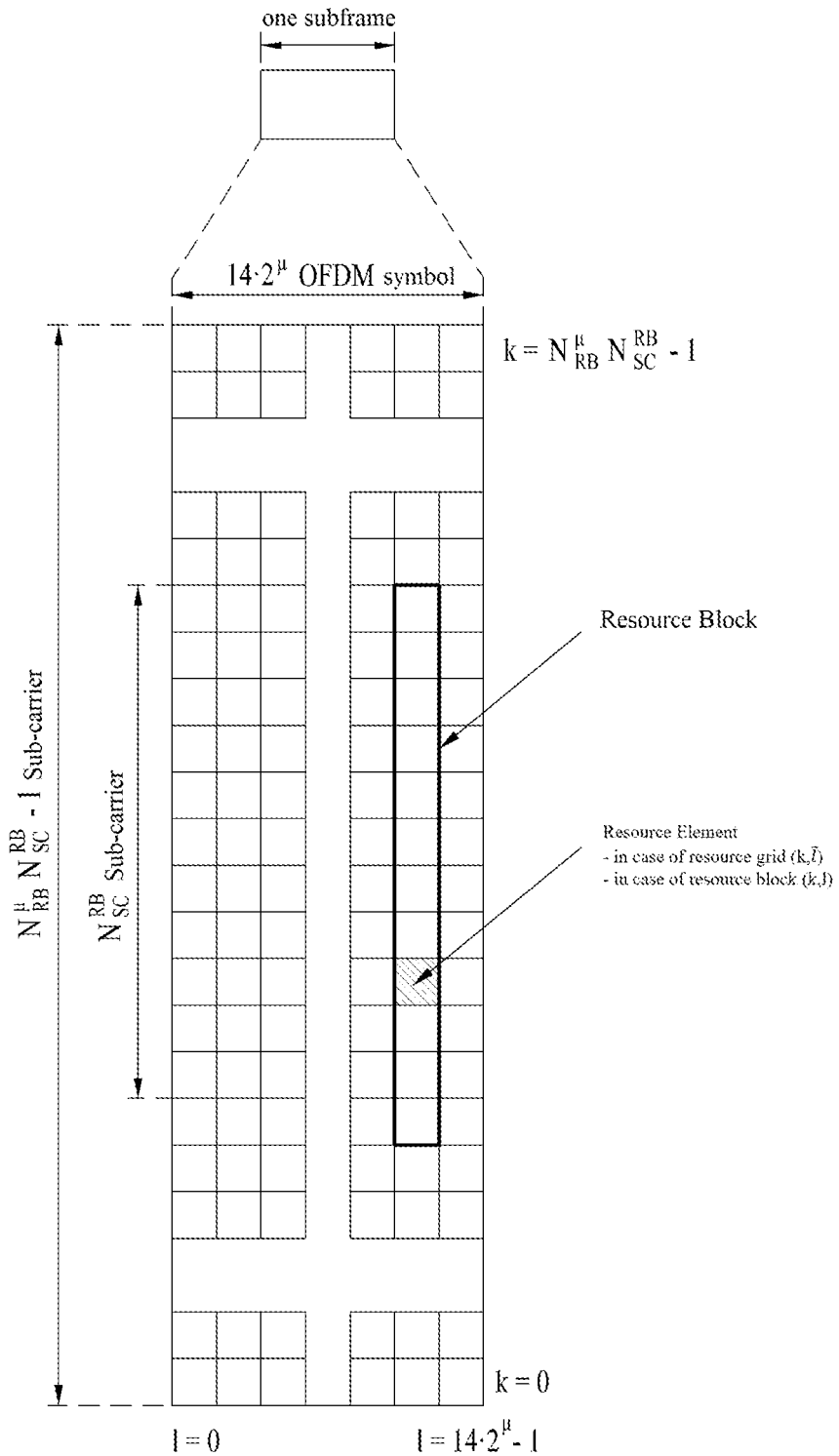
FIG. 8 is a diagram illustrating a resource grid in NR.

FIG. 8 illustrates a resource grid in the NR system.

Referring to FIG. 8, a resource grid includes $N_{RB}^{\mu} N_{sc}^{RB}$ subcarriers in the time domain, and one subframe $14 \cdot 2\mu$ OFDM symbols, which is exemplary and thus should not be construed as limiting the disclosure. In the NR system, a transmitted signal is described by one or more resource grids including $N_{RB}^{\mu} N_{sc}^{RB}$ subcarriers and $2^{\mu} N_{symb}^{(\mu)}$ OFDM symbols, where $N_{RB}^{\mu} \leq N_{RB}^{max,\mu}$. $N_{RB}^{max,\mu}$ represents a maximum transmission bandwidth, which may be different for UL and DL as well as according to numerologies. In this case, one resource grid may be configured for each neurology $\mu$ and each antenna port p, as illustrated in FIG. 4. Each element of the resource grid for the numerology $\mu$ and the antenna port p is referred to as an RE, which is uniquely identified by an index pair (k,l) where k=0, ..., $N_{RB}^{\mu} N_{sc}^{RB}-1$ is a frequency-domain index and l=0, ..., $2^{\mu} N_{symb}^{(\mu)}-1$ indicates the position of a symbol in a subframe. An RE in a slot is indicated by an index pair (k,l) where l=0, ..., $N_{symb}^{\mu}-1$. An RE (k,l) for the numerology $\mu$ and the antenna port p corresponds to a complex value $a_{k,l}^{(p,\mu)}$. When there is no risk of confusion or a specific antenna port or a numerology is not specified, the indexes p and $\mu$ may be dropped, and as a result, the complex value may be $a_{k,l}^{(p)}$ or $a_{k,l}$. In addition, an RB is defined as $N_{sc}^{RB}=12$ consecutive subcarriers in the frequency domain.

The point A serves as a common reference point of the resource block grid and is obtained as follows.

"offsetToPointA" for PCell (primary cell) downlink may indicate a frequency offset between the Point A and the lowest subcarrier of the lowest resource block overlapping with an SS/PBCH block used by the UE for initial cell selection. The offsetToPointA for PCell DL may be denoted by resource block units on the assumption of 15 kHz subcarrier spacing for FR1 (frequency range 1) and 60 kHz subcarrier spacing for FR2 (frequency range 2).

"absoluteFrequencyPointA" may indicate a frequency-position of the Point A represented as in an absolute radio-frequency channel number (ARFCN)

Common resource blocks are numbered in an upward direction from 0 in the frequency domain about the subcarrier spacing setting $\mu$.

The center point of the subcarrier 0 of the common resource block 0 about the subcarrier spacing setting $\mu$ may be consistent with the Point A.

The resource element (k,l) about the common resource block number $n_{CRB}^{\mu}$ and the subcarrier spacing setting $\mu$ in the frequency are denoted by Equation 1.

$$n_{CRB}^{\mu} = \left\lfloor \frac{k}{N_{sc}^{RB}} \right\rfloor \qquad \text{[Equation 1]}$$

Here, k is defined relative to the point A such that k=0 corresponds to the subcarrier centered at the point A.

Physical resource blocks are numbered from 0 to $N_{BWP,i}^{size}-1$ in a bandwidth part (BWP), and 'i' is the number of the bandwidth part (BWP).

The relationship between the physical resource block $n_{PRB}$ and the common resource block $n_{CRB}$ in the BWP (i) is represented by the following equation 2.

$$n_{CRB} = n_{PRB} + N_{BWP,i}^{start} \qquad \text{[Equation 2]}$$

$N_{BWP,i}^{start}$ is a common resource block from which the BWP starts relative to the common resource block 0.

Figure 9:
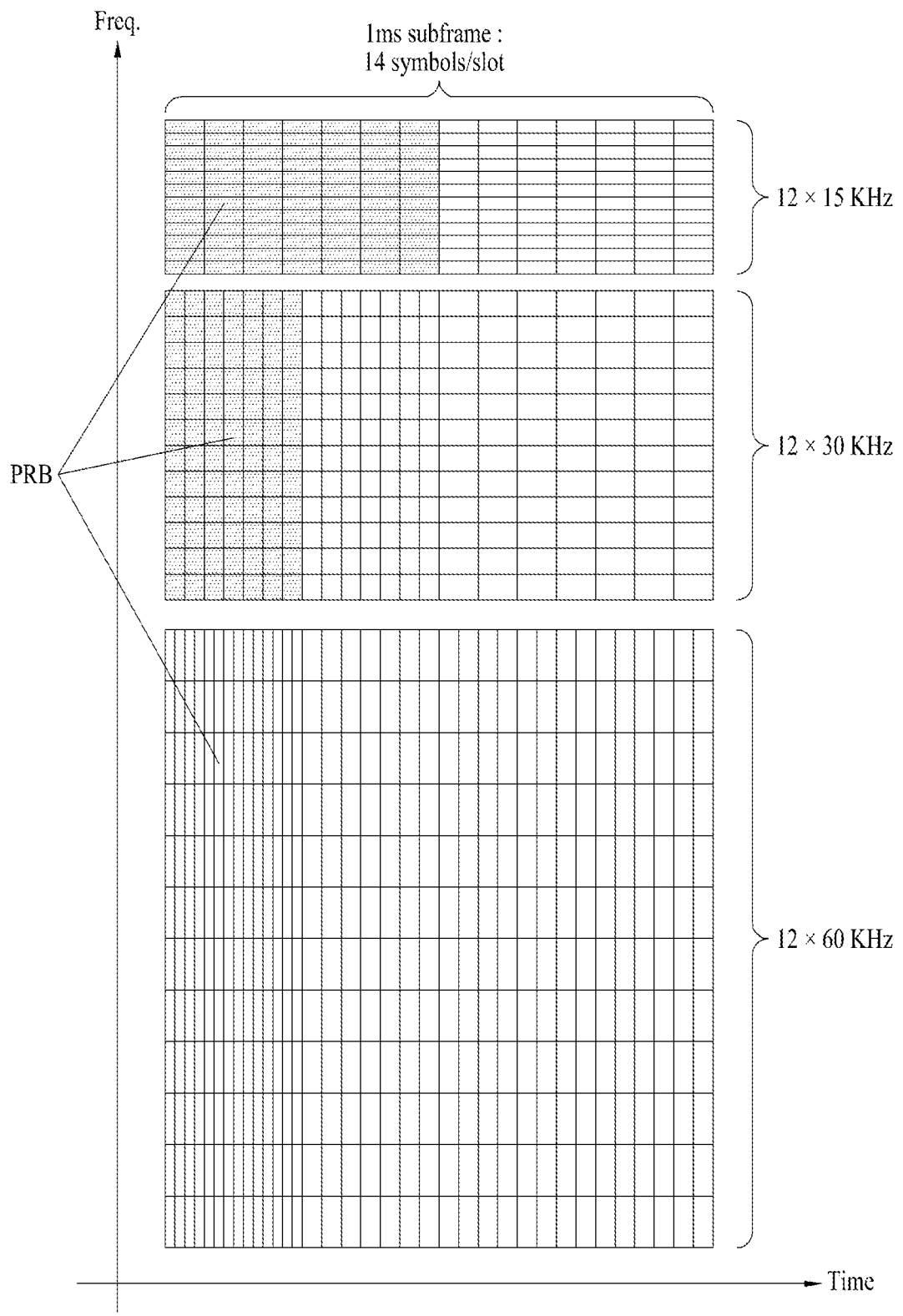
FIG. 9 is a diagram illustrating physical resource blocks (PRBs) in NR.

FIG. 9 illustrates exemplary physical resource blocks (PRBs) in NR.

D. Machine Type Communication (MTC)

MTC is an application that does not require a lot of throughput, applicable to machine-to-machine (M2M) or Internet of things (IoT). MTC is also a communication technology adopted to meet the requirements of IoT service in the 3GPP.

MTC may be implemented to satisfy (i) low cost and low complexity, (ii) enhanced coverage, and (iii) low power consumption.

While the following description will be given mainly in the context of enhanced MTC (eMTC) features, the same thing may be applied to MTC, eMTC, and MTC applied to 5G (or NR) unless otherwise specified. For the convenience of description, MTC, eMTC, and MTC applied to 5G (or NR) will be generically referred to as MTC.

Therefore, MTC to be described later may be replaced with other terms such as eMTC, LTE-M1/M2, bandwidth reduced low complexity (BL)/coverage enhanced (CE), non-BL UE (in enhanced coverage), NR MTC, enhanced BL/CE, and so on. That is, the term MTC may be replaced with a term to be defined in the future 3GPP standard.

Overview of MTC (1) MTC operates only in a specific system bandwidth (or channel bandwidth).

A specific system bandwidth may use 6 RBs of the legacy LTE as shown in the following Table 4. The specific system bandwidth may be defined in consideration of the frequency range and the subcarrier spacing (SCS) of the NR system defined in Tables 5 to 7. The specific system bandwidth may be represented as a narrowband (NB). For reference, legacy LTE refers to a part described in the 3GPP standards other than MTC. Preferably, MTC may operate in RBs corresponding to the lowest system bandwidth in Table 6 and Table 7 below in NR, as in legacy LTE. Alternatively, MTC may operate in at least one bandwidth part (BWP) or in a specific band of the BWP in NR.

TABLE 4

| | Channel bandwidth BWChannel [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

Table 5 lists frequency ranges (FRs) defined in NR.

TABLE 5

| Frequency range designation | Corresponding frequency range |
|---|---|
| FR1 | 450 MHz-6000 MHz |
| FR2 | 24250 MHz-52600 MHz |

Table 6 illustrates an exemplary maximum transmission bandwidth configuration (NRB) for channel bandwidths and SCSs in FR1 of NR.

TABLE 6

| SCS (kHz) | 5 MHz NRB | 10 MHz NRB | 15 MHz NRB | 20 MHz NRB | 25 MHz NRB | 30 MHz NRB | 40 MHz NRB | 50 MHz NRB | 60 MHz NRB | 80 MHz NRB | 90 MHz NRB | 100 MHz NRB |
|---|---|---|---|---|---|---|---|---|---|---|---|---|
| 15 | 25 | 52 | 79 | 106 | 133 | 160 | 216 | 270 | N/A | N/A | N/A | N/A |
| 30 | 11 | 24 | 38 | 51 | 65 | 78 | 106 | 133 | 162 | 217 | 245 | 273 |
| 60 | N/A | 11 | 18 | 24 | 31 | 38 | 51 | 65 | 79 | 107 | 121 | 135 |

Table 7 illustrates an exemplary maximum transmission bandwidth configuration (NRB) for channel bandwidths and SCSs in FR2 of NR.

TABLE 7

| SCS (kHz) | 50 MHz NRB | 100 MHz NRB | 200 MHz NRB | 400 MHz NRB |
|---|---|---|---|---|
| 60 | 66 | 132 | 264 | N.A |
| 120 | 32 | 66 | 132 | 264 |

An MTC NB will be described in more detail.

MTC follows an NB operation to transmit and receive physical channels and signals, and the maximum channel bandwidth is reduced to 1.08 MHz or 6 (LTE) RBs.

The NB may be used as a reference unit for a resource allocation unit of some DL and UL channels, and the physical position of each NB in the frequency domain may be defined differently according to a system bandwidth.

The bandwidth of 1.08 MHz is defined for MTC to enable an MTC UE to follow the same cell search and random access procedure as used for a legacy UE.

Although MTC may be supported by a cell with a much larger bandwidth (e.g. 10 MHz) than 1.08 MHz, physical channels and signals transmitted/received by MTC are always limited to 1.08 MHz.

The system with a much larger bandwidth may be the legacy LTE system, the NR system, the 5G system, or the like.

An NB is defined as 6 non-overlapping consecutive PRBs in the frequency domain. If $N_{NB}^{UL} \geq 4$, a wideband is defined as 4 non-overlapping NBs in the frequency domain.

If $N_{NB}^{UL} < 4$, $N_{WB}^{UL} = 1$ and a single wideband includes $N_{NB}^{UL}$ non-overlapping NB(s).

For example, in the case of a 10-MHz channel (50 RBs), a single wideband is defined as 8 non-overlapping NBs.

Figure 10:
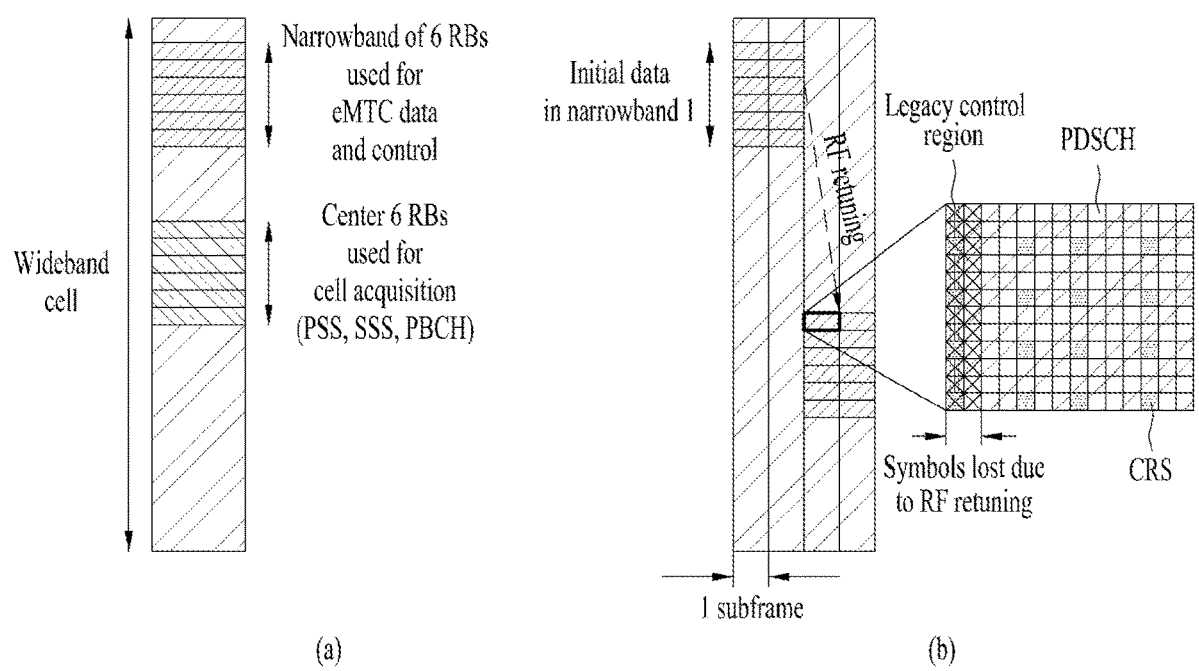
FIG. 10 is a diagram illustrating an example of narrowband operation and frequency diversity.

FIG. 10 is a diagram illustrating an example of a narrowband operation and frequency diversity.

FIG. 10(a) is a diagram illustrating an example of a narrowband operation, and FIG. 10(b) is a diagram illustrating an example of repetition having RF retuning.

The frequency diversity based on RF retuning will hereinafter be described with reference to FIG. 10(b).

The MTC supports limited frequency, spatial, and time diversity due to the narrowband RF, single antenna, and limited mobility. To reduce the effects of fading and outages, frequency hopping is supported between different narrowbands by the RF retuning.

The frequency hopping is applied to different uplink and downlink physical channels when repetition is enabled.

For example, if 32 subframes are used for PDSCH transmission, the first 16 subframes may be transmitted on the first narrowband. In this case, the RF front-end is retuned to another narrowband, and the remaining 16 subframes are transmitted on the second narrowband.

The MTC narrowband may be configured by system information or DCI.

(2) MTC operates in a half-duplex mode and uses limited (or reduced) maximum transmission power.

(3) MTC does not use a channel that should be distributed over the entire system bandwidth of legacy LTE or NR (defined in legacy LTE or NR).

For example, legacy LTE channels which are not used for MTC are the PCFICH, the PHICH, and the PDCCH.

Accordingly, these channels may not be monitored and thus a new control channel, MTC PDCCH (MPDCCH) is defined in MTC.

The MPDCCH spans up to 6 RBs in the frequency domain and one subframe in the time domain.

The MPDCCH is similar to the enhanced PDCCH (EPDCCH), and additionally supports a common search space (CSS) for paging and random access.

The MPDCCH may be similar in concept to E-PDCCH used in the legacy LTE.

(4) MTC uses newly defined DCI formats. For example, the newly defined DCI formats may be DCI formats 6-0A, 6-0B, 6-1A, 6-1B, and 6-2.

(5) In MTC, a physical broadcast channel (PBCH), a PRACH, an MTC physical downlink control channel (MPDCCH), a PDSCH, a PUCCH, and a PUSCH may be repeatedly transmitted. Such MTC repeated transmissions enable decoding of the MTC channels even when signal quality or power is very poor as in a poor environment like a basement, thereby increasing a cell radius and bringing the effect of signal penetration. MTC may support only a limited number of transmission modes (TMs) which may operate in a single layer (or with a single antenna), or a channel or reference signal (RS) that may operate in a single layer. For example, the TMs available for MTC may be TM 1, 2, 6 or 9.

(6) HARQ retransmission of MTC is adaptive and asynchronous, and is based on a new scheduling assignment received on the MPDCCH.

(7) In MTC, PDSCH scheduling (DCI) and PDSCH transmission take place in different subframes (cross-subframe scheduling).

(8) All resource allocation information (a subframe, a transport block size (TBS), and a subband index) for SIB1 decoding is determined by parameters of a master information block (MIB), and no control channel is used for SIB1 decoding of MTC.

(9) All resource allocation information (subframe, TBS, subband index) for SIB2 decoding is determined by several SIB1 parameters, and no control channel is used for SIB2 decoding of MTC.

(10) MTC supports an extended paging (discontinuous reception (DRX)) cycle.

(11) The same primary synchronization signal (PSS)/ secondary synchronization signal (SSS)/common reference signal (CRS) as used in legacy LTE or NR may be used in MTC. In NR, the PSS/SSS is transmitted in each SS block (SS/PBCH block or SSB), and a tracking RS (TRS) may be used for the same purpose as the CRS. That is, the TRS, which is a cell-specific RS, may be used for frequency/time tracking.

2) MTC Operation Modes and Levels

Now, MTC operations modes and levels will be described. For CE, two operation modes (first and second modes) and four different levels are defined in MTC, as listed in Table 8.

The MTC operations modes are referred to as CE modes. In this case, the first mode may be referred to as CE Mode A, and the second mode may be referred to as CE Mode B.

TABLE 8

| Mode | Level | Description |
| --- | --- | --- |
| Mode A | Level 1 | No repetition for PRACH |
|  | Level 2 | Small Number of Repetition for PRACH |
| Mode B | Level 3 | Medium Number of Repetition for PRACH |
|  | Level 4 | Large Number of Repetition for PRACH |

The first mode is defined for small CE, supporting full mobility and CSI feedback, in which no repetition or a small number of repetitions are performed. A first-mode operation may be identical to the operation range of UE category 1. The second mode (e.g., CE Mode B) is defined for UEs in an extremely poor coverage condition, supporting CSI feedback and limited mobility, in which a large number of repeated transmissions are defined. The second mode provides up to 15 dB of CE with respect to the range of UE category 1. Each level of MTC is defined differently for an RACH procedure and a paging procedure.

A method of determining an MTC operation mode and each level will be described below.

An MTC operation mode is determined by the BS, and each level is determined by the MTC UE. Specifically, the BS transmits RRC signaling including information about the MTC operation mode to the UE. The RRC signaling may be an RRC connection setup message, an RRC connection reconfiguration message, or an RRC connection reestablishment message. The term message may be replaced with information element (IE).

Subsequently, the MTC UE determines a level within each operation mode and transmits the determined level to the BS. Specifically, the MTC UE determines the level in the operation mode based on a measured channel quality (e.g., reference signal received power (RSRP), reference signal received quality (RSRQ) or signal to interference and noise ratio (SINR)), and indicates the determined level by using PRACH resources (frequency, time, or a preamble) corresponding to the determined level.

3) MTC Guard Period

As described above, the MTC operates in the narrowband. The location of the narrowband may vary in each specific time unit (e.g., subframe or slot). The MTC UE tunes to a different frequency in every time unit. Thus, all frequency retuning may require a certain period of time. In other words, the guard period is required for transition from one time unit to the next time unit, and no transmission and reception occurs during the corresponding period.

The guard period varies depending on whether the current link is downlink or uplink and also varies depending on the state thereof. An uplink guard period (i.e., guard period defined for uplink) varies depending on the characteristics of data carried by a first time unit (time unit N) and a second time unit (time unit N+1). In the case of a downlink guard period, the following conditions need to be satisfied: (1) a first downlink narrowband center frequency is different from a second narrowband center frequency; and (2) in TDD, a first uplink narrowband center frequency is different from a second downlink center frequency.

For an MTC guard period defined in legacy LTE, a guard period of a maximum of $N_{symb}^{retune}$ SC-FDMA symbols for Tx-Tx frequency retuning between 2 contiguous subframes may be generated. If the higher layer parameter ce-RetuningSymbols is set, $N_{symb}^{retune}$ is equal to ce-RetuningSymbols, otherwise, $N_{symb}^{retune}=2$. In addition, for the MTC UE composed of the higher layer parameter 'srs-UpPtsAdd', a guard period corresponding to a maximum of SC-FDMA symbols is generated for Tx-Tx frequency retuning between a first special subframe and a second UL subframe about the frame structure type 2.

Figure 11:
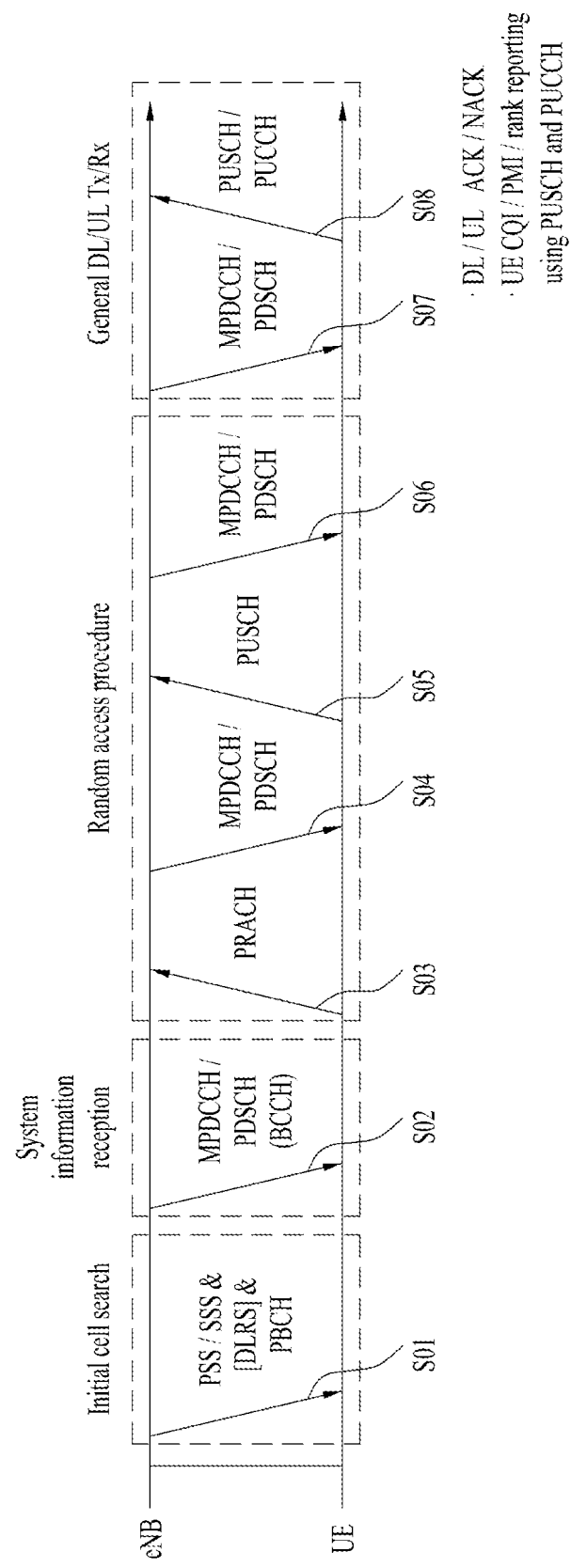
FIG. 11 is a diagram illustrating available physical channels and a general signal transmission method using the physical channels in machine type communication (MTC).

FIG. 11 is a diagram illustrating available physical channels and a general signal transmission method using the physical channels in MTC.

When an MTC UE is powered on or enters a new cell, the MTC UE performs initial cell search including acquisition of synchronization with a BS in step S01. For the initial cell search, the MTC UE synchronizes its timing with the BS and acquires information such as a cell identifier (ID) by receiving a primary synchronization signal (PSS) and a secondary synchronization signal (SSS) from the BS. The PSS/SSS used for the initial cell search in MTC may be the PSS/SSS and resynchronization signal (RSS) in legacy LTE.

The UE may then acquire information broadcast in the cell by receiving a PBCH from the BS.

During the initial cell search, the MTC UE may further monitor a DL channel state by receiving a downlink reference signal (DL RS). The information broadcast on the PBCH is an MIB. In MTC, the MIB is repeated in the first slot of subframe subframe #0 of a radio frame and another subframe (subframe #9 in FDD and subframe #5 in TDD) of the radio frame.

The PBCH repetition is performed by repeating exactly the same constellation point in different OFDM symbols so that the PBCH repetition may be used for initial frequency error estimation even before PBCH decoding is attempted.

After the initial cell search, the MTC UE may acquire more detailed system information by receiving an MPDCCH and receiving an MPDSCH corresponding to the MPDCCH in step S02. (1) The MPDCCH is very similar to the EPDCCH and delivers common signaling and UE-specific signaling; (2) the MPDCCH may be transmitted only once or repeatedly (a repetition number is configured by higher-layer signaling); (3) a plurality of MPDCCHs are supported, and the UE monitors a set of MPDCCHs; (4) the MPDCCH is generated by combining enhanced control channel elements (eCCEs), each eCCE including a set of REs; and (5) the MPDCCH supports an RA-RNTI, an SI-RNTI, a P-RNTI, a C-RNTI, a temporary C-RNTI, and a semi-persistent scheduling (SPS)C-RNTI.

Subsequently, to complete the connection to the BS, the MTC UE may perform a random access procedure as in steps S03 to S06. A basic configuration related to the RACH procedure is transmitted by SIB2. In addition, SIB2 may include parameters associated paging.

Paging Occasion (PO) is a subframe through which P-RNTI is transmitted on MPCCH. When P-RNTI PDCCH is repeatedly transmitted, the PO may refer to a start subframe of MPDCCH repetition. A paging frame (PF) is one radio frame, and may include one or more paging occasions (POs). When DRX is used, an MTC terminal may monitor only one PO for each DRX cycle. The paging narrowband (PNB) is one narrowband, and may enable the MTC terminal to receive the paging message.

To this end, the MTC UE may transmit a random access preamble on a PRACH in step S03 and receive an MPDCCH and a random access response (RAR) to the preamble on a PDSCH corresponding to the MPDCCH in step S04. In contention-based random access, the MTC UE may perform a contention resolution procedure including transmission of an additional PRACH signal in step S05 and reception of an MPDCCH and a PDSCH corresponding to the MPDCCH in step S06. Signals and/or messages (Msg1, Msg2, Msg3, and Msg4) transmitted in the RACH procedure may be repeatedly transmitted in MTC, and a different repetition pattern is configured according to a CE level. Msg1 may be a PRACH preamble, Msg2 may be an RAR, Msg3 may be a UL transmission of the MTC UE in response to the RAR, and Msg4 may be a DL transmission from the BS in response to Msg3.

For random access, signaling for different PRACH resources and different CE levels is supported. This signaling provides the same control as in the near-far effects for a PRACH by simultaneously grouping UEs experiencing a similar path loss. A maximum of 4 different PRACH resources can be signaled to the MTC terminal.

The MTC UE measures an RSRP using a DL RS (e.g., CRS, CSI-RS, TRS, and so on) and selects one of random access resources based on the measurement result. Each of four random access resources is related to a repetition number for the PRACH and a repetition number of the RAR.

Therefore, an MTC UE with bad coverage needs a large number of repetitions to be successfully detected by the BS and needs to receive an RAR with a corresponding repetition number to satisfy the coverage level of the repetitions.

Search spaces for the RAR and contention resolution messages are also defined by system information and independent of each coverage level.

In addition, PRACH waveforms used in MTC are equal to PRACH waveforms used in the legacy LTE (for example, OFDM and Zadoff-Chu sequence).

After the above procedure, the MTC UE may receive an MPDCCH and/or a PDSCH from the BS in step S07 and transmit a PUSCH and/or a PUCCH to the BS in step S08 in a general UL/DL signal transmission procedure. Control information that the MTC UE transmits to the BS is generically called UCI. The UCI includes an HARQ ACK/NACK, a scheduling request (SR), a channel quality indicator (CQI), a precoding matrix indicator (PMI), a rank indication (RI), and so on.

When the RRC connection to the MTC UE is established, the MTC UE blind-decodes the MPDCCH in a search space configured to obtain UL and DL downlink data allocation. In MTC, all OFDM symbols available in a subframe are used to transmit DCI. Therefore, time-domain multiplexing between a control channel and a data channel in the same subframe is impossible. That is, as described before, cross-subframe scheduling between the control channel and the data channel is possible.

The MPDCCH repeated for the last time in subframe #N schedules PDSCH allocation in subframe #N+2.

DCI transmitted by the MPDCCH provides information about the number of times the MPDCCH is repeated so that when PDSCH transmission starts, the MTC UE may be aware of the PDSCH transmission.

The PDSCH allocation may be performed in different NBs.

For UL data transmission, scheduling is based on the same timing as that of legacy LTE.

The last MPDCCH in subframe #N schedules a PUSCH transmission starting in subframe #N+4.

Figure 12:
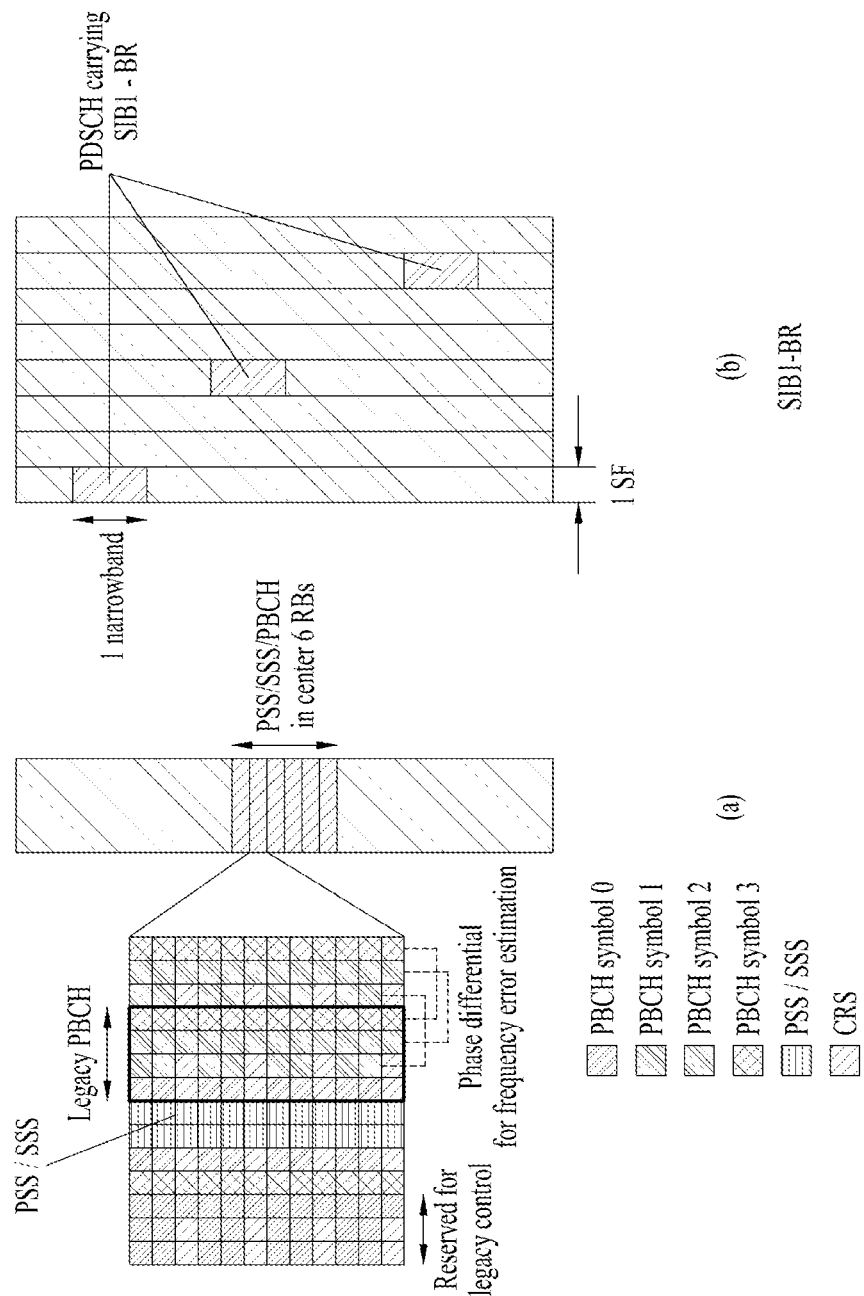
FIG. 12 is a diagram illustrating an example of system information transmission of a machine type communication (MTC) system.

FIG. 12 is a diagram illustrating an example of system information transmission of the MTC.

FIG. 12(a) is a diagram illustrating a repetition pattern of the subframe #0 in FDD, and a frequency error estimation method for a normal CP and repeated symbols. FIG. 12(b) is a diagram illustrating an example of SIB-BR transmission on a broadband LTE channel.

Five reserved bits in the MIB are used in the MTC to transmit scheduling information for a new system information block for bandwidth reduced device (SIB1-BR) including a time/frequency location and a TBS.

The SIB-BR is transmitted on a PDSCH directly without any related control channels.

The SIB-BR is maintained without change for 512 radio frames (5120 ms) to allow a large number of subframes to be combined.

Table 9 shows an example of MIB.

TABLE 9

| | |
|---|---|
| -- ASN1START | |
| MasterInformationBlock ::= | SEQUENCE { |
| dl-Bandwidth | ENUMERATED { |
| | n6, n15, n25, n50, |
| | n75, n100}, |
| phich-Config | PHICH-Config, |
| systemFrameNumber | BIT STRING (SIZE (8)), |
| schedulingInfoSIB1-BR-r13 | INTEGER (0..31), |
| systemInfoUnchanged-BR-r15 | BOOLEAN, |
| spare | BIT STRING (SIZE (4)) |
| } | |
| -- ASN1STOP | |

In Table 9, the schedulingInfoSIB1-BR field may indicate an index for a table defining SystemInformationBlock-Type1-BR scheduling information. The value '0' may indicate that SystemInformationBlockType1-BR is not scheduled. Overall function and information carried by SystemInformationBlockType1-BR (or SIB1-BR) may be similar to SIB1 of the legacy LTE. Contents of SIB1-BR may be classified into (1) PLMN, (2) cell selection criteria, (3) SIB2 and scheduling information for other SIBs.

Figure 13:
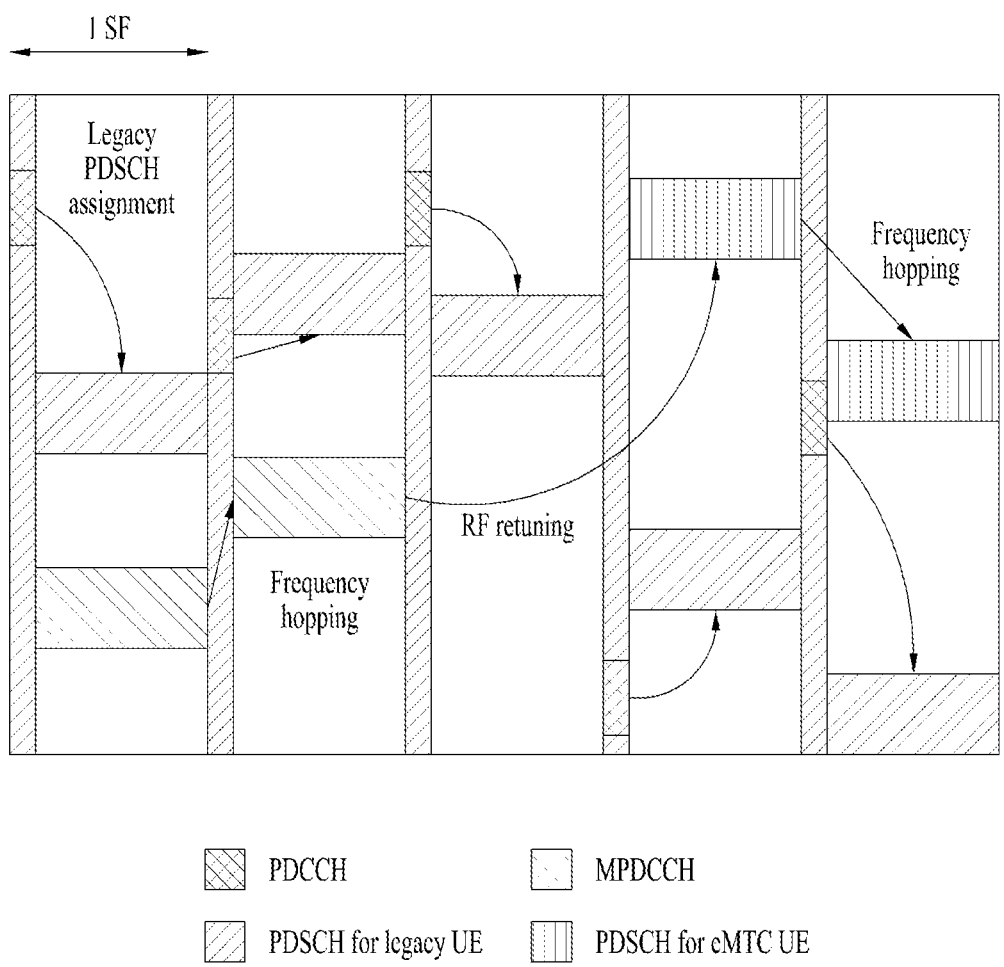
FIG. 13 is a diagram illustrating an example of scheduling each of the MTC and a legacy LTE.

FIG. 13 is a diagram illustrating an example of scheduling each of the MTC and the legacy LTE.

A legacy LTE assignment is scheduled using the PDCCH and uses the initial OFDM symbols in each subframe. The PDSCH is scheduled in the same subframe in which the PDCCH is received.

On the other hand, the MTC PDSCH is cross-subframe scheduled, and one subframe is defined between the MPDCCH and PDSCH to allow MPDCCH decoding and RF retuning.

MTC control and data channels may be repeated for a large number of subframes to be decoded in an extreme coverage condition. Specifically, the MTC control and data channels may be repeated for a maximum of 256 subframes for the MPDCCH and a maximum of 2048 subframes for the PDSCH.

E. NB-IoT (Narrowband-Internet of Things)

NB-IoT may refer to a system for supporting low complexity and low power consumption through a system BW corresponding to 1 PRB (Physical Resource Block) of a wireless communication system (e.g., LTE system, NR system, etc.)

Here, NB-IoT may be referred to by other terminology, such as NB-LTE, NB-IoT enhancement, enhanced NB-IoT, further enhanced NB-IoT, NB-NR, etc. That is, NB-IoT can also be replaced by terms defined in the 3GPP standard, and will hereinafter be referred to as "NB-IoT" for convenience of description.

NB-IoT may be mainly used as a communication scheme for implementing Internet of Things (IoT) by supporting a device (or UE) such as MTC (machine-type communication) in a cellular system. In this case, 1 PRB of the existing system band is allocated for NB-IoT, such that frequency can be efficiently used. In addition, in the case of NB-IoT, each UE recognizes a single PRB as a carrier, so that the PRB and the carrier explained in the present disclosure may be interpreted as having the same meaning.

Although a frame structure, a physical channel, a multi-carrier operation, an operation mode, general signal transmission/reception, etc. which are associated with NB-IoT, can be described in consideration of the legacy LTE system, the above-mentioned NB-IoT related elements can also extend to the next generation system (e.g., NR system or the like). In addition, content associated with NB-IoT can also extend to MTC (Machine Type Communication) for implementing similar technical purposes (e.g., low power, low cost, coverage enhancement, etc.).

1) Frame Structure of NB-IoT and Physical Resources

First, the NB-IoT frame structure may be determined differently according to subcarrier spacing.

Figure 14:
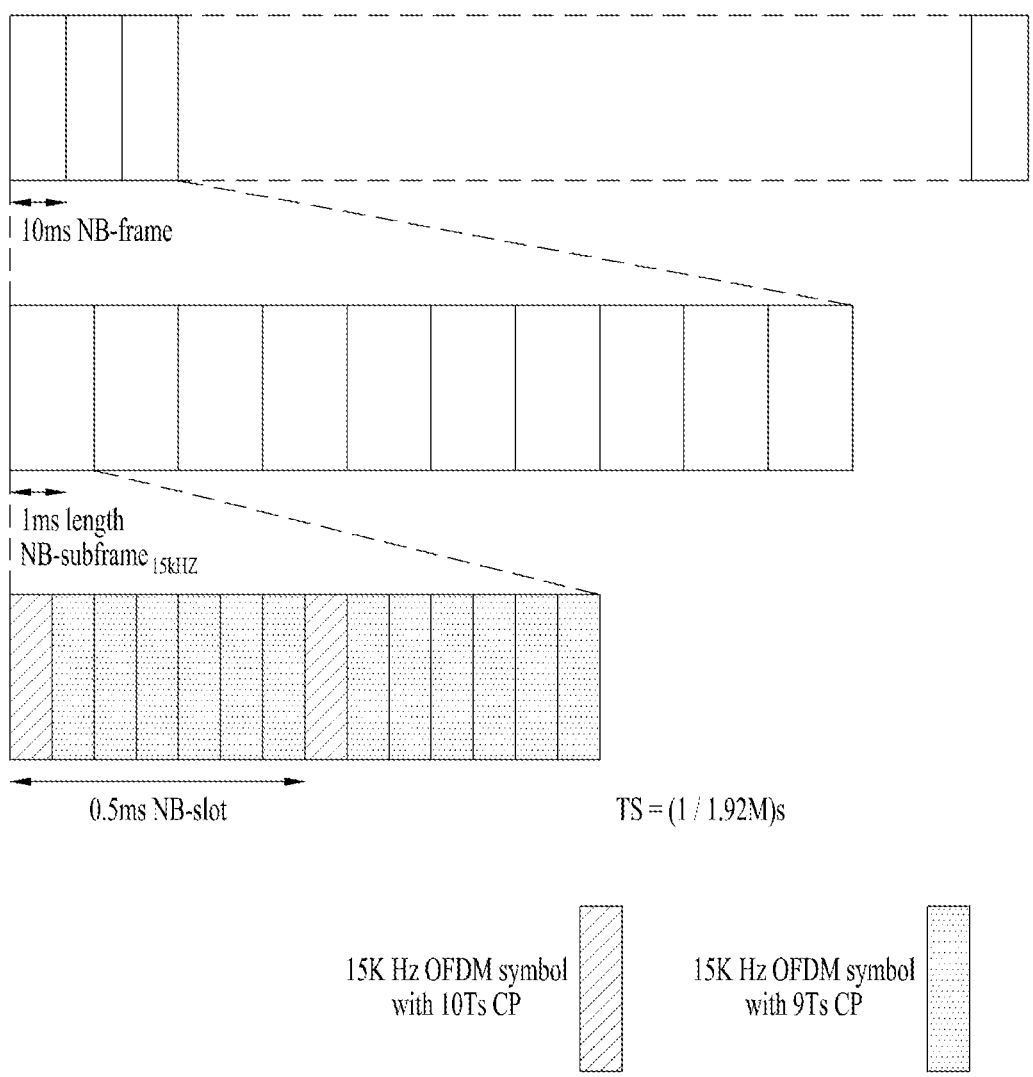
FIGS. 14 and 15 are diagrams illustrating examples of an NB-IoT frame structure based on a subcarrier spacing.
Figure 15:
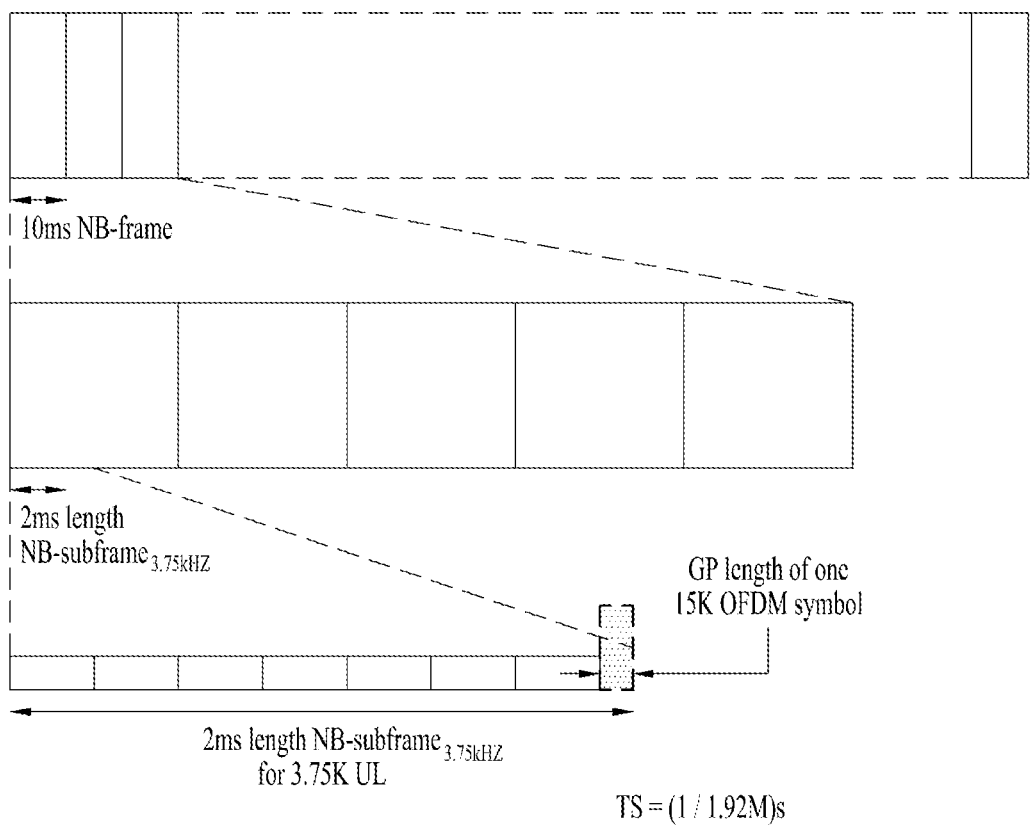

FIGS. 14 and 15 illustrate examples of the NB-IoT frame structure according to subcarrier spacing. Specifically, FIG. 14 is a diagram illustrating an example of the frame structure when the subcarrier spacing is set to 15 kHz, and FIG. 15 is a diagram illustrating an example of the frame structure when the subcarrier spacing is set to 3.75 kHz. However, the NB-IoT frame structure is not limited thereto, and NB-IoT for another subcarrier spacing (e.g., 30 kHz, etc.) can also be considered by varying time/frequency units.

In addition, although the present disclosure has been described with reference to the NB-IoT frame structure based on the LTE system frame structure, the scope or spirit of the present disclosure is not limited thereto. The scheme described herein can also be applied to NB-IoT based on the frame structure of the next generation system (e.g., NR system).

Referring to FIG. 14, the NB-IoT frame structure for the 15 kHz subcarrier spacing may be set equal to the frame structure of the legacy system (i.e., LTE system). That is, the 10 ms NB-IoT frame may include ten 1 ms NB-IoT subframes. The 1 ms NB-IoT subframe may include two 0.5 ms NB-IoT slots. Further, each 0.5 ms NB-IoT slot may include 7 OFDM symbols.

In contrast, referring to FIG. 15, the 10 ms NB-IoT frame may include five 2 ms NB-IoT subframes. The 2 ms NB-IoT subframe may include 7 OFDM symbols and one guard period. In addition, the 2 ms NB-IoT subframe may also be represented by NB-IoT slot, NB-IoT resource unit (RU), or the like.

NB-IoT physical resources for each of downlink and uplink will hereinafter be described.

First, physical resources for NB-IoT downlink may be established with reference to another wireless communication system (e.g., LTE system, NR system, etc.) except that the system bandwidth includes a specific number of RBs (e.g., 1 RB or 180 kHz). For example, if the NB-IoT downlink supports only the 15 kHz subcarrier spacing as described above, the NB-IoT downlink physical resources may be set to a resource region in which the resource grid of the LTE system shown in FIG. 5 is limited to 1 RB in the frequency domain.

Figure 16:
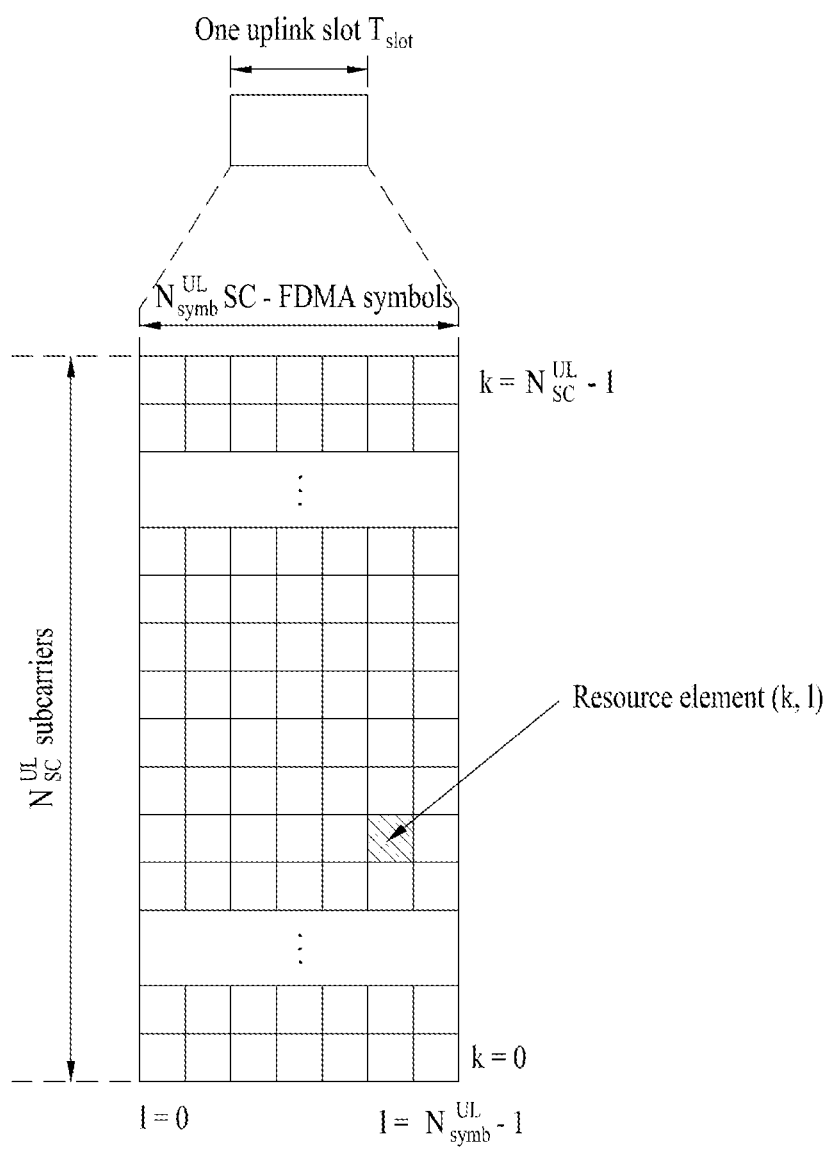
FIG. 16 is a diagram illustrating an example of a resource grid for NB-IoT uplink (UL).

Thereafter, even in the case of NB-IoT UL physical resources, the system bandwidth may be limited to 1 RB in the same manner as on downlink. For example, if the NB-IoT supports the subcarrier spacings of 15 kHz and 3.75 kHz as described above, the resource grid for NB-IoT uplink may be represented as shown in FIG. 16. In FIG. 16, the number $N_{sc}^{UL}$ of subcarriers in the uplink band, and a slot period $T_{slot}$ in the uplink band may be given as shown in Table 10.

FIG. 16 is a diagram illustrating a resource grid for NB-IoT uplink.

TABLE 10

| Subcarrier spacing | $N_{sc}^{UL}$ | $T_{slot}$ |
|---|---|---|
| Δf = 3.75 kHz | 48 | 61440 · $T_s$ |
| Δf = 15 kHz | 12 | 15360 · $T_s$ |

In addition, a resource unit (RU) of the NB-IoT uplink may include SC-FDMA symbols in the time domain, and may include $N_{symb}^{UL} N_{slots}^{UL}$ contiguous subcarriers in the frequency domain. For example, in the case of the frame structure type 1 (i.e., FUD), $N_{sc}^{RU}$ and $N_{symb}^{UL}$ are given as shown in Table 11. In the case of the frame structure type 2 (i.e., TDD), $N_{sc}^{RU}$ and $N_{symb}^{UL}$ are given as shown in Table 12.

TABLE 11

| NPUSCH format | Δf | $N_{sc}^{RU}$ | $N_{slots}^{UL}$ | $N_{symb}^{UL}$ |
|---|---|---|---|---|
| 1 | 3.75 kHz | 1 | 16 | 7 |
|  | 15 kHz | 1 | 16 |  |
|  |  | 3 | 8 |  |
|  |  | 6 | 4 |  |
|  |  | 12 | 2 |  |
| 2 | 3.75 kHz | 1 | 4 |  |
|  | 15 kHz | 1 | 4 |  |

TABLE 12

| NPUSCH format | Δf | Supported uplink-downlink configurations | $N_{sc}^{RU}$ | $N_{slots}^{UL}$ | $N_{symb}^{UL}$ |
|---|---|---|---|---|---|
| 1 | 3.75 kHz | 1, 4 | 1 | 16 | 7 |
|   | 15 kHz | 1, 2, 3, 4, 5 | 1 | 16 |   |
|   |   |   | 3 | 8 |   |
|   |   |   | 6 | 4 |   |
|   |   |   | 12 | 2 |   |
| 2 | 3.75 kHz | 1, 4 | 1 | 4 |   |
|   | 15 kHz | 1, 2, 3, 4, 5 | 1 | 4 |   |

2) Physical Channels of NB-IoT

A base station and/or UE that support NB-IoT may be configured to transmit and receive physical channels and signals different from those in the legacy system. Hereinafter, the physical channels and/or signals supported in the NB-IoT will be described in detail.

First, the NB-IoT downlink will be described. For the NB-IoT downlink, an OFDMA scheme with the 15 kHz subcarrier spacing may be applied. Accordingly, orthogonality between subcarriers may be provided, thereby supporting coexistence with the legacy system (e.g., LTE system, NR system, etc.).

The physical channel of the NB-IoT system may be represented as a format to which 'N(Narrowband)' is added to be distinguished from the existing system. For example, the downlink physical channel may be defined as Narrowband Physical Broadcast Channel (NPBCH), Narrowband Physical Downlink Control Channel (NPDCCH), Narrowband Physical Downlink Shared Channel (NPDSCH), etc. The downlink physical signal may be defined as a Narrowband Primary Synchronization Signal (NPSS), a Narrowband Secondary Synchronization Signal (NSSS), a Narrowband Reference Signal (NRS), Narrowband Positioning Reference Signal (NPRS), a Narrowband Wake Up Signal (NWUS), etc.

Generally, the above-described downlink physical channels and physical signals for the NB-IoT may be configured to be transmitted based on time-domain multiplexing and/or frequency-domain multiplexing.

The NPBCH, NPDCCH, and NPDSCH, which are downlink channels of the NB-IoT system, may be repeatedly transmitted for coverage enhancement.

The NB-IoT uses newly defined DCI formats. For example, the DCI formats for the NB-IoT may be defined as follows: DCI format N0, DCI format N1, DCI format N2, etc.

Next, the NB-IoT uplink will be described. For the NB-IoT uplink, an SC-FDMA scheme with the subcarrier spacing of 15 kHz or 3.75 kHz may be applied. The NB-IoT uplink may support multi-tone and single-tone transmissions. For example, the multi-tone transmission may support the 15 kHz subcarrier spacing, and the single-tone transmission may support both the 15 kHz and 3.75 kHz subcarrier spacing.

As mentioned in the downlink section, the physical channel of the NB-IoT system may be represented in a format to which 'N(Narrowband)' is added to be distinguished from the existing system. For example, the uplink physical channel may be defined as a Narrowband Physical Random Access Channel (NPRACH), Narrowband Physical Uplink Shared Channel (NPUSCH), etc. The uplink physical signal may be defined as a Narrowband Demodulation Reference Signal (NDMRS), etc.

The NPUSCH may be configured with NPUSCH format 1 and NPUSCH format 2. For example, NPUSCH format 1 is used for UL-SCH transmission (or transfer), and NPUSCH format 2 may be used for UCI transmission such as HARQ ACK signaling.

The NPRACH, which is a downlink channel of the NB-IoT system, may be repeatedly transmitted for coverage enhancement. In this case, frequency hopping may be applied to the repeated transmission.

3) Multi-Carrier Operation in NB-IoT

Hereinafter, the multi-carrier operation in the NB-IoT will be described. The multi-carrier operation may mean that when the base station and/or UE uses different usage of multiple carriers (i.e., different types of multiple carriers) in transmitting and receiving a channel and/or a signal in the NB-IoT.

In general, the NB-IoT may operate in multi-carrier mode as described above. In this case, NB-IoT carriers may be divided into an anchor type carrier (i.e., anchor carrier or anchor PRB) and a non-anchor type carrier (i.e., non-anchor carrier or non-anchor PRB).

From the perspective of the base station, the anchor carrier may mean a carrier for transmitting the NPDSCH that carries the NPSS, NSSS, NPBCH, and SIB (N-SIB) for initial access. In other words, in the NB-IoT, the carrier for initial access may be referred to as the anchor carrier, and the remaining carrier(s) may be referred to as the non-anchor carrier. In this case, there may be one or multiple anchor carriers in the system.

4) General Signal Transmission and Reception Procedure in NB-IoT

Figure 17:
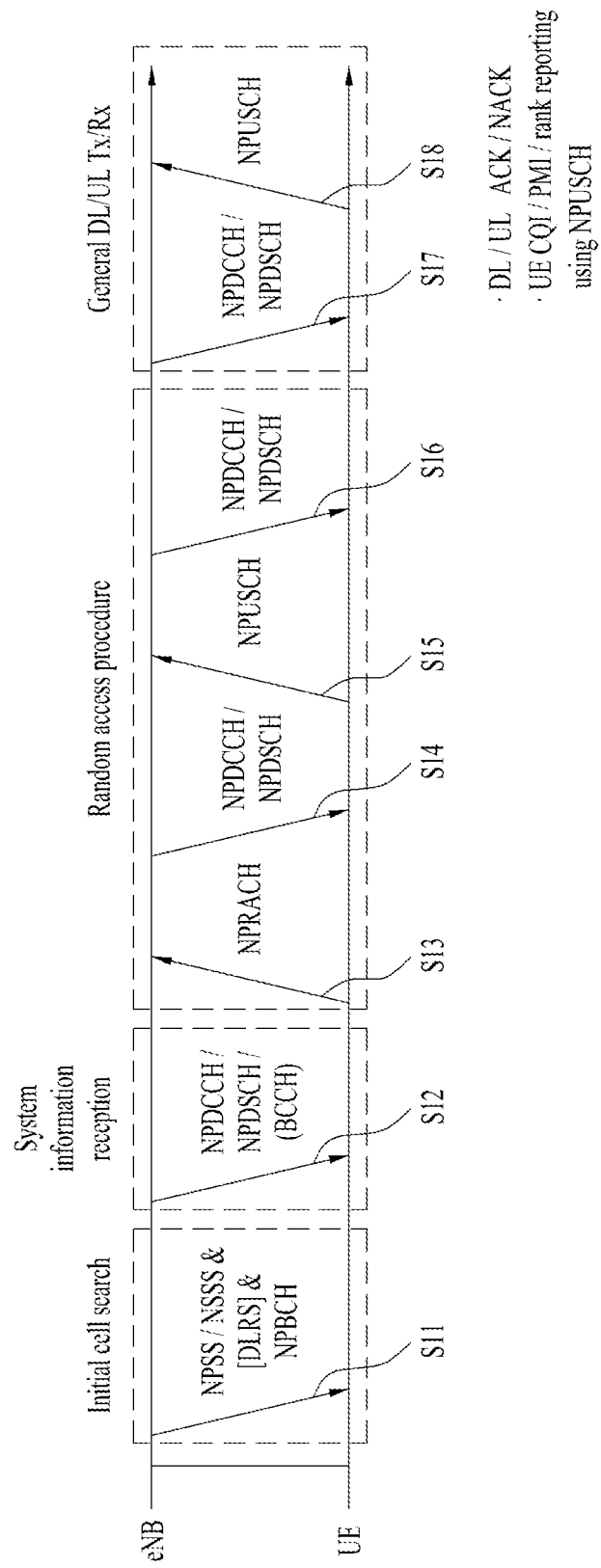
FIG. 17 is a diagram illustrating available physical channels and a general signal transmission method using the physical channels in narrowband Internet of things (NB-IoT).

FIG. 17 illustrates available physical channels and a general signal transmission method using the physical channels in NB-IoT. In a wireless communication system, an NB-IoT UE may receive information from a BS on DL and transmit information to the BS on UL. In other words, the BS may transmit information to the NB-IoT UE on DL, and receive information from the NB-IoT UE on UL.

The information transmitted and received between the BS and the NB-IoT UE includes data and various types of control information, and various physical channels may exist according to the type/use of information transmitted and received by the BS and the NB-IoT UE. A method of transmitting and receiving an NB-IoT signal described with reference to FIG. 7 may be performed by the above-described wireless communication devices.

When an NB-IoT UE is powered on or enters a new cell, the NB-IoT UE performs initial cell search including acquisition of synchronization with a BS (S11). For the initial cell search, the NB-IoT UE synchronizes its timing with the BS and acquires information such as a cell ID by receiving a PSS and an SSS from the BS. The NB-IoT UE may further acquire information broadcast in the cell by receiving a NPBCH from the BS. During the initial cell search, the NB-IoT UE may further monitor a DL channel state by receiving a DL RS.

In other words, when there is any new NB-IoT UE which has entered the cell, the BS may perform the initial cell search operation including synchronization with the NB-IoT UE. The BS may synchronize its timing with the NB-IoT UE by transmitting the NPSS and the NSSS to the NB-IoT UE and transmit information such as the cell ID to the NB-IoT UE. Further, the BS may transmit the information broadcast in the cell to the NB-IoT UE by transmitting (broadcasting) the DL RS to the NB-IoT UE during the initial cell search.

After the initial cell search, the NB-IoT UE may acquire more detailed system information by receiving an NPDCCH and receiving an NPDSCH corresponding to the NPDCCH (S12). In other words, the BS may transmit the more detailed system information to the NB-IoT UE which has completed the initial cell search by transmitting the NPDCCH and the NPDSCH corresponding to the NPDCCH.

Subsequently, to complete the connection to the BS, the NB-IoT UE may perform a random access procedure (S13 to S16).

Specifically, the NB-IoT UE may transmit a random access preamble on an NPRACH (S13). As described before, the NPRACH may be configured to be transmitted repeatedly based on frequency hopping for CE.

Then, the NB-IoT UE may receive an NPDCCH and an RAR for the preamble on an NPDSCH corresponding to the NPDCCH (S14). In other words, the BS may transmit the NPDCCH and then the RAR for the preamble on the NPDSCH corresponding to the NPDCCH to the NB-IoT UE.

Then, the NB-IoT UE may transmit an NPUSCH to the BS by using scheduling information included in the RAR (S15) and perform a contention resolution procedure involving an NPDCCH and an NPDSCH corresponding to the NPDCCH (S16). In other words, the BS may receive the NPUSCH from the NB-IoT UE based on the scheduling information in the RAR and perform the contention resolution procedure.

After the above procedure, the NB-IoT UE may receive an NPDCCH and/or an NPDSCH from the BS (S17) and transmit an NPUSCH to the BS (S18) in a general UL/DL signal transmission procedure. In other words, after the above procedure, the BS may transmit the NPDCCH and/or the NPDSCH to the NB-IoT UE and receive the NPUSCH from the NB-IoT UE in the general UL/DL signal transmission procedure.

As mentioned before, the NPBCH, the NPDCCH, and the NPDSCH may be transmitted repeatedly, for CE. Further, in NB-IoT, a UL-SCH (i.e., general UL data) and UCI may be delivered on the NPUSCH. The UL-SCH and the UCI may be configured to be transmitted in different NPUSCH formats (e.g., NPUSCH format 1 and NPUSCH format 2).

In addition, control information transmitted from the UE to the BS may be referred to as Uplink Control Information (UCI). UCI may include ARQ ACK/NACK (Hybrid Automatic Repeat and reQuest Acknowledgement/Negative-ACK), Scheduling Request (SR), Channel State Information (CSI), etc. CSI may include Channel Quality Indicator (CQI), Precoding Matrix Indicator (PMI), Rank Indication (RI), etc. As described above, in NB-IoT, UCI may generally be transmitted over NPUSCH. In addition, according to a request/instruction of a network (e.g., base station BS), the UE may transmit UCI through NPUSCH in a periodic, aperiodic, or semi-persistent manner.

F. DRX(Discontinuous Reception) Operation

As a major scenario of MTC and/or NB-IoT, the UE may support various operations, for example, exception report, periodic report, network command, software update/reconfiguration, etc. In order to efficiently perform the above-mentioned operation in terms of battery efficiency, when an event occurs in a battery efficiency state of the UE, the UE awakes from specific subframe(s) belonging to a specific period and then performs UL/DL data transmission/reception. In order to avoid collision between UEs, the above-mentioned specific subframe(s) may be UE-specifically configured using IMSI, etc. of the UEs. Since the above operation is mainly used for periodic paging confirmation, this operation may be referred to as paging occasion (PO).

The BS may UE-specifically configure at least one paging occasion (PO) for each specific paging period, and the UE may UE-specifically acquire the paging message at the UE-specifically configured paging occasion (PO). The paging cycle may refer to a time period in which the paging message is transmitted. The UE in the RRC-IDLE or RRC-SUSPENDED state may receive the paging message by recovering from the UE-specifically-configured PO to the connected state. The UE-specifically-configured PO may be determined using both a parameter signaled through SIB2 and UE identification information (e.g., IMSI).

Figure 18:
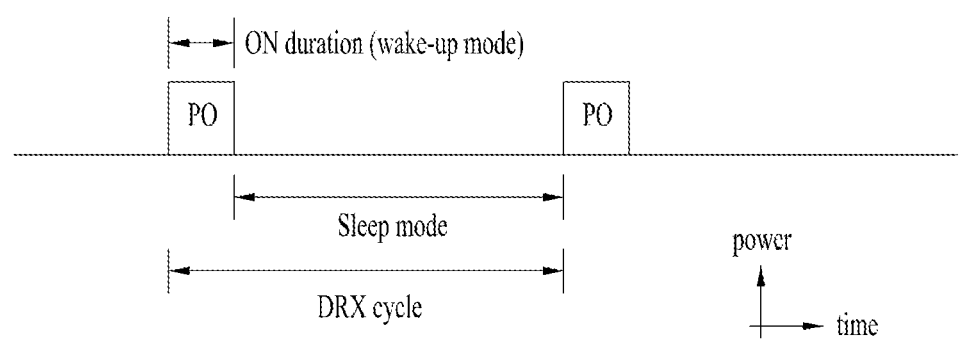
FIG. 18 is a diagram illustrating a DRX cycle for paging.

FIG. 18 is a diagram illustrating the DRX cycle for paging.

In order to reduce power consumption, discontinuous reception (DRX) may be constructed by the BS. The UE may receive DRX configuration information from the BS through higher layer signaling (e.g., RRC layer signaling). The DRX configuration information may include a DRX cycle, a DRX offset, configuration information for a DRX timer, etc. The UE may repeatedly perform a sleep mode and a wakeup mode according to the DRX cycle configured by the base station (BS) based on the DRX configuration information. The DRX cycle may not be aligned with the paging cycle. When the UE's paging occasion (PO) in which DRX is constructed is located in a sleep duration of the DRX cycle, the UE may switch to the wakeup mode so as to receive the paging message.

In the wakeup mode, the UE may monitor a physical channel (e.g., PDCCH, MPDCCH, and NPDCCH scrambled with P-RNTI) associated with paging, and may detect the corresponding physical channel. In addition, when the UE receives its own paging ID and/or specific information indicating a change of system information through the detected physical channel, the UE may initialize (or reconfigure) connection to the BS, or may receive (or obtain) new system information from the BS. After lapse of the ON duration, the UE may switch to the sleep duration, and may remain in the sleep mode until reaching the next ON duration. In the sleep mode, whereas the UE does not perform operations of detecting/decoding physical channels transmitted from the BS, power for a circuit needed to maintain connection between the UE and the BS can be maintained by the UE.

Figure 19:
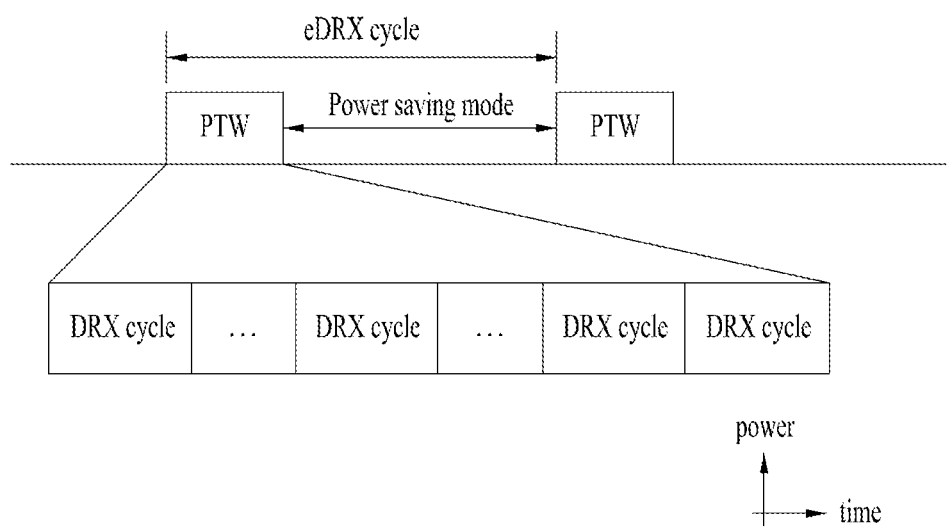
FIG. 19 is a diagram illustrating an extended DRX (eDRX) cycle.

FIG. 19 is a diagram illustrating an extended DRX (eDRX) cycle.

In accordance with the DRX cycle configuration, a maximum cycle duration may be limited to 2.56 seconds. However, in the case of using the UE in which data transmission/reception is intermittently performed in the same manner as in the MTC UE or NB-IoT UE, unnecessary power consumption may occur in the UE during the DRX cycle. In order to reduce power consumption of the UE, a method for largely extending the DRX cycle based on PSM (power saving mode) or PTW (paging time window or paging transmission window) has been introduced, and this extended DRX cycle is referred to as eDRX cycle. PSM may refer to a UE state in which the UE consumes near zero power. In PSM, the BS cannot communicate with the UE at all. In PTW duration, the UE switches from the paging occasion (PO) to the wakeup mode by performing the DRX cycle, such that the UE can monitor a channel associated with paging. In addition, the UE can repeatedly perform one or more DRX cycles (e.g., wakeup mode and sleep mode) in the PTW duration. The number of DRX cycles in the PTW duration may be configured by the BS through higher layer signaling (e.g., RRC layer signaling).

G. Method and Apparatus Proposed by the Present Disclosure

The above-described contents (3GPP system, frame structure, MTC/NB-IoT system, etc.) can be applied while being combined with the proposed methods. Alternatively, the above-described contents can be supplemented to clarify technical features of the methods proposed by the present disclosure.

In this patent document, BL UE is referred to as an MTC UE. An enhanced UE may be referred to as a Non-BL UE that has many more functions than the MTC UE and operates in a CE (coverage enhanced, coverage enhancement, or coverage extended) mode. Compared to the MTC UE, the Non-BL UE has the following characteristics.

(1) Broadband reception: MTC UE can receive downlink (DL) data of a maximum 5 MHz according to UE capability. The non-BL UE can receive data of a maximum 20 MHz within a single component carrier in terms of functions.

(2) Multiple reception (Rx) antennas: Although it is assumed that the MTC UE uses a single reception (Rx) antenna, the non-BL UE has a minimum of 2 reception (Rx) antennas in implementation. Whether a single antenna or multiple antennas are used in the CE mode is an implementation issue.

Calculation of high-complexity CSI: The MTC UE calculates Channel State Information (CSI) based on a CRS (Cell Reference Signal or Common Reference Signal). Since the rank supports the value of 1 only, only data up to PMIs (Precoding Matrix Indicators) corresponding to (4×1) vectors can be considered during CSI calculation. However, the non-BL UE supports CSI calculation on the assumption of at least four transmission (Tx) antennas, and can perform CSI calculation and at the same time can measure the intensity and quality of the reception (Rx) signal. In addition, a difference in resource mapping between the MPDCCH and the PDSCH according to CSI-RS setting has already been implemented.

The non-BE UE may further include various functions as well as the above-described operational features. The functions are as follows. When the non-BL UE does not operate in the CE mode, i.e., when the non-BL UE operates in the LTE mode, various functions that are not required by the legacy MTC according to UE category or UE capability can also be used by the non-BE UE. Information about whether to further use the above-described functions during the CE mode is an issue to be implemented by the UE. In order to more effectively use the above-described UE implementation issue, the standard technology should define a special configuration and procedure for the non-BL UE such that the defined configuration and procedure should be supported.

Although the method proposed by the present disclosure has been described centering upon the exemplary case in which the non-BL UE operates in the CE mode, the proposed method is not limited to the case in which the UE operates in the CE mode. For example, the CE mode is used to implement a wider coverage with low power, such that the proposed method can also be applied to the other case in which the UE (non-BL UE and BL UE) operates in a power saving mode or a low power mode in the same or similar manner as in the above-described contents. Therefore, according to the proposal of the present disclosure, the CE mode may be replaced with the power saving mode or the lower power mode as needed.

G.1 Method for Receiving Paging Channel According to UE Types

When the non-BL UE operates in the CE mode, the non-BL UE may be configured to receive the paging channel or information (especially, emergency channel or information such as ETWS (earthquake and tsunami warning system) or CMAS (commercial mobile alert system)) through the LTE paging channel but not the paging channel for the MTC UE. That is, since it is assumed that the MTC UE has been designed for power saving and low cost, such paging channel monitoring may be limited to be performed only in the RRC idle mode, or the paging channel monitoring cycle may become significantly longer. On the other hand, the non-BL UE has more processing power than the MTC UE, and implementation capable of reading (receiving and detecting) the LTE channel has already been achieved. If necessary, the non-BL UE can also acquire the same or similar-purposed channel through the LTE channel rather than the MTC channel. To this end, the BS may configure resources (for example, time/frequency resource allocation of (M)PDCCH and PDSCH, and parameters associated with RNTI and the like) through which the non-BL UE operating in the CE mode can attempt to detect paging. The non-BL UE having received the above-described configuration may receive the LTE channel after discarding the corresponding MTC channel. Alternatively, the non-BL UE may attempt to detect associated messages in both the MTC channel and the LTE channel.

(1) In order to implement the method for allowing and configuring the above-described proposal such that the non-BL UE operating in the CE mode can receive a specific channel (e.g., a paging channel) through the same-purposed channel defined in the LTE or NR system rather than the MTC, the following procedure may be required.

In the proposal of the present disclosure, a system, RAT, and operation mode in which the UE operates in the RRC connected mode (or RRC_CONNECTED state) may be referred to as a first system, a first RAT, and a first operation mode, respectively. A system, RAT, or operation mode in which the UE operates in the RRC idle mode (or RRC_IDLE state) will be referred to as a second system, a second RAT, and a second operation mode, respectively. For example, the first system, the first RAT, or the first operation mode may refer to a system, RAT, or operation mode in which the UE acquires RRC connection after completing a random access procedure and uses the acquired information for data transmission/reception. The second system, the second RAT, or the second operation mode may refer to a system, RAT, or operation mode in which the UE attempts to receive a specific channel (e.g., a paging channel) after RRC connection is released. In addition, or alternatively, the first system, the first RAT, or the first operation mode may refer to a system, RAT, or operation mode in which the UE is not configured to support power saving or CE (coverage extension or coverage enhancement) (or for this purpose, iterative transmission/reception of signals), and the second system, the second RAT, or the second operation mode may refer to a system, RAT, or operation mode in which the UE is configured to support power waving or CE (or for this purpose, iterative transmission/reception of signal). In addition, or alternatively, the first system, the first RAT, or the first operation mode may refer to a system, RAT, or operation mode in which the UE is configured to operate in a wideband zone, and the second system, RAT, or operation mode may refer to a system, RAT, or operation mode in which the UE is configured to operate in a narrowband zone.

For convenience of description, the first system, the first RAT, or the first operation mode may be collectively referred to as a first system or a first RAT, the second system, the second RAT, or the second operation mode may be collectively referred to as a second system or a second RAT.

For example, the first system may refer to an LTE system or NR system. The second system may refer to an MTE system, NB-IOT system, or NR-light (or NR-lite) system.

(1-1) The base station (BS) may receive associated configuration/parameters (e.g., time/frequency resource allocation of (M)PDCCH and PDSCH, parameters associated with RNTI and the like, UE_ID (that may be set to the same value) to be used for PF (paging frame)/PO (paging occasion) calculation, DRX cycle information, P-RNTI, etc.) from the UE so as to control the UE to acquire a specific channel having the same purpose through a different system (e.g., a third system that can be regarded as the inter-RAT (Radio Access Technology) from the viewpoint of LTE, NR, MTC, or NB-IoT system environments). UE_ID may refer to UE identification (ID) information based on International Mobile Subscriber Identity (IMSI). The following detailed contents of determining the DRX cycle, UE_ID, and PF/PO will be given with reference to the entire contents written in 3GPP TS (technical specification) 36.304. In this case, the UE may receive and/or detect a channel based on a reference signal (e.g., CRS in LTE, or DMRS in NR) associated with the corresponding channel using a resource unit (e.g., time/frequency resources defined in the LTE system bandwidth using LTE as an example) defined in the corresponding system based on information acquired from the BS.

For example, the BS and the UE can simultaneously support the first system (e.g., LTE or NR system) and the second system (e.g., MTC, NB-IoT, or NR-light system). The BS can transmit configuration information for a specific channel (e.g., a paging channel) of the second system to the UE. Here, the specific channel of the second system has the same purpose as the specific channel of the first system. In more detail, the BS may transmit configuration information for a specific channel of the second system to the UE through the first system. The UE may receive configuration information for a specific channel (e.g., a paging channel) of the second system from the BS. In more detail, the UE may receive configuration information for a specific channel (e.g., a paging channel) of the second system from the BS through the first system.

As an additional example, when RRC connection to the UE is released in the first system, the BS may transmit a specific channel (e.g., a paging channel) to the UE in the second system by referring to the above-described configuration information. When RRC connection to the BS is released in the first system, the UE may receive a specific channel (e.g., a paging channel) from the BS in the second system by referring to the above-described configuration information.

(1-2) Upon receiving the above-described information (e.g., configuration information for a specific channel of the first system and/or configuration information for a specific channel of the second system) from the BS, the UE may selectively attempt to receive the same channel or may attempt to receive/detect a specific channel of another system (e.g., second system) only in a section allowed by the BS. For example, if both a paging channel configuration (or configuration information) of the second system (e.g., MTC system, NB-IoT system, and/or NR-light system) and a paging channel configuration (or configuration information) of the first system (e.g., LTE or NR system) are assigned to the UE, the UE may prioritize reception of the paging channel of the first system (e.g., LTE or NR system) rather than reception of the paging channel of the second system (e.g., MTC system, NB-IoT system, and/or NR-light system). During the corresponding period, it can be expected that the BS does not perform MTC scheduling for the UE.

If both a paging channel configuration (or configuration information) of the second system (e.g., MTC system, NB-IoT system, and/or NR-light system) and a paging channel configuration (or configuration information) of the first system (e.g., LTE or NR system) are assigned to the UE, it can be recognized that the UE is controlled (or has been controlled) to attempt to receive a paging channel of the first system (e.g., LTE or NR system) in the RRC connected mode. Likewise, it can be determined that the UE does not expect to perform scheduling in the second system (e.g., MTC system, NB-IoT system, and/or NR-light system) within the corresponding section.

(1-3) In accordance with the above-described propose, in the case where a UE-registered RAT (or system) that acquires system associated information and performs data transmission/reception after performing a random access procedure is different from a RAT (or system) attempting to receive the paging channel, the UE has to determine which RAT will be used for the next operation subsequent to UE's paging channel reception. For example, when the UE operates in the first system (e.g., LTE or NR system) during the RRC connected mode (after release of RRC connection) and operates in the second system (e.g., MTC, NB-IoT, or NR-light system) in the RRC idle mode, the UE can determine which one of the first system and the second system will be used for the next operation (e.g., random access procedure) after the second system has received a specific channel (e.g., a paging channel).

It is possible to use a method for enabling the paging channel to directly instruct the RAT (or system) in which the UE is scheduled to operate after receiving the corresponding channel. When it is impossible to perform the subsequent operation in the corresponding RAT (e.g., when an SNR (Signal-to-Noise Ratio) of the UE is not sufficiently high or when the UE does not have sufficient power), the UE may directly select the RAT so that the UE can reattempt to perform communication starting from the random access procedure. If RAT information acquired from the BS prior to paging channel reception of the UE is considered insufficient for communication except for such paging reception, the paging channel may include all information needed for the subsequent operation, or may indicate channel information of the corresponding RAT capable of acquiring necessary information. In this case, the UE ID (e.g., C-RNTI) may receive another value different from an ID of the legacy RAT through the paging channel or associated subsequent channel. If necessary, the UE may receive associated parameters such that the UE can perform Contention Free-based Random access (CFRA).

(1-4) In accordance with the proposal of the present disclosure, the UE may operate in the first system (e.g., LTE or NR system) during the RRC connected mode, and may attempt to receive/detect a specific channel (e.g., a paging channel) in the second system (e.g., MTC, NB-IoT, or NR-light system) during the RRC idle mode. Alternatively, the UE may operate in the second system (e.g., MTC, NB-IoT, or NR-light system) during the RRC connected mode, and may attempt to receive/detect a specific channel (e.g., a paging channel) in the first system (e.g., LTE or NR system) during the RRC idle mode.

In the above-described proposal, when the UE, which has registered in the second system (e.g., a narrowband system) (for example, MTC, NB-IoT, or NR-light system) to enter a communication mode, receives the paging channel in the RRC idle mode in a manner that the UE receives an indication message for monitoring the first system (e.g., a wideband system) (for example, LTE or NR system), the mobility-associated operation (e.g., measurement needed for cell selection/reselection) in the RRC idle mode can be configured/allowed such that the mobility-associated operation can be performed in the corresponding RAT (for example, the first system (e.g., a wideband system) in the above example). Alternatively, the mobility-associated operation (e.g., operation such as measurement needed for cell selection/reselection) is configured/allowed such that the mobility-associated operation is performed in the corresponding RAT (in the above example, the first system (e.g., the wideband system)) during the RRC idle mode, the UE designed to receive paging in the RRC idle mode may be instructed to monitor the first system (e.g., the wideband system) (for example, LTE or NR system), and can acquire associated parameters from the BS.

Alternatively, in the above-described proposal, when the UE, which has registered in the first system (e.g., a wideband system) (for example, LTE or NR system) to enter a communication mode, receives the paging channel in the RRC idle mode in a manner that the UE receives an indication message for monitoring the second system (e.g., a narrowband system) (for example, MTC, NB-IoT, or NR-light system), the mobility-associated operation (e.g., measurement needed for cell selection/reselection) in the RRC idle mode can be configured/allowed such that the mobility-associated operation can be performed in the corresponding RAT (for example, the second system (e.g., a narrowband system) in the above example). Alternatively, the mobility-associated operation (e.g., operation such as measurement needed for cell selection/reselection) is configured/allowed such that the mobility-associated operation is performed in the corresponding RAT (in the above example, the second system (e.g., the narrowband system)) during the RRC idle mode, the UE designed to receive paging in the RRC idle mode may be instructed to monitor the second system (e.g., the narrowband system) (for example, MTC, NB-IoT, or NR-light system), and can acquire associated parameters from the BS.

(1-5) In the above-described proposal, either when the UE, which has registered in the second system (e.g., a narrowband system) (for example, MTC, NB-IoT, or NR-light system) to enter a communication mode detects paging monitoring in the first system (e.g., a wideband system) (for example, LTE or NR system) (or another RAT different from the registered RAT) by receiving the paging channel in the RRC idle mode, or when the UE, which has registered in the first system (e.g., a wideband system) to enter a communication mode, detects paging monitoring in the second system (e.g., the narrowband system) (or another RAT different from the registered RAT), the BS may directly indicate the system (from among narrowband or wideband systems) or RAT to be used for the subsequent operation of the UE, or may pre-configure the system or RAT scheduled to operate (i.e., transmission/reception) after detection of such paging upon entering the RRC idle mode. In addition, the UE may desire to perform the subsequent operation in another RAT different from the system or RAT having received such paging message. In this case, the UE may directly receive the instruction message through such paging, or may inform the BS of the above-described situation when performing random access in the predetermined system or RAT. That is, in random access Msg.1 or Msg.3 or in a process of transmitting UL signals/channels after the random access Msg.1 or Msg.3, the UE may request a desired system or RAT scheduled to operate in the subsequent process from the BS. If the UE requests the scheduled system or RAT from the BS, the BS may accept a UE request by additionally providing information required for the corresponding RAT.

In the above-described proposal, when the UE, which has registered in the second system (e.g., a narrowband system), performs operation of the first system (e.g., the wideband system) to implement measurement of a specific purpose (e.g., paging channel monitoring or mobility management), the UE may not support the level of more than complexity (e.g., transmission of the UE, reception (Rx) bandwidth, the number of transmission (Tx) antennas, and/or the number of Rx antennas) required by the second system (e.g., a narrowband system). For example, when the UE operates for PO (paging occasion) in the first system (e.g., wideband system), as many reception (Rx) antennas as the number of UEs requested or used by the second system (e.g., the narrowband system) can still be used. Alternatively, the above-described operation can also be allowed only for the UE capable of supporting complexity (e.g., transmission of the UE, reception (Rx) bandwidth, the number of Tx antennas, and/or the number of Rx antennas) required by the first system (e.g., wideband system).

As described above, the different RAT or different system may refer to LTE, NR, (e)MTC, NB-IoT, NR-light system, or the like. Alternatively, when different repetition levels (or different numbers of repetitions) for supporting different coverages are supported to transmit the paging channel and the repetition level (or the number of repetitions) or operation to be applied to the subsequent channel transmission/reception is changed after reception of such paging channel, the operations having different repetition levels (or different numbers of repetitions) in the same RAT or system are regarded as operations of different RATs or systems, and the above-described operation and proposal can be applied to the resultant operations.

In addition to the above-described proposal (1) or independently from the above-described proposal (1), the non-BL UE operating in the CE mode is requested such that the non-BL UE has to acquire information such as ETWS (earthquake and tsunami warning system)/CMAS (commercial mobile alert system) by additionally receiving a channel such as a common search space (CSS) but not a UE-specific search space (USS) in the RRC connected mode, prioritization rules or the like between search spaces that should be received and monitored by the UE may be required. The following methods may be used for such prioritization rules. In addition to the above-described proposal or independently from the above-described proposal, the non-BL UE operating in the CE mode is requested such that the non-BL UE has to acquire information (e.g., paging channel reception) such as ETWS (earthquake and tsunami warning system)/CMAS (commercial mobile alert system) by additionally receiving a channel such as a common search space (CSS) but not a UE-specific search space (USS) in the RRC connected mode, prioritization rules or the like between search spaces that should be received and monitored by the UE may be required. The following methods may be used for such prioritization rules.

(2) When the UE attempts to receive the second search space (e.g., a specific CSS but not a search space (e.g., USS) that the UE should basically attempt to receive/detect data for receiving unicast data in the connected mode), an additional gap in which the UE cannot basically receive the search space (e.g., USS) in which the UE should attempt to perform reception/detection so as to receive unicast data in the connected mode, can be configured.

The operation in which the UE attempts to receive/detect a search space (or the UE attempts to receive/detect a specific (control) channel in the search space) may refer to a monitoring operation. The UE can receive gap configuration information related to the search space (or monitoring of the search space) from the BS. The gap configuration information may indicate a gap (or gap duration), and the gap (or gap duration) may be determined based on the gap configuration information received from the BS. The gap configuration information may be received through system information (or system information block (SIB)) or may be received through higher layer signaling (RRC signaling). The gap (or gap period) may be determined on a subframe basis, and the gap configuration information may indicate the number of subframes corresponding to the configured gap (or the configured gap period). Alternatively, when the present disclosure is applied to the NR system, the gap according to the present disclosure may be configured on a slot basis, and the gap information may indicate the number of slots corresponding to the configured gap (or the configured gap period).

(2-1) The corresponding gap period may not be used in the case where the first search space and the second search space are present in one narrowband (NB) at a specific time. That is, the UE receives data from both the first search space and the second search space.

In contrast, the corresponding gap period can be used in the case where the first search space and the second search space are present in different narrowbands (NBs) at a specific time. In this case, the UE may attempt to receive/detect the second search space at a specific time, and may not receive/detect the first search space not only at the specific time, but also in the configured gap period. (Alternatively, the UE may postpone reception/detection of the first search space).

(2-2) The corresponding gap period may also be defined as a gap period in which the UE should primarily attempt to receive/detect the first search space and should not attempt to detect the second search space. In this case, the gap period may be applied to reception/detection of the second search space. The UE may primarily attempt to receive/detect the first search space in the corresponding gap period, and may not attempt to receive/detect the second search space in the corresponding gap period (or the UE may postpone reception/detection of the second search space).

(2-3) When PDSCH is scheduled to the subframe/slot that temporally overlaps with the configured second search space, the UE may be allowed in a manner that the UE does not attempt to receive/detect the second search space. In this case, the UE may not attempt to receive/detect the second search space in a time period (e.g., subframe or slot) in which the second search space and a PDSCH scheduled period overlap with each other, may postpone or skip over such reception/detection of the second search space in the time period. In contrast, the UE may receive a scheduled PDSCH in the time period that overlaps with the second search space.

(2-4) If the UE is set to a Half-duplex FDD (Frequency Division Duplex (HD-FDD) UE, the above-described operation can also be applied to the case in which a PDSCH scheduled from DCI (downlink control information) or a PDSCH associated with DCI is a PUSCH, PRACH, or PUCCH without change. For example, when the UE serves as the HD-FDD UE (or when the UE is configured to operate as the HD-FDD UE), or when the PUSCH is scheduled to a subframe/slot that temporally overlaps with the configured second search space (or when the UE transmits the PUSCH in the overlapped subframe/slot), the UE may be allowed in a manner that the UE does not attempt to receive/detect the second search space in the overlapped time period (or subframe/slot). Thus, in a time period (e.g., a subframe or slot) in which the second search space and a PUSCH scheduled period (or a PUSCH transmission period) overlap each other, the UE may not attempt to receive/detect the second search space, and may postpone or skip over such reception/detection of the second search space. In contrast, the UE can transmit the scheduled PUSCH in the time period that overlap with the second search space.

In another example, when the UE serves as the HD-FDD UE (or when the UE is configured to operate as the HD-FDD UE), or when PRACH transmission is configured in a subframe/slot that temporally overlaps with the configured second search space (or when the UE transmits the PRACH in the overlapped subframe/slot), the UE may be controlled not to attempt to receive/detect the second search space in the overlapped time period (or subframe/slot). Thus, in the time period (e.g., the subframe or slot) in which the second search space and the PRACH transmission period overlap each other), the UE does not attempt to receive/detect the second search space, and may postpone or skip over such reception/detection of the second search space. In contrast, the UE can transmit the PRACH in the time period that overlaps with the second search space.

In still another example, when the UE serves as the HD-FDD UE (or when the UE is configured to operate as the HD-FDD UE), or when PRACH transmission is configured in a subframe/slot that temporally overlaps with the configured second search space, the UE may be controlled not to attempt to receive/detect the second search space in the overlapped time period (or subframe/slot). Thus, in the time period (e.g., the subframe or slot) in which the second search space and the PUCCH transmission period overlap each other, the UE does not attempt to receive/detect the second search space, and may postpone or skip over such reception/detection of the second search space. In contrast, the UE can transmit the PUCCH in the time period that overlaps with the second search space.

Although the above-described contents have been disclosed centering upon priority determination of the search spaces, the proposed contents of the present disclosure can also be equally or similarly applied even to priority determination of the control channel (e.g., PDCCH, MPDCCH, or NPDCCH). For example, the gap according to the present disclosure may be configured such that the UE does not attempt to receive/detect the first control channel (for example, a control channel (e.g., PDCCH scrambled with C-RNTI) associated with unicast data reception in the connected mode) while attempting to receive/detect a specific control channel but not the second control channel (for example, a specific control channel (e.g., PDCCH scrambled with P-RNTI) but not a control channel (e.g., PDCCH scrambled with C-RNTI) associated with unicast data reception in the connected mode).

In this case, when the first control channel and the second control channel are configured in one narrowband (NB) within the configured gap period, the gap period of the present disclosure is not applied, and the UE can attempt to receive/detect both the first control channel and the second control channel within the gap period. In contrast, when the first control channel and the second control channel are present in different NBs within the configured gap period, the gap period of the present disclosure can be applied, and the UE does not attempt to receive/detect the first control channel in the configured gap period, and may postpone or skip over such reception/reception of the first control channel. Thereafter, the UE may attempt to receive/detect the second control channel.

Alternatively, the configured gap period can be applied to reception/detection of the second control channel In this case, the UE may primarily attempt to receive/detect the first control channel within the corresponding gap period, or may not attempt to receive/detect the second control channel within the corresponding gap period (or the UE may postpone reception/detection of the second control channel).

In addition, when the PDSCH is scheduled to the subframe/slot that temporally overlaps with a time period in which the second control channel is configured, the UE may be allowed not to attempt to receive/detect the second control channel In this case, the UE does not attempt to receive/detect the second control channel in a time period (e.g., a subframe or slot) in which the second control channel overlaps with the PDSCH scheduled period (or the PDSCH transmission period), and may postpone or skip over reception/detection of the second control channel In contrast, the UE can receive the scheduled PDSCH in the time period that overlaps with the second control channel. If the UE is the HD-FDD UE, the above-described operation can also be applied to the case in which a PDSCH scheduled from DCI or a PDSCH associated with DCI is a PUSCH, PRACH, or PUCCH.

G.2 Selection of CE Level According to UE Types

In MTC, a method for selecting the CE level and a method for configuring the CE mode are as follows.

(1) Selection of CE level
The UE may use CRS-based RSRP (Reference Signal Received Power) as a criteria of the CE level, and an RSRP boundary of each CE level may be configured by the BS.
Channel quality measurement associated values (e.g., RSRQ (Reference Signal Received Power), and SINR (Signal to Interference & Noise Ratio)) instead of the CRS-based RSRP can be used as necessary.
The UE may compare the measured RSRP value with the configured RSRP boundary value, may select the CE level according to the result of comparison, and may start the random access procedure for the configured PRACH resources (e.g., time, frequency, and preamble ID) for the corresponding CE level.
The UE may monitor Msg.2 after transmission of Msg.1, time resources (e.g., a maximum number of repeated transmission times and the position of available subframes) and frequency resources (e.g., the NB (narrowband) position) to be used for monitoring the Msg.2 may be preset in association with the Msg.1 resources transmitted from the UE.
When detecting Msg.2, the UE may transmit Msg.3 according to a UL grant instruction of the corresponding RAR.
After transmission of Msg.3, time/frequency resources (MPDCCH for indicating Msg.3 retransmission or MPDCCH for scheduling Msg.4) to be monitored by the UE can be determined by system information and Msg.2 RAR (random access response).
Time/frequency resources for monitoring the Msg.2 and DL time/frequency resources to be monitored after transmission of the Msg.3 may be defined either as MPDCCH in Type-2 CSS and/or as PDSCH associated parameters. For example, mpdcch-NarrowbandsTo-Monitor and Rmax(mpdcch-NumRepetition-RA) may be configured by SIB2.

(2) Configuration of CE Mode
Until the UE receives configuration information of the CE mode from the BS after completion of network attachment, the UE may determine the CE mode according to the CE level where Msg.1 is transmitted. In this case, CE level 0 and CE level 1 may correspond to CE mode A. The subsequent operation can be performed on the assumption that the remaining CE levels are set to the CE mode B.

In a situation in which the same procedure as described above is applied to the non-BL UE, and when an increase in DL coverage according to 2Rx occurs, when the CE level is selected based on C-RSRP, the number of DL repetitions may be unnecessarily high. In order to overcome the above-described disadvantages, it may be possible to perform other procedures different from those of the general MTC UE by considering the UE types (e.g., the number of reception (Rx) antennas, a reception (Rx) bandwidth, calculation capability, etc.) in the random access procedure. That is, the non-BL UE may perform random access using the following method.

(1) During CE level selection, the RSRP value selected by the UE can be newly defined. Hereinafter, the UE-selected RSRP value will hereinafter be referred to as RSRP.

A. RSRP' used as a reference value for CE level selection in the random access procedure may be different from RSRP used in Radio Resource Management (RRM). That is, RSRP' used as a reference value of CE level selection may consider a method for adding a specific offset to the RSRP that is measured by the UE based on CRS.

B. In this case, the specific offset value may be a parameter that can be set to a non-zero value and can then be assigned only to the non-BL UE. The offset may refer to a value for reflecting Rx signal quality of the UE.

i. Here, the condition in which the offset value can be configured based on the Rx signal quality may be at least the number of Rx antennas to be used in Msg.2 and/or Msg.4 and/or the reception method to be used in Msg.2 and/or Msg.4 ii. If the number of Rx antennas of the UE is set to 1 or more, the specific offset may be a value proportional to the number of antennas or may be set to a specific fixed value (e.g., 3 dB when the number of Rx antennas of the UE is 2).

C. The condition in which the UE can use the proposed RSRP' during CE level selection can be configured/defined as follows. That is, in the following case, RSRP' may be denoted by RSRP+0 (i.e., RSRP'=RSRP+0).

i. The UE may be allowed only in the CE mode A such that the UE can use other values (greater than 0) but not zero '0'.

ii. If the offset value of the RSRP' is set to another value different from zero '0', this value can be allowed only when the CE mode is not changed. That is, the operation in which CE level 2 or CE level 3 belonging to the CE mode B is changed to CE level 1 or CE level 0 may not be allowed.

iii. In a situation in which Msg.1 is transmitted at the CE level selected based on RSRP, when Msg.1 transmission (Tx) power is equal to or higher than a maximum output power, the operation of applying a non-zero value to the RSRP' offset may be restricted.

iv. If Msg.1 is transmitted at the CE level selected based on RSRP, a difference between Msg.1 transmission (Tx) power and the UE's maximum output power is equal to or less than a specific value, the operation of applying a non-zero value to the RSRP' offset may be restricted.

v. The BS may define a specific reference format. If MPDCCH and/or PDSCH reception (Rx) performance (e.g., BLER (block error rate)) does not satisfy a specific reference based on the corresponding format, the operation of applying a non-zero value to the RSRP' offset may be restricted. In this case, the reference format may include information associated with a specific repetition number of MPDCCH and/or PDSCH, a DCI format, PMI, a code rate, an aggregation level, etc. that can be used to infer/simulate the Msg.2 or Msg.4 reception (Rx) performance.

vi. If Msg.2 is not received within a specific window, if Msg.3 is retransmitted several times within a specific window because the random access procedure is not completed regardless of multiple transmissions of Msg.3, or if Msg.3 needs to be retransmitted in the specific window, the operation of applying a non-zero value to the RSRP' offset may be restricted.

D. The number of antennas used to monitor MPDCCH so as to perform Msg.2 reception, Msg.3 retransmission, or Msg.4 PDSCH scheduling should be equal to or greater than the number of Rx antennas assumed when the CE level is selected.

E. When the UE uses a non-zero value as the RSRP' offset value during CE level selection, the UE has to inform the BS of either the corresponding information (e.g., the offset value used in CE level selection) or the reason (e.g., the number of multiple antennas by which multiple Rx antennas are assumed or used, or the number of multiple antennas by which multiple Rx antennas have been assumed or used) why the offset value used in CE level selection is equal to or greater than zero '0'.

(2) CE level selection for Msg.1 transmission selects the use of one Rx antenna as a criterion and additionally reports the number of Rx antennas of the UE to Msg.3

A. The UE may report that the UE is the non-BL UE at Msg.3. Alternatively, when the UE receives information about the number of available Rx antennas at Msg.3. In this case, the number of available Rx antennas may be the number of antennas to be used in downlink reception after Msg.3. When receiving MPDCCH (MPDCCH in type2-CSS) in Type 2-CSS, the number of available Rx antennas should be set to at least the number of Rx antennas reported at Msg.3. Thus, in a subsequent process, the UE may operate in a different way from the MTC UE that is designed based on a single Rx antenna.

i. The maximum number (Rmax) of repeated transmissions of Type 2-CSS MPDCCH and/or the aggregation level (AL) may be interpreted differently according to UE reception capability reported to Msg.3 to which a value configured for the legacy MTC UE is reported by the UE.

ii. Whereas the maximum number (Rmax) of repeated transmissions of Type 2-CSS MPDCCH and/or the aggregation level (AL) are identical to those of the legacy MTC UE, the maximum number of repeated transmissions of PDSCH (e.g., corresponding to Msg.4) can be reconfigured in MPDCCH. That is, at this time, UE information may be interpreted differently according to the maximum number of repeated transmissions in which information indicating repeated transmission of PDSCH scheduled in the MPDCCH is reconfigured. The reconfigured maximum number of repeated transmissions and the reconfigured maximum number of repeated transmissions of the scheduled PDSCH can be transmitted in the same MPDCCH.

iii. When Contention Resolution (CR) is achieved by successful completion of the random access procedure, the UE may interpret predetermined MPDCCH and/or PDSCH parameter values in different ways according to UE reception (Rx) capability (e.g., the number of Rx antennas) reported to Msg.3.

G.3 Method for Changing UE Type

Assuming that the Non-BL UE or the MTC UE uses at least two Rx antennas, the operation and configuration (i.e., parameters configured by the BS in consideration of the number of multiple Rx antennas of the UE) based on the above assumption can be applied differently according to RRC states.

For example, the UE operation on the assumption of the use of multiple Rx antennas may be valid only in the RRC connected state. In the RRC idle state, the operation and configuration on the assumption of the use of one Rx antenna may be used. This is because the UE prefers the single Rx antenna operation so as to implement power saving in the RRC idle state. To this end, the UE has to report reception (Rx) performance needed for the case of using only one antenna to the BS. In this case, the reception (Rx) performance based on the use of the single antenna may include a CE level, RSRP (Reference Signal Received Power)/RSRQ (Reference Signal Received Power), a CE mode, the number of MPDCCH repetition times (i.e., the number of repeated transmissions of MPDCCH required to satisfy a specific BLER (Block Error Rate). Measurement reference resources for inducing the above-described information may also be configured by the BS. That is, differently from the existing measurement reference resources required to measure the downlink (DL) channel quality, measurement reference resources for measuring the downlink (DL) channel quality according to the number of Rx antennas may be newly configured, and this new configuration may be irrelevant to the RRC state. If the UE desires to perform the operation based on multiple Rx antennas in the RRC idle mode, the above-described information report may be omitted. In addition, if the number of Rx antennas is changed in the RRC idle mode (e.g., when the condition of multiple Rx antennas is changed to the condition of single Rx antenna, or when the condition of single Rx antenna is changed to the condition of multiple Rx antennas), such change request may be performed through the random access procedure, and the BS may separately configure Msg.1 resources for the change request as needed.

In the above-described proposal, the measurement reference resource configuration and the Rx antenna change according to the number of Rx antennas may be respectively generalized to the measurement reference resources configuration and the Rx technique change that are required to measure/estimate the DL channel quality or the Rx performance A detailed description of the generalized results is as follows.

(1) The BS may additionally configure measurement reference resources required to measure/estimate/report reception (Rx) performance according to UE reception techniques. The measurement reference resources may be configured independently for each reception (Rx) technique. Alternatively, information (e.g., information corresponding to DL channel quality) for each reception (Rx) technique in one measurement reference resource can be measured and reported independently. Information reported for each reception (Rx) technique may be reported only for the above-described reported information and differential value.

(2) In this case, information about reception (Rx) quality may include repetition numbers of MPDCCH and/or PDSCH, CQI, PMI, etc.

(3) the BS may transmit, to the UE, a request for changing the reception (Rx) method, and the UE may reject the request from the BS. In addition, the UE may transmit, to the BS, a request for changing the reception (Rx) method to another method desired to be used by the UE. In addition, the UE may transmit a request for changing the reception (Rx) method to another to the BS, and the BS may accept or reject the request from the UE.

A. When the UE transmits such a request to the BS, the existing reception (Rx) method should be maintained until the UE implicitly or explicitly receives an acceptance response from the BS.

B. When the UE requests or accepts change of the reception (Rx) method, the reason why the reception (Rx) method change is needed can be signaled for the BS. This operation may affect subsequent operations expected by the UE when the request is accepted. The subsequent operations to be affected are as follows (i), (ii), and (iii).

i. If productivity (yield) improvement is the reason for the reception (Rx) method change, it can be expected that rank and/or PMI information be contained in DCI or expression range be increased, and it can be determined that rank and/or PMI information be contained in downlink channel quality report information or expression range be increased.

ii. If coverage increase is the reason for the reception (Rx) method change, the Rmax value of MPDCCH and/or PDSCH or the expression range of such repetition number may be changed. Thus, a method for interpreting DCI may be changed. In addition, the expression range of the measurement value reported by the UE may be defined/configured differently.

iii. If power reduction is the reason of the reception (Rx) method change, the Rmax value of MPDCCH and/or PDSCH or the expression range of such repetition number may be changed. Thus, a method for interpreting DCI may be changed. In addition, the measurement and report cycle of the UE may be changed, or the expression range of such measurement report may be defined/configured differently.

(4) A method for requesting the change of reception (Rx) method is as follows.

A. The above-described requesting method may be performed through PRACH resources.

B. The above-described requesting method may be performed through Scheduling Request (SR) resources.

C. The above-described requesting method may be performed through Sounding Reference Signal (SRS) resources.

D. In other words, the reason for PRACH transmission, SR transmission, and SRS transmission may also be caused by the change of such reception (Rx) method.

(5) If the reception (Rx) antenna change from among various reception (Rx) method information of the UE is requested, a current procedure may be changed to another procedure according to the number of conventionally used antennas.

A. Assuming that the condition of a single reception (Rx) antenna is changed to the condition of multiple reception (Rx) antennas, if the reason why the condition of a single reception (Rx) antenna is changed to the condition of multiple reception (Rx) antennas is to receive one or more MIMO layers or to implement higher throughput, the UE should transmit, to the BS, a request for changing the number of reception (Rx) antennas and the purpose of such request. That is, in order for the BS to schedule one or more MIMO layers, to configure CSI-RS appropriate for the scheduled MIMO layer, or to request CSI information report, if there is a need to change information such as DCI configuration, the UE should report/request such necessity information to the BS.

B. In the above-described procedures, until the BS receives an acceptance message about the request (this is requested by the BS and/or by the UE) for changing the number of reception (Rx) antennas, both the BS and the UE should follow the operation executed on the assumption of the previous number of reception (Rx) antennas. That is, prior to operation of the UE and the BS, the UE and the BS have to assume that all operations associated with DCI configuration/interpretation and measurement report are equal to previous operations either until the request for changing the number of reception (Rx) antennas is accepted or during a predetermined time after acceptance of the changing request. In this case, the method for accepting the request for changing the number of reception (Rx) antennas may be considered explicit or implicit. If the request acceptance method is the implicit method, MPDCCH-associated Rmax may be newly configured, or PDSCH-associated TM (Transmission Mode), Rank, CSI feedback mode, Rmax, etc. may be newly configured.

G.4 the Number of Available Reception (Rx) Antennas Per Channel

The UE can operate by assuming that different numbers of reception (Rx) antennas are used according to DL channels, and the BS may schedule the corresponding channel in consideration of such situation.

(1) Type 1-CSS: This means an MPDCCH search space used for update notification of paging and system information, and PDSCH scheduled with the corresponding MPDCCH.

A. Whether to use 2Rx antennas may be one of implementation issues. Even if the CE level is selected using multiple reception (Rx) antennas in the RRC connected mode or the use of multiple reception (Rx) antennas is configured in the RRC connected mode, reception of a Type 1-CSS associated channel may be configured by assuming the use of single reception (Rx) antenna.

(2) Type 2-CSS: This means an MPDSCCH search space used in random access procedure, and an PDSCH scheduled with the corresponding MPDCCH.

A. The number of reception (Rx) antennas assumed for Msg.4 monitoring may be different from either the number of reception (Rx) antennas used for Msg.2 monitoring or the assumed number of reception (Rx) antennas for Msg.2 monitoring. In addition, the number of reception (Rx) antennas assumed for Msg.4 monitoring may also be different from the number of reception (Rx) antennas assumed for CE level selection.

(3) USS and Type 0-CSS scrambled with C-RNTI, SPS-C-RNTI, and TPC-PUCCH-RNTI

A. MPDCCH and PDSCH parameters (e.g., csi-NumRepetitionCE, mpdcch-NumRepetition, pdsch-maxNumRepetitionCEmodeA, and pdsch-maxNumRepetitionCEmodeB) can be configured in consideration of the number of reception (Rx) antennas of the UE. A plurality of configuration values may be configured according to the number of reception (Rx) antennas. Alternatively, the above-described parameters can also be interpreted differently according to the number of reception (Rx) antennas that actually use only one configuration acquired by assuming the reference number of reception (Rx) antennas (e.g., the number of single reception (Rx) antenna). In addition, DCI format and/or size in a first case achieved on the assumption of one reception (Rx) antenna may be different from DCI format and/or size in a second case on the assumption of multiple reception (Rx) antennas. In addition, DCI can be interpreted differently according to the first and second cases. In this case, DCI may be set to the same value in UL grant, regardless of the number of UE reception (Rx) antennas. Different formats, different sizes, and/or different interpretations according to the number of UE reception (Rx)

antennas may be allowed or used either only for DL grant and/or only for CSI feedback associated information. For example, a field indicating how many times the DL grant have been repeated may be smaller in size by N bits (e.g., 1). The corresponding N bits may be used to extend Rank Indicator (RI) and/or PMI information.

(4) Type 0-CSS: This means a search space to which DCI for uplink power control is transmitted, and a search space in which MPDCCH is scrambled with TPC-PUCCH-RNTI.

A. DCI format, size, and/or interpretation for indicating UL power control may be defined not to be affected by the number of reception (Rx) antennas of the UE.

G.5 The measurement and report operation according to the number of reception (Rx) antennas of the UE.

The UE/BS operations associated with the present disclosure will hereinafter be described as follows.

First, the UE may receive configuration information associated with measurement from the BS.

The UE may perform measurement using a reference signal (RS) required for such measurement on the basis of the received configuration information.

The UE may report information of such measurement to the BS on specific resources.

Thereafter, the BS may transmit configuration information associated with measurement to the UE.

The BS may receive measurement information from the UE on specific resources.

The number of reception (Rx) antennas used in Radio Link monitoring (RLM) may be assumed/defined differently.

(1) In order to discriminate between In-sync and Out-of-sync, it can be determined that the number of Rx antennas assumed for In-sync be different from the number of Rx antennas assumed for Out-of sync. Alternatively, when the Out-of-sync operation has occurred a predetermined number of times (e.g., once), the UE designed to use multiple Rx antennas has to count the number of Out-of-sync operations as well as to check In-sync, such that there is a need for the UE to always perform RLM using multiple Rx antennas. In addition, when RLM is performed using multiple Rx antennas, a reference DCI format/size for discriminating In-sync and Out-out-sync can be defined/applied in a different way from the case in which the reference DCI format/size uses only one Rx antenna.

(2) Measurement reference resources for acquiring channel state information (CSI) may be defined differently depending on the number of Rx antennas.

A. For example, when using multiple Rx antennas or when supporting Rank 2 or more, CSI measurement reference resources/signals may be configured to use CSI-RS rather than CRS. In this case, when the CSI-RS is configured, a specific rule may be defined such that there is no confusion in resource mapping between MPDCCH and PDSCH.

i. For example, MPDCCH and/or PDSCH rate matching can be performed by assuming that CSI-RS transmission is not expected or CSI-RS is not present in resources (e.g., MPDCCH and/or PDSCH) shared with other users. Alternatively, it is assumed that CSI-RS transmission is expected and MPDCCH and/or PDSCH are punctured by CSI-RS in the corresponding RE, and reception operation of data can be performed.

ii. Terms, such as rate matching, puncturing, and dropping, used in the present disclosure can be interpreted as having the same meaning.

iii. It is expected that a channel (MPDCCH and/or associated PDSCH) associated with USS (UE-specific search space) transmits the configured CSI-RS, and rate matching for resource elements (REs) other than CSI-RS RE can be expected.

(3) If it is assumed that the UE uses multiple Rx antennas or if the condition of multiple Rx antennas used by the UE is configured, a measurement gap of the multiple Rx antennas may be shorter than that of the single Rx antenna. In addition, if the UE assumes multiple Rx antennas so that a short measurement gap is configured in the UE, it may be determined that the resource mapping method for MPDCCH and/or PDSCH in the measurement gap period has been postponed differently from the legacy resource mapping method. In the legacy resource mapping method, it is assumed that MPDCCH and PDSCH can be repeatedly transmitted and can be counted during the measurement gap period, but are dropped in the measurement gap period.

(4) The measurement gap may refer to a period in which the UE performs measurement. In this measurement period, UL and DL transmission may not be scheduled.

(5) The UE may receive RRC signaling including the measurement gap, and may measure a specific signal based on the measurement gap.

(6) The measurement gap may be configured in a frequency band different from an active BWP through which the UE can transmit and receive signals. In this case, the UE may perform measurement for the measurement gap through RF retuning (or frequency band switching)

(7) If the UE performs RF retuning, a time consumed to switch or reconfigure the RF may be additionally defined or configured.

G.6 Resource Mapping of MPDCCH/PDSCH when CSI-RS is Configured

In the case of the non-BL UE, measurement reference resources/signals for CSI acquisition may be set to CSI-RS. In this case, a detailed description of associated UE operations and resource mapping are as follows.

(1) Whereas CE level selection is performed based on CRS-based RSRP (Reference Signal Received Power), MPDCCH and/or PDSCH resource configuration (e.g., Rmax, NB, resource allocation type, etc.) can be changed depending on CSI-RS measurement after measurement report has been performed based on CSI-RS.

(2) In a situation where MPDCCH and/or PDSCH are repeatedly transmitted, if CSI-RS is included in some resources between the repeated time/frequency resources, puncturing or rate matching can be performed assuming that CSI-RS is contained in the repeatedly transmitted MPDCCH and PDSCH resources. Here, the reference of puncturing or rate matching may vary depending on whether the corresponding resources are shared with other UEs. For example, when the corresponding resources are shared with other UEs, resource mapping assuming that puncturing or CSI-RS transmission are not performed can be applied. In addition, if the number of CSI-RS ports is higher than a specific value or if the CSI-RS transmission period is shorter than a specific value, MPDCCH and/or PDSCH rate matching can be applied in consideration of CSI-RS RE (Resource Element).

(3) In time/frequency resources for CSI-RS transmission, MPDCCH and/or PDSCH resource mapping may be different from those of the exemplary case in which CSI-RS is not transmitted. To this end, CSI-RS configuration information should be shared by all UEs designed to use time/frequency resources through which CSI-RS is transmitted. To this end, even when the UE does not support CSI measurement based on CSI-RS, the UE may require CSI-RS configuration information. The above-described operation can be implemented through RRC configuration or can be implemented by enabling a DCI for PDSCH scheduling to indicate the presence or absence of CSI-RS in the corresponding resources. That is, even when the BS does not request CSI measurement based on CSI-RS from the UE, it is necessary to perform RRC signaling and/or DCI signaling so that CSI-RS RE can be considered in resource mapping. If the corresponding information is given, UE interpretation may indicate that MPDCCH and/or PDSCH has been punctured or has been rate-matching processed at the position of CSI-RS RE in MPDCCH and/or PDSCH resource mapping processes. Such UE operation such as puncturing and rate-matching may be interpreted differently depending on various information, for example, the number (i.e., the number of actual repeated transmissions or a predetermined maximum number of repeated transmissions) of repeated transmissions of MPDCCH and/or PDSCH, a CSI-RS transmission period (e.g., the ratio of CSI-RS transmission resources within a specific time period), information about the corresponding resources are shared with other UEs, and the like. For example, if resources are determined to be resources shared with other UEs, the UE operation may be interpreted as the puncturing operation. If resources are determined to be resources limited to a specific UE group or to the UE, the UE operation may be interpreted as the rate matching operation. If the number of repeated transmissions is less than a specific number of repeated transmissions, the UE operation can be interpreted as rate matching (or puncturing) and the like.

Similar to the above-described proposal, the resource mapping relationship among CSI-RS, MPDCCH, and PDSCH can also be configured as follows.

Resource mapping of CSI-RS and MPDCCH (1) In all or some subframes from among the MPDCCH search space, CSI-RS is not expected. RE (resource element) used as CSI-RS in LTE EPDCCH may be processed as rate-matching in the EPDCCH resource mapping process. When deciding an ECCE aggregation level ($n_{EPDCCH}$ is counted at $n_{EPDCCH}$<104 of CASE-1 at clause 9.1.4 of 3GPP TS 36.213), such calculation may be performed without including CSI-RS RE. In contrast, the RE used as CSI-RS in MPDCCH may be punctured in the MPDCCH resource mapping process, and CSI-RS RE may be included in the process of deciding the ECCE aggregation level. This is because the MTC UE cannot correctly recognize the presence or absence of CSI-RS by failing to receive the CSI-RS configuration. However, assuming that the non-BL UE can understand the CSI-RS configuration (i.e., the non-BL UE can receive associated configuration information from the BS) when operating in the CE mode, CSS and USS are distinguished from each other, such that it can be determined whether CSI-RS RE will be punctured or rate-matching processed for MPDCCH resource mapping. In addition, information on whether CSI-RS RE will be included in the process of determining the ECCE aggregation level may be changed as needed. Based on the above-described operation, a simple example is as follows.

① In Type 0, Type 1, and/or Type 2 CSS, CSI-RS transmission is not expected. In order to determine the ECCE aggregation level when CSI-RS transmission is expected, the number of resource elements (REs) for CSI-RS transmission can also be counted so that the number of resource elements (REs) used in MPDCCH transmission is counted.

② In MPDCCH search space associated with C-RNTI, SPS-C-RNTI, TPC-PUCCH-RNTI and/or TPC-PUSCH-RNTI (for example, CRC is scrambled with the corresponding RNTI), CSI-RS transmission is expected.

In this case, when calculating the number of resource elements (REs) used for MPDCCH transmission so as to determine the ECCE aggregation level, resource elements (REs) transmitted based on CSI-RS are not counted.

In addition, as shown in the above-described proposal, information about whether the CSI-RS RE will be considered in the resource mapping relationship between MPDCCH and CSI-RS and in the aggregation level determination may be changed according to Rmax (i.e., the maximum number of repeated transmissions) within the corresponding search space of the MPDCCH. For example, if Rmax is higher than a specific value, MPDCCH may be punctured for CSI-RS RE, and CSI-RS may be included in the number of resource elements (REs) considered in the aggregation level determination.

Resource mapping of CSI-RS and PDSCH (1) In association with PDSCH (e.g., the PDSCH is scheduled or induced from MPDCCH scrambled with C-RNTI or SPS-C-RNTI) desired to be received by UE(s) having understood the CSI-RS configuration, if CSI-RS transmission of the PDSCH is reserved in the corresponding resources, it can be expected that PDSCH other than resource elements (REs) used for CSI-RS transmission be rate-matched and then transmitted.

① If PDDSCH is repeatedly transmitted over several subframes, and if PDSCH resources in which CSI-RS transmission is reserved and other PDSCH resources in which CSI-RS transmission is not reserved are present between the repeatedly transmitted subframes, whereas the reserved CSI-RS transmission can be expected, it can be expected that some resource elements (REs) of PDSCH be punctured by CSI-RS. At this time, it can be expected that puncturing caused by CSI-RS does not occur in the PDSCH resources in which CSI-RS transmission is not reserved.

② Specifically, information about whether the PDSCH will be rate-matched or punctured for resource elements (REs) used for CSI-RS transmission may be determined differently according to PDSCH transmission methods.

For example, if PDSCH repetition transmission is less than a specific value or if CSI-RS transmission is reserved for all PDSCH resources used in PDSCH repetition transmission, rate matching can be applied. Here, information about whether CSI-RS transmission is reserved in PDSCH repetition transmission may also be restricted to a Redundancy Version (RV) unit. That is, when RV is changed in such repeated transmission, and when CSI-RS transmission is reserved only in some PDSCH resources between the entire repeated transmission sections, assuming that information about whether CSI-RS transmission is performed is considered constant in the subframe in which the same RV is continuously transmitted (based on BL/CE DL subframe), a method different from those of other sections of PDSCH repetition transmission can be applied to the corresponding section.

In another example, rate-matching or puncturing of PDSCH can be applied differently according to PDSCH transmission modes (TMs). In particular, when a transmit (Tx) diversity scheme using RE groups is used (e.g., TM2, SFBC(Space Frequency Block Coding), or FSTD (Frequency Shift Transmit Diversity)), the operation method may be fixed to a specific scheme according to other conditions without selectively using rate-matching or puncturing. In the case where puncturing is applied, the RE group constructing the transmit (Tx) diversity scheme is incompletely received, such that unexpected limitations may occur. In the case where rate-matching is applied, the distance between the RE groups constructing the transmit (Tx) diversity scheme is too long such that performance degradation caused by channel change within the RE group may occur.

G.7 Resource Configuration According to UE Types

MPDCCH and/or PDSCH resource configurations (e.g., Rmax) may be changed according to UE types (e.g., the non-BL UE, the general MTC UE, or the number of Rx antennas of the UE). Such information may be configured through a higher layer message (e.g., RRC). Alternatively, after a plurality of resource sets is configured for each UE type through a higher layer message, a specific configuration in the corresponding set may also be indicated based on DCI (or based on MAC (Medium Access Control) CE (Control Element)).

(1) Rmax for each TM (Transmission Mode) may be configured independently. In this case, the term "independent" may conceptually include other irrelevant cases. Even when different values are allocated to Rmax, such independent concept can be applied to Rmax.

A. When the TM is changed, the UE may change MPDCCH and/or PDSCH configurations to the Rmax value configured for the corresponding TM. Alternatively, the Rmax value (that is scaled based on the actual Rmax value or the reference TM) to be used in the corresponding TM may be reconfigured for the UE.

B. If a fallback TM is defined to be used irrespective of the UE types, or if a fallback TM is defined as a TM to be used in the case in which a specific event occurs, the Rmax value to be used in the corresponding fallback TM may be configured independently. In addition, the fallback TM may also be used as the reference TM when Rmax of another TM is configured.

C. In this case, the Rmax value of MPDCCH and the Rmax value of PDSCH may be different from each other.

(2) Rmax for each rank can be configured independently. In this case, the term "independent" may conceptually include other irrelevant cases. Even when different values are allocated to Rmax, such independent concept can be applied to Rmax.

A. PDSCH Rmax can be changed according to Rank of PDSCH scheduled in MPDCCH. The corresponding Rmax may be scaled on the basis of the conventionally configured PDSCH Rmax (based on 'Rank 1'), or may be preconfigured for Rank 2.

B. PDSCH Rmax can be changed according to Rank reported by the UE. The corresponding Rmax may be scaled on the basis of the conventionally configured PDSCH Rmax (based on 'Rank 1'), or may be preconfigured for Rank 2.

(3) The UE may expect MPDCCH and/or PDSCH resource associated information (e.g., Rmax, DCI format/size, DCI field configuration, TM, etc.) in different ways according to the previously reported CSI information (e.g., RI, PMI, CQI, etc.) and/or the previously scheduled PDSCH information (e.g., RI, TM, etc.).

(4) The Rmax value newly expected in the above-described proposal can be applied to the method for changing the actual Rmax value, and can also be applied to another method in which the configuration and state of the actual repetition number capable of being expected in DCI according to the Rmax value are interpreted differently.

G.8 Reception (Rx) Mode Request of UE

When the non-BL UE operates in the CE mode, the non-BL UE may directly request its own Rx mode (e.g., the number of reception (Rx) antennas, the reception (Rx) bandwidth, the reception technique, etc.) from the BS, or may receive information indicating the reception mode from the BS. The above-described operation is not limited to the non-BL UE, and can also be applied to other cases in which the UE supports at least a minimum reception mode requested by the corresponding system (i.e., implementation/operation which is generally considered to be more complex than the minimum reception mode implementation/operation).

(1) The UE requests and configures the reception mode when switching from the RRC connected mode to the idle mode.

In the process of entering the RRC idle mode, the UE may transmit, to the BS, a request for performing transmission/reception in the RRC idle mode different from the reception mode operating in the RRC connected mode. When the BS accepts the request from the UE, the BS may configure transmission/reception (Tx/Rx) associated parameters considering the reception mode of the UE. If the UE desires to operate in the reception mode (e.g., when the number of Rx antennas and/or the reception bandwidth is reduced) in which it is expected that DL reception performance degradation worse than the reception mode operating in the RRC connected mode will occur, the UE has to undergo the above-described request and acceptance procedures. If the request is accepted, the Tx/Rx associated parameters required for the RRC idle mode are not directly indicated, and such parameters may be indirectly configured in the UE according to a difference between performance level acquired before/after the reception mode is changed. For example, when the UE operating with two Rx antennas switches to operate with only one Rx antenna in the RRD idle mode, the UE may recognize (or interpret) a maximum number of repeated transmissions of the paging channel to be double that of the maximum number of repeated transmissions of the paging channel by assuming 3 dB reduction of the reception performance.

(2) The UE requests and configures the reception mode when switching from the RRC idle mode to the connected mode.

When the UE switches from the RRC idle mode to the connected mode, the UE may report the reception mode associated information to the BS in the initial random access procedure, or may transmit a request for changing the reception mode to the BS in the initial random access procedure. However, until the associated request is accepted or before the UE enters the RRC connected mode (e.g., the UE receives UE-specific RRC configuration information or reports an ACK (Acknowledgement) message to the BS after receiving the UE-specific RRC configuration information), the reception mode can remain unchanged.

(3) The UE requests and configures the reception mode in the RRC connected mode.

The reception mode change of the UE may also be indirectly indicated through the transmission mode change of the BS, the rank change, or the like. In addition, the method for requesting the reception mode change by the UE may be implemented not only by directly messaging an associated request, but also by changing the rank in the CSI report process. In this case, the method for accepting the reception request change may be implemented by the BS designed to change a current transmission mode to another transmission mode associated with the corresponding rank, or may be implemented by the BS designed to use the downlink schedule associated with the corresponding rank.

G.9 CSI-RS Configuration for Non-BL UE Operating in CE Mode

The non-BL UE operating in the CE mode may basically transmit and receive the same channel as in the MTC UE (BL/CE UE). Therefore, backward compatibility with the legacy MTC UEs is one of the important consideration factors. To this end, the CRS-RS configuration method may be different from that of the legacy LTE. For example, the CSI-RS referenced by the non-BL UE may be a signal that is transmitted in the cell for the LTE UEs. The non-BL UE may receive an additional configuration so that the non-BL UE can understand configuration information of the CSI-RS that is being transmitted. In this case, the CSI-RS is transmitted not only for CSI measurement, but also for LTE UEs, such that the CSI-RS may be a reference configuration value by which the corresponding resource element (RE) can be ignored during MPDCCH/PDSCH decoding.

In addition, the CSI-RS may be configured in a manner that two or more UEs can receive all of the corresponding information in a cell common mode, a CE level common mode, or a CE mode common mode. As a result, in association with the UE that does not directly perform CSI measurement based on CSI-RS, PDSCH can be rate-matched to resource elements (REs) other than a resource element (RE) used as CSI-RS on a specific PDSCH.

If CSI measurement based on CSI-RS is required, CSI-RS transmission may be configured or defined only when the PDSCH scheduling is limited to a specific condition. This is because CSI-RS based CSI measurement requests a much higher SNR (Signal-to-Noise Ratio). Here, the specific condition may indirectly indicate a high SNR section. For example, the specific condition may be restricted to any one of various cases, for example, a case in which the CE mode is set to A, a case in which the CE level is set to 0 or 1, a case in which 64QAM scheduling is configured, a case in which Rank 2 or more is configured, a case in which a modulation order of the previously scheduled PDSCH or a code rate is set to a specific value and is generated at least N times, and a case in which the ACK rate is higher than a specific value within the corresponding section.

G.10 Downlink Transmission of Rank 2 or More

The non-BL UE operating in the CE mode may receive a PDSCH of Rank 2 or more according to UE capability such as the number of antennas of the corresponding UE. In this case, rank adaptation and TM (Transmission Mode) adaptation may be required. Specifically, during TM adaptation, the UE is required to always perform blind detection about the fallback DCI (e.g., DCI format 1A) so that the UE can perform fallback scheduling using Space Frequency Block Coding (SFBC) or Frequency Shift Transmit Diversity (FSTD) at TM1 or TM2 even when a semi-statically configured TM is present in LTE. However, in the MTC, blind detection of only one DCI format is performed at a specific time according to the configured TM, so that there is a disadvantage in that the fallback TM cannot be dynamically used. In order to address the above-described issues, the following method is proposed.

Information indicating a fallback TM and/or rank may be included in DCI information supporting Rank 2. This means a format achieved when a field such as a fallback flag is defined and added in DCI. Alternatively, the CE-mode non-BL UE in which a TM corresponding to Rank 2 is configured or monitoring of DCI for Rank 2 is configured, may be required to attempt to perform blind detection about both a Rank 2 DCI and a fallback DCI (e.g., Rank 1 or DCI for scheduling TM1/TM2) at a specific time. In this case, the fallback DCI may be considered valid only within the scheduled PDSCH, and the independent MPDCCH may also be irrelevant to such fallback DCI.

In the case where Rank 2 is supported or CSI (CQI and/or PMI) based on Rank 2 is reported, an RCSI value used in CSI reference resources may be additionally defined. The RCSI value may be RCSI (this is csi-NumRepetitionCE, and RCSI associated contents are written in clause 7.2.3 of TS36.213) defined for the legacy BL/CE UE, or may be additionally configured as necessary. Since PDSCH based on Rank 2 is used in a high SNR region, the reference number of repeated transmissions of the PDSCH performance that is contained in CSI reference resources or is represented by CSI may be lower than a conventional value.

In addition, since the MTC is a system characterized in repeated transmission, PDSCH based on Rank 2 can also be repeatedly transmitted. In this case, the repeatedly transmitted PDSCH may enable the codeword-to-layer mapping relationship and/or the layer-to-antenna port mapping relationship to be changed in units of a specific subframe. Such PDSCH may be changed depending on frequency hopping as needed. In this case, a specific subframe unit may be an integer multiple of either a redundancy version (RV) or a frequency hopping interval (i.e., the number of subframes continuously transmitted in the same narrow band (NB) in the frequency domain or the number of subframes corresponding to the continuously transmitted subframes). In this case, the mapping rule may also be denoted by permutation, and can be used to acquire spatial diversity gain between MIMO layers.

In the case of supporting Rank 2 or more, a rank indicator (RI) field (for indicating the number of ranks) may be present in DCI (DL grant) scheduling a downlink shared channel A specific filed contained in the corresponding DCI may be interpreted differently according to the value of the corresponding field. For example, a Transport Block Size (TBS) and a Modulation and Coding Scheme (MCS) may exist. Since the SNR and the data rate may be high in a process for supporting spatial multiplexing, a relatively low TBS and a relatively low MCS are unnecessary. As a result, the corresponding field is re-interpreted so that an increase in DCI size can be minimized. For example, TBS and MCS may also be defined as new values. Alternatively, in the case where a specific state is not used (e.g., a low-range value), the corresponding state or some bits may be reinterpreted for other purposes. In addition, if the RI value is not set to 1, the specific field may be utilized for other purposes. For example, the field indicating the on/off states of frequency hopping may always be interpreted as the OFF state, and the corresponding field may be utilized for other purposes.

G.11 Parameter Reconfiguration According to Reception Modes

If the non-BL UE operating in the CE mode reports, to the BS, information indicating that some reception functions available in a normal mode can also operate in the CE mode or is ready to operate in the CE mode, the BS may separately add or reconfigure a maximum number of repeated transmissions of MPDCCH and/or PDSCH, and/or the actual maximum number of repeated transmissions capable of indicating a maximum number of repeated transmissions using the DCI, and may then inform the UE of the added or reconfigured information. For example, the reception methods (for example, MRC, MMSE-IRC, eMMSE-IRC, ML, CRS-IC, Network-Assisted Interference Cancellation and Suppression (NAICS), and Inter-Stream Interference Cancellation (ISIC)) can improve reception performance. As a result, some parameters (e.g., the maximum number of repeated transmissions of MPDCCH and/or PDSCH, and the actual maximum number of repeated transmissions capable of indicating a maximum number of repeated transmissions using the DCI) for use in the CE modes A and B may not be suitable or may have excessively high values as compared to reception performance obtained when the corresponding reception method is supported. In order to address the above-described issues, the maximum number of repeated transmissions can be separately added by the BS or can be reconfigured by the BS.

G.12 Flowchart of the Method Proposed by the Present Disclosure.

Figure 20:
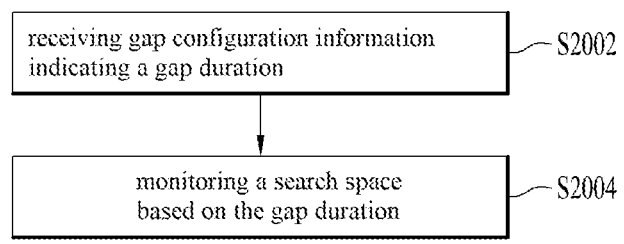
FIG. 20 is a flowchart illustrating a method for enabling the UE to receive a paging signal according to the present disclosure.

FIG. 20 is a flowchart illustrating a method for enabling the UE to receive a paging signal according to the present disclosure. Although the example of FIG. 20 has been disclosed centering upon the method proposed in clause G.1 for convenience of description, one or more methods from among the methods shown in clauses G.2 to G.11 can be combined and applied to the example of FIG. 20 without restriction. As described above, the UE may be referred to as a mobile station (MS), a user terminal (UT), a subscriber station (SS), a mobile terminal (MT), a wireless device, etc. (e.g., see clause A of the present disclosure).

In FIG. 20, the UE may correspond to the non-BL UE, and may refer to the UE in which many more functions are additionally implemented so that the UE operates in the CE mode (e.g., see clause G). In FIG. 20, the UE may be configured to monitor a common search space (CSS) associated with reception of the paging signal in the RRC connected mode. The paging signal may include, for example, information such as ETWS (earthquake and tsunami warning system)/CMAS (commercial mobile alert system), and may be received through the paging channel. The paging channel may be received through the shared channel (e.g., PDSCH) associated with the control channel (e.g., PDCCH scrambled with P-RNTI) that is received/detected through CSS.

In step S2002, the UE may receive gap configuration information indicating a gap period of the search space. As described above, the gap period may refer to a time period in which the UE cannot monitor the first search space while monitoring the second search space (see clause G.1). The first search space may refer to a search space associated with data reception in the connected mode. More specifically, the first search space may refer to a search space (e.g., USS) in which the UE should basically attempt to receive/detect unicast data. The second search space may refer to a specific search space (e.g., USS) in which the UE should basically attempt to receive/detect unicast data in the connected mode, rather than the search space (e.g., USS). More specifically, the second search space may refer to a search space associated with reception of the paging signal. Monitoring may refer to an operation for enabling the UE to attempt to receive/detect the search space (or a specific (control) channel in the search space).

In step S2004, the UE may monitor the search space based on the configured gap period (e.g., see clause G.1). As described in clause G.1, the UE may monitor the second search space in a specific time period on the basis of the configured gap period, and may not monitor the first search space in the specific time period (or the UE may postpone or skip over such monitoring). More specifically, when the first search space and the second search space are configured in different narrowbands (NBs) within a specific time period, the UE may monitor the second search space in the specific time period, and may not monitor the first search space in the specific time period on the basis of the gap period (or the UE may postpone or skip over such monitoring). On the other hand, when the first search space and the second search space are configured in one NB within the specific time period, the UE may monitor both the first search space and the second search space in the specific time period without consideration of the gap period.

In step S2004, when the time period of the second search space overlaps with a PDSCH reception time period, the UE may receive the PDSCH without monitoring the second search space in the overlapped time period (see clause G.1). Alternatively, when the UE operates in a half-duplex frequency division duplex (HD-FDD) mode and the time period of the second search space overlaps with the PUSCH transmission time period, the UE may transmit the PUSCH without monitoring the second search space in the overlapped time period. Alternatively, when the UE operates in HD-FDD and the time period of the second search space overlaps with a PRACH transmission time period, the UE may transmit the PRACH without monitoring the second search space in the overlapped time period. Alternatively, when the UE operates in HD-FDD and the time period of the second search space overlaps with the PUCCH transmission time period, the UE may transmit the PUCCH without monitoring the second search space in the overlapped time period.

The method shown in FIG. 20 is not limited to the above-mentioned explanation, and can be implemented in combination with the methods described in clauses G.1 to G.11. In addition, the method shown in FIG. 20 has been disclosed centering upon the search space, but may be described in the same or similar manner based on the control channel (see explanation associated with clause G.1).

Figure 21:
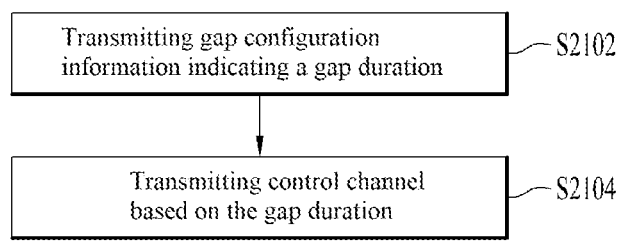
FIG. 21 is a flowchart illustrating a method for enabling the BS to transmit a paging signal according to the present disclosure.

FIG. 21 is a flowchart illustrating a method for enabling the BS to transmit a paging signal according to the present disclosure. The method shown in FIG. 21 is provided to describe operations of the base station (BS). Although the method of FIG. 21 has been disclosed centering upon the method proposed in clause G.1, one or more methods from among the methods shown in clauses G.2 to G.11 can be combined and applied to the example of FIG. 21 without restriction. As described above, the base station (BS) may refer to a wireless device communicating with the UE, and may be referred to by other terms, for example, eNB (evolved Node-B), gNB (general Node-B), BTS (base transceiver system), AP (access point), etc. (e.g., see clause A of the present disclosure).

In the example of FIG. 21, the BS may communicate with the UE such as the non-BL UE. The BS may be configured to transmit a control channel to the UE through a CSS associated with the paging signal in the RRC connected mode. The paging signal may include, for example, information such as ETWS (earthquake and tsunami warning system)/CMAS (commercial mobile alert system), and may be transmitted through the paging channel. The paging signal may be transmitted through a shared channel (e.g., PDSCH) associated with a control channel (e.g., PDCCH scrambled with P-RNTI) that is transmitted through CSS.

In step S2102, the BS may transmit gap configuration information indicating a gap period of the search space. As described above, the gap period may refer to a time period in which the first search space is not monitored while the UE monitors the second search space (see clause G.1). Accordingly, while the BS transmits the second control channel through the second search space on the basis of the gap period, the BS may not transmit a first control channel through the first search space (or the BS may postpone or skip over such transmission). Alternatively, even when the BS transmits the first control channel, the BS may be configured so that the UE does not perform monitoring. The definition of the first search space monitoring and the definition of the second search space monitoring are the same as described above, and thus the entire related description thereof is incorporated herein by reference.

In step S2104, the BS may transmit a control channel through the search space on the basis of the configured gap period (see clause G.1). As described in step S2004 and clause G.1, the UE may monitor the second search space in a specific time period on the basis of the configured gap period, and may not monitor the first search space (or the UE may omit or postpone such monitoring of the first search space). Therefore, in step S2104, the BS may transmit the second control channel through the second search space in a specific time period on the basis of the configured gap period, and may not transmit the first control channel through the first search space (or may postpone or omit such transmission of the first control channel). Alternatively, although the BS transmits the first control channel, the BS may be configured so that the UE does not perform monitoring. More specifically, when the first search space and the second search space are configured in different NBs within the specific time period, the BS may transmit the second control channel through the second search space within the specific time period, may not transmit the first control channel through the first search space within the specific time period on the basis of the gap period (or the BS may postpone or omit such transmission). Alternatively, although the BS transmits the first control channel, the BS may be configured so that the UE does not perform monitoring. On the other hand, when the first search space and the second search space are configured in one NB within the specific time period, the BS may transmit the first search space and the second search space through the first control channel and the second control channel in the specific time period without consideration of the gap period.

In step S2104, when the time period of the second search space overlaps with a PDSCH (physical downlink control channel) transmission time period, the BS may transmit the PDSCH (or may postpone or omit such transmission) without transmitting a second control channel through the second search space in the overlapped time period (see clause G.1). Alternatively, when the BS communicates with the UE operating in HD-FDD and the time period of the second search space overlaps with the PUSCH reception time period, the BS may receive the PUSCH without transmitting the second control channel through the second search space in the overlapped time period. Alternatively, when the BS communicates with the UE operating in HD-FDD and the time period of the second search space overlaps with a PRACH reception time period, the UE may receive (or may postpone or omit transmission) the PRACH without monitoring the second control channel through the second search space in the overlapped time period. Alternatively, when the BS communicates with the UE operating in HD-FDD and the time period of the second search space overlaps with the PUCCH reception time period, the UE may receive (or may postpone or omit such transmission) the PUCCH without transmitting the second control channel through the second search space in the overlapped time period.

The method shown in FIG. 21 is not limited to the above-mentioned explanation, and can be implemented in combination with the methods described in clauses G.1 to G.11.

G13. Communication System and Devices to which the Present Disclosure is Applied Various descriptions, functions, procedures, proposals, methods, and/or operation flowcharts of the present disclosure described herein may be applied to, but not limited to, various fields requiring wireless communication/connection (e.g., 5G) between devices.

The communication system and devices will be described in detail with reference to the drawings. Unless otherwise specified, like reference numerals denote the same or corresponding hardware blocks, software blocks, or functional blocks in the drawings/description.

Figure 22:
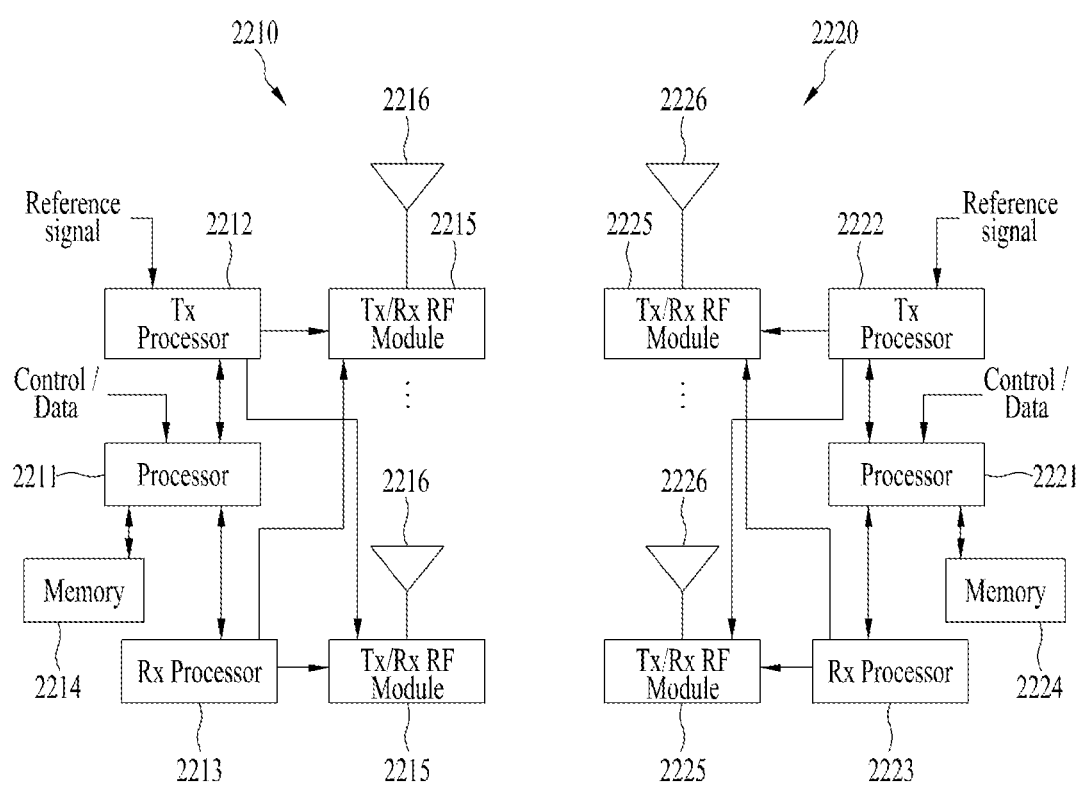
FIG. 22 is a block diagram illustrating a wireless communication device to which proposed methods of the present disclosure are applicable.

FIG. 22 illustrates a block diagram of a wireless communication apparatus to which the methods proposed in the present disclosure are applicable.

Referring to FIG. 22, a wireless communication system includes a BS 2210 and multiple UEs 2220 located within coverage of the BS 2210. The BS 2210 and the UE may be referred to as a transmitter and a receiver, respectively, and vice versa. The BS 2210 includes a processor 2211, a memory 2214, at least one Tx/Rx radio frequency (RF) module (or RF transceiver) 2215, a Tx processor 2212, an Rx processor 2213, and an antenna 2216. The UE 2220 includes a processor 2221, a memory 2224, at least one Tx/Rx RF module (or RF transceiver) 2225, a Tx processor 2222, an Rx processor 2223, and an antenna 2226. The processors are configured to implement the above-described functions, processes and/or methods. Specifically, the processor 2211 provides a higher layer packet from a core network for DL transmission (communication from the BS to the UE). The processor implements the functionality of layer 2 (L2). In DL, the processor provides the UE 2220 with multiplexing between logical and transmission channels and radio resource allocation. That is, the processor is in charge of signaling to the UE. The Tx processor 2212 implements various signal processing functions of layer 1 (L1) (i.e., physical layers). The signal processing functions include facilitating the UE to perform forward error correction (FEC) and performing coding and interleaving. Coded and modulated symbols may be divided into parallel streams. Each stream may be mapped to an OFDM subcarrier, multiplexed with an RS in the time and/or frequency domain, and then combined together using an inverse fast Fourier transform (IFFT) to create a physical channel carrying a time domain OFDMA symbol stream. The OFDM stream is spatially precoded to produce multiple spatial streams. Each spatial stream may be provided to a different antenna 2216 through the Tx/Rx module (or transceiver) 2215. Each Tx/Rx module may modulate an RF carrier with each spatial stream for transmission. At the UE, each Tx/Rx module (or transceiver) 2225 receives a signal through each antenna 2226 thereof. Each Tx/Rx module recovers information modulated on the RF carrier and provides the information to the RX processor 2223. The Rx processor implements various signal processing functions of layer 1. The Rx processor may perform spatial processing on the information to recover any spatial streams toward the UE. If multiple spatial streams are destined for the UE, the multiple spatial streams may be combined by multiple Rx processors into a single OFDMA symbol stream. The RX processor converts the OFDMA symbol stream from the time domain to the frequency domain using a fast Fourier transform (FFT). A frequency-domain signal includes a separate OFDMA symbol stream for each subcarrier of an OFDM signal. The symbols and the reference signal on each subcarrier are recovered and demodulated by determining the most probable signal constellation points transmitted by the BS. Such soft decisions may be based on channel estimation values. The soft decisions are decoded and deinterleaved to recover data and control signals originally transmitted by the BS over the physical channel. The corresponding data and control signals are provided to the processor 2221.

UL transmission (communication from the UE to the BS) is processed by the BS 2210 in a similar way to that described in regard to the receiver functions of the UE 2220. Each Tx/Rx module (or transceiver) 2225 receives a signal through each antenna 2226. Each Tx/Rx module provides an RF carrier and information to the Rx processor 2223. The processor 2221 may be connected to the memory 2224 storing program codes and data. The memory may be referred to as a computer-readable medium.

The present disclosure described above may be carried out by the BS 2210 and the UE 2220 which are wireless communication devices illustrated in FIG. 22.

Figure 23:
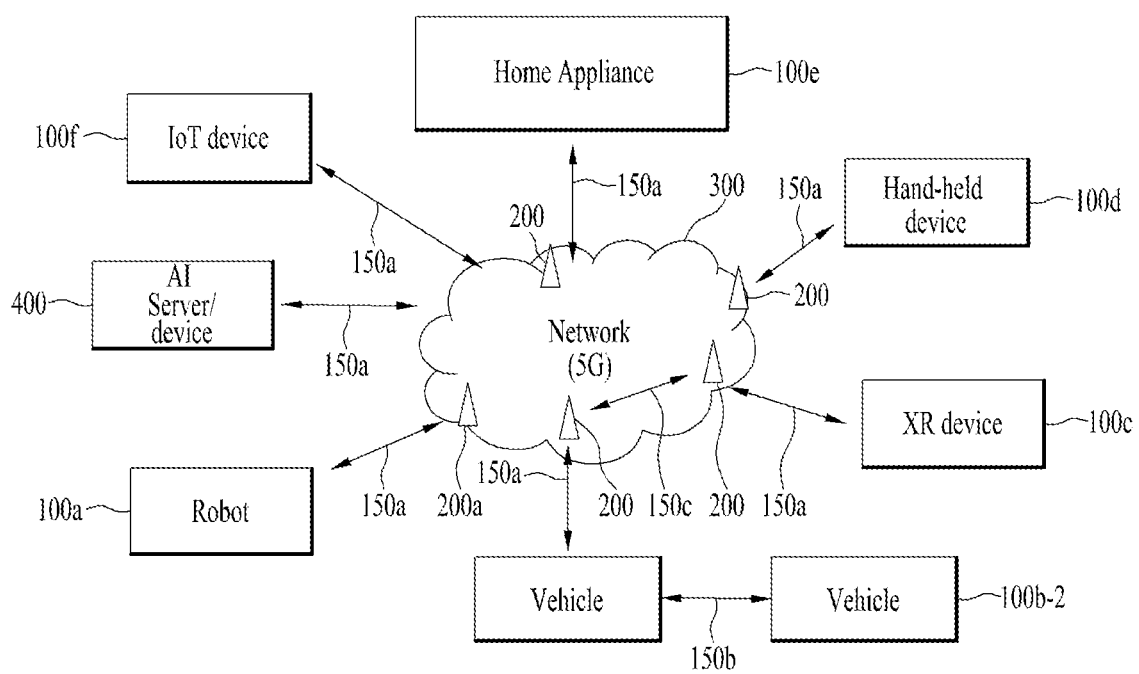
FIGS. 23 to 27 are block diagrams illustrating a system and communication devices to which proposed methods of the present disclosure are applicable.

FIG. 23 illustrates a communication system 1 applied to the present disclosure.

Referring to FIG. 23, the communication system 1 applied to the present disclosure includes wireless devices, BSs, and a network. The wireless devices refer to devices performing communication by radio access technology (RAT) (e.g., 5G New RAT (NR) or LTE), which may also be called communication/radio/5G devices. The wireless devices may include, but no limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle equipped with a wireless communication function, an autonomous driving vehicle, and a vehicle capable of performing vehicle-to-vehicle (V2V) communication. The vehicles may include an unmanned aerial vehicle (UAV) (e.g., a drone). The XR device may include an augmented reality (AR)/virtual reality (VR)/mixed reality (MR) device, and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smart glasses), and a computer (e.g., a laptop). The home appliance may include a TV, a refrigerator, and a washing machine. The IoT device may include a sensor and a smart meter. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured by using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f and the BSs 200, or between the BSs 200. Herein, the wireless communication/connections may be established through various RATs (e.g., 5G NR) such as UL/DL communication 150a, sidelink communication 150b (or, D2D communication), or inter-BS communication 150c (e.g. relay, integrated access backhaul (IAB)). A wireless device and a BS/a wireless devices, and BSs may transmit/receive radio signals to/from each other through the wireless communication/connections 150a, 150b, and 150c. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 24:
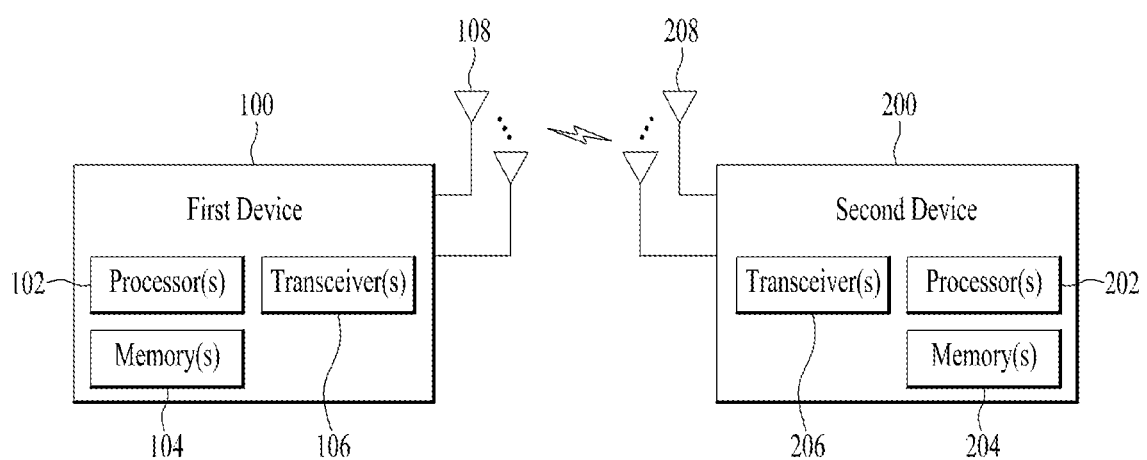

FIG. 24 illustrates wireless devices applicable to the present disclosure.

Referring to FIG. 24, a first wireless device 100 and a second wireless device 200 may transmit radio signals through a variety of RATs (e.g., LTE and NR). Herein, {the first wireless device 100 and the second wireless device 200} may correspond to {the wireless devices 100a to 100f and the BSs 200} and/or {the wireless devices 100a to 100f and the wireless devices 100a to 100f} of FIG. 23.

The first wireless device 100 may include at least one processor 102 and at least one memory 104, and may further include at least one transceiver 106 and/or at least one antenna 108. The processor 102 may control the memory 104 and/or the transceiver 106 and may be configured to implement the descriptions, functions, procedures, proposals, methods, and/or operational flowcharts disclosed in this document. For example, the processor 102 may process information within the memory 104 to generate first information/signal and then transmit a radio signal including the first information/signal through the transceiver 106. The processor 102 may receive a radio signal including second information/signal through the transceiver 106 and then store information obtained by processing the second information/signal in the memory 104. The memory 104 may be coupled to the processor 102 and store various types of information related to operations of the processor 102. For example, the memory 104 may store software code including commands for performing a part or all of processes controlled by the processor 102 or for performing the descriptions, functions, procedures, proposals, methods, and/or operational flowcharts disclosed in this document. Herein, the processor 102 and the memory 104 may be a part of a communication modem/circuit/chip designed to implement an RAT (e.g., LTE or NR). The transceiver 106 may be coupled to the processor 102 and transmit and/or receive radio signals through the at least one antenna 108. The transceiver 106 may include a transmitter and/or a receiver. The transceiver 106 may be interchangeably used with an RF unit. In the present disclosure, a wireless device may refer to a communication modem/circuit/chip.

The second wireless device 200 may include at least one processor 202 and at least one memory 204, and may further include at least one transceiver 206 and/or at least one antenna 208. The processor 202 may control the memory 204 and/or the transceiver 206 and may be configured to implement the descriptions, functions, procedures, proposals, methods, and/or operational flowcharts disclosed in this document. For example, the processor 202 may process information within the memory 204 to generate third information/signal and then transmit a radio signal including the third information/signal through the transceiver 206. The processor 202 may receive a radio signal including fourth information/signal through the transceiver 206 and then store information obtained by processing the fourth information/signal in the memory 204. The memory 204 may be coupled to the processor 202 and store various types of information related to operations of the processor 202. For example, the memory 204 may store software code including commands for performing a part or all of processes controlled by the processor 202 or for performing the descriptions, functions, procedures, proposals, methods, and/or operational flowcharts disclosed in this document. Herein, the processor 202 and the memory 204 may be a part of a communication modem/circuit/chip designed to implement an RAT (e.g., LTE or NR). The transceiver 206 may be coupled to the processor 202 and transmit and/or receive radio signals through the at least one antenna 208. The transceiver 206 may include a transmitter and/or a receiver. The transceiver 206 may be interchangeably used with an RF unit. In the present disclosure, a wireless device may refer to a communication modem/circuit/chip.

Hereinafter, hardware elements of the wireless devices 100 and 200 will be described in greater detail. One or more protocol layers may be implemented by, but not limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more protocol data units (PDUs) and/or one or more service data units (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented in hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented in firmware or software, which may be configured to include modules, procedures, or functions. Firmware or software configured to perform the descriptions, functions, procedures, proposals, methods, and/or operational flowcharts disclosed in this document may be included in the one or more processors 102 and 202, or may be stored in the one or more memories 104 and 204 and executed by the one or more processors 102 and 202. The descriptions, functions, procedures, proposals, methods, and/or operational flowcharts disclosed in this document may be implemented as code, instructions, and/or a set of instructions in firmware or software.

The one or more memories 104 and 204 may be coupled to the one or more processors 102 and 202 and store various types of data, signals, messages, information, programs, code, instructions, and/or commands. The one or more memories 104 and 204 may be configured as read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be coupled to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be coupled to the one or more processors 102 and 202 and transmit and receive radio signals. For example, the one or more processors 102 and 202 may control the one or more transceivers 106 and 206 to transmit user data, control information, or radio signals to one or more other devices. The one or more processors 102 and 202 may control the one or more transceivers 106 and 206 to receive user data, control information, or radio signals from one or more other devices. The one or more transceivers 106 and 206 may be coupled to the one or more antennas 108 and 208 and configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 25:
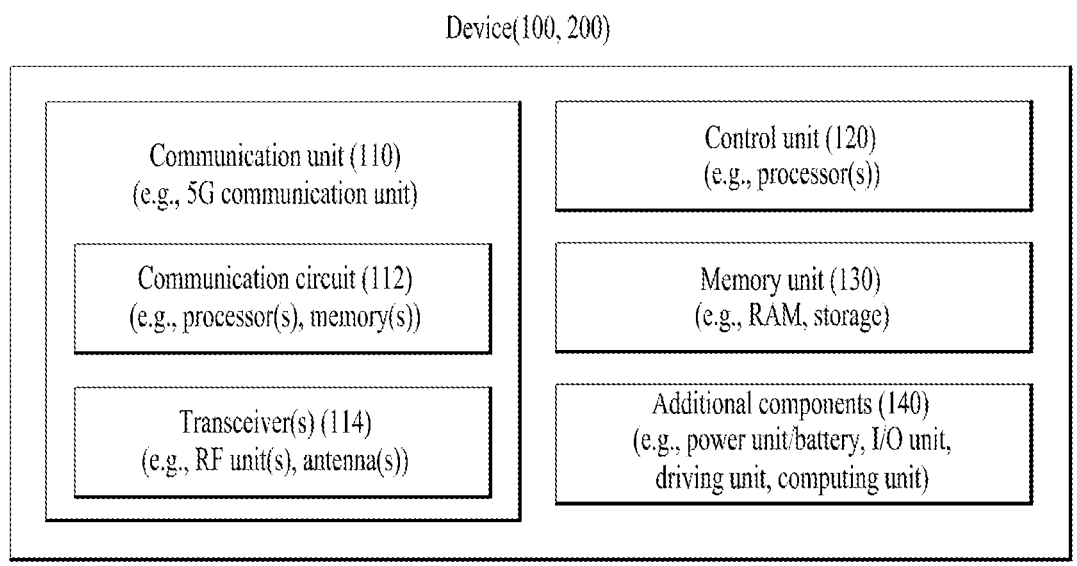

FIG. 25 illustrates another example of wireless devices applied to the present disclosure. The wireless devices may be implemented in various forms according to use-cases/services (refer to FIG. 23).

Referring to FIG. 25, wireless devices 100 and 200 may correspond to the wireless devices 100 and 200 of FIG. 24 and may be configured as various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 24. For example, the transceiver(s) 114 may include the one or more transceivers 106 and 206 and/or the one or more antennas 108 and 208 of FIG. 15. The control unit 120 is electrically coupled to the communication unit 110, the memory unit 130, and the additional components 140 and provides overall control to operations of the wireless devices. For example, the control unit 120 may control an electric/mechanical operation of the wireless device based on programs/code/commands/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to the types of wireless devices. For example, the additional components 140 may include at least one of a power unit/battery, an input/output (I/O) unit, a driver, and a computing unit. The wireless device may be configured as, but not limited to, the robot (100*a* of FIG. 23), the vehicles (100*b*-1 and 100*b*-2 of FIG. 23), the XR device (100*c* of FIG. 23), the hand-held device (100*d* of FIG. 23), the home appliance (100*e* of FIG. 23), the IoT device (100*f* of FIG. 23), a digital broadcasting terminal, a hologram device, a public safety device, an MTC device, a medicine device, a FinTech device (or a finance device), a security device, a climate/environment device, the AI server/device (400 of FIG. 23), the BSs (200 of FIG. 23), a network node, etc. The wireless device may be mobile or fixed according to a use-case/service.

In FIG. 25, all of the various elements, components, units/portions, and/or modules in the wireless devices 100 and 200 may be coupled to each other through a wired interface or at least a part thereof may be wirelessly coupled to each other through the communication unit 110. For example, in each of the wireless devices 100 and 200, the control unit 120 and the communication unit 110 may be coupled wiredly, and the control unit 120 and first units (e.g., 130 and 140) may be wirelessly coupled through the communication unit 110. Each element, component, unit/portion, and/or module within the wireless devices 100 and 200 may further include one or more elements. For example, the control unit 120 may be configured as a set of one or more processors. For example, the control unit 120 may be configured as a set of a communication control processor, an application processor, an electronic control unit (ECU), a graphical processing unit, and a memory control processor. In another example, the memory unit 130 may be configured as a random access memory (RAM), a dynamic RAM (DRAM), a read only memory (ROM), a flash memory, a volatile memory, a non-volatile memory, and/or a combination thereof.

An implementation example of FIG. 25 will be described in detail with reference to the drawings.

Figure 26:
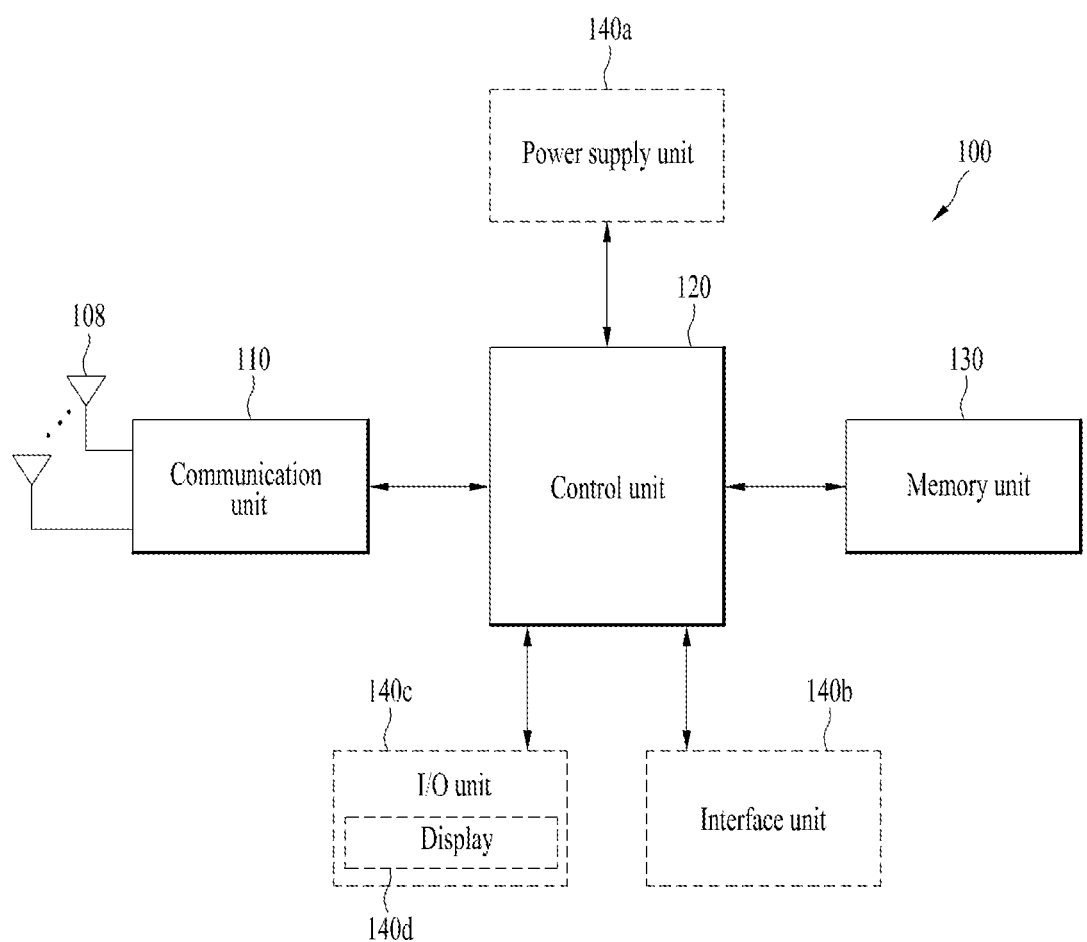

FIG. 26 illustrates a portable device applied to the present disclosure. The portable device may include a smartphone, a smartpad, a wearable device (e.g., a smart watch and smart glasses), and a portable computer (e.g., a laptop). The portable device may be referred to as a mobile station (MS), a user terminal (UT), a mobile subscriber station (MSS), a subscriber station (SS), an advanced mobile station (AMS), or a wireless terminal (WT).

Referring to FIG. 26, a portable device 100 may include an antenna unit 108, a communication unit 110, a control unit 120, a power supply unit 140*a*, an interface unit 140*b*, and an I/O unit 140*c*. The antenna unit 108 may be configured as a part of the communication unit 110. The blocks 110 to 130/140*a* to 140*c* correspond to the blocks 110 to 130/140 of FIG. 25, respectively.

The communication unit 110 may transmit and receive signals (e.g., data and control signals) to and from another wireless device and a BS. The control unit 120 may perform various operations by controlling elements of the portable device 100. The control unit 120 may include an application processor (AP). The memory unit 130 may store data/parameters/programs/code/commands required for operation of the portable device 100. Further, the memory unit 130 may store input/output data/information. The power supply unit 140*a* may supply power to the portable device 100, and include a wired/wireless charging circuit and a battery. The interface unit 140*b* may include various ports (e.g., an audio I/O port and a video I/O port) for connectivity to external devices The I/O unit 140*c* may acquire information/signals (e.g., touch, text, voice, images, and video) input by a user, and store the acquired information/signals in the memory unit 130. The communication unit 110 may receive or output video information/signal, audio information/signal, data, and/or information input by the user. The I/O unit 140*c* may include a camera, a microphone, a user input unit, a display 140*d*, a speaker, and/or a haptic module.

For example, for data communication, the I/O unit 140*c* may acquire information/signals (e.g., touch, text, voice, images, and video) received from the user and store the acquired information/signal sin the memory unit 130. The communication unit 110 may convert the information/signals to radio signals and transmit the radio signals directly to another device or to a BS. Further, the communication unit 110 may receive a radio signal from another device or a BS and then restore the received radio signal to original information/signal. The restored information/signal may be stored in the memory unit 130 and output in various forms (e.g., text, voice, an image, video, and a haptic effect) through the I/O unit 140*c*.

Figure 27:
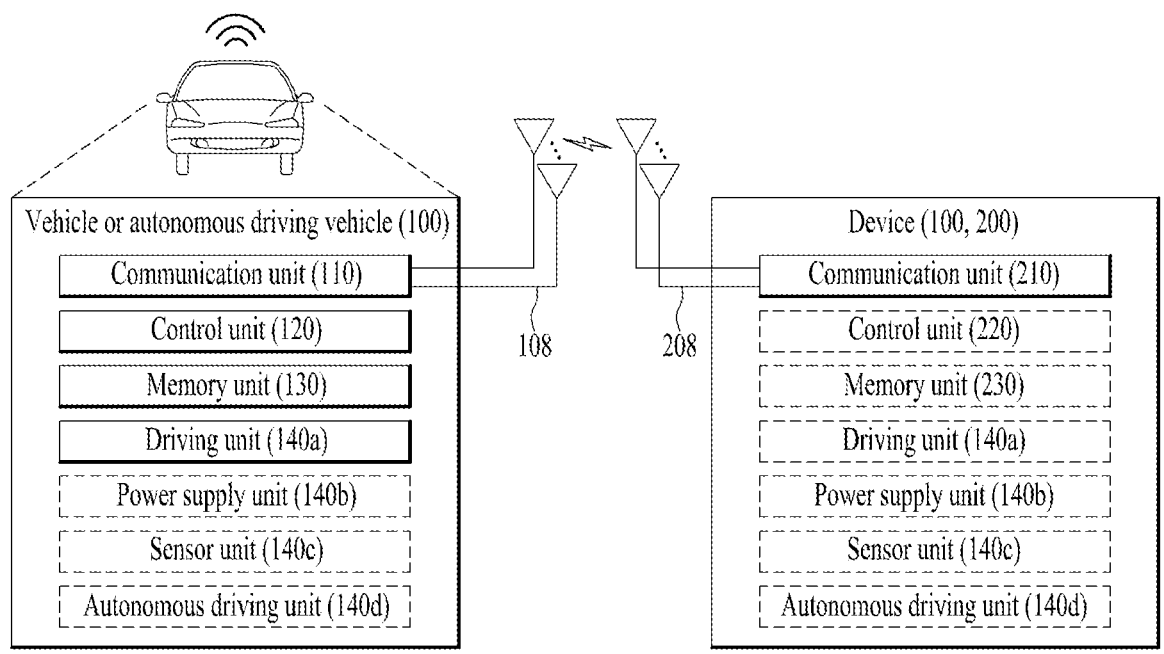

FIG. 27 illustrates a vehicle or an autonomous driving vehicle applied to the present disclosure. The vehicle or autonomous driving vehicle may be configured as a mobile robot, a car, a train, a manned/unmanned aerial vehicle (AV), a ship, or the like.

Referring to FIG. 27, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 25, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140*a* may enable the vehicle or the autonomous driving vehicle 100 to travel on a road. The driving unit 140*a* may include an engine, a motor, a powertrain, a wheel, a brake, a steering device, and so on. The power supply unit 140*b* may supply power to the vehicle or the autonomous driving vehicle 100 and include a wired/wireless charging circuit, a battery, and so on. The sensor unit 140*c* may acquire vehicle state information, ambient environment information, user information, and so on. The sensor unit 140*c* may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140*d* may implement a technology for maintaining a lane on which a vehicle is driving, a technology for automatically adjusting speed, such as adaptive cruise control, a technology for autonomously traveling along a determined path, a technology for traveling by automatically setting a path, when a destination is set, and the like.

For example, the communication unit 110 may receive map data, traffic information data, and so on from an external server. The autonomous driving unit 140*d* may generate an autonomous driving path and a driving plan from the obtained data. The control unit 120 may control the driving unit 140*a* such that the vehicle or autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain vehicle state information and/or ambient environment information. The autonomous driving unit 140*d* may update the autonomous driving path and the driving plan based on the newly obtained data/information. The communication unit 110 may transmit information about a vehicle position, the autonomous driving path, and/or the driving plan to the external server. The external server may predict traffic information data using AI technology or the like, based on the information collected from vehicles or autonomous driving vehicles and provide the predicted traffic information data to the vehicles or the autonomous driving vehicles.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to wireless communication devices such as a user equipment (UE) and a BS (BS) operating in various wireless communication systems including 3GPP LTE/LTE-A/5G (or New RAT (NR)).

The invention claimed is:

1. A method for receiving a paging signal by a user equipment (UE) in a radio resource control (RRC) connected mode comprising:
    receiving gap configuration information indicating a gap period of a search space;
    when a first search space associated with a data signal and a second search space associated with the paging signal are configured in different narrowbands (NBs) in a specific time period, monitoring the second search space in the specific time period without monitoring the first search space in the specific time period based on the gap period; and
    when the first search space and the second search space are configured in one NB in the specific time period, monitoring the first search space and the second search space in the specific time period without consideration of the gap period.

2. The method according to claim 1, wherein:
    when the first search space and the second search space are configured in different NBs in the specific time period, the first search space is postponed to a time period in which the second search space is not configured based on the gap period.

3. The method according to claim 1, wherein:
    when a time period of the second search space overlaps with a time period of physical downlink control channel (PDSCH) reception, the second search space is not monitored in the overlapped time period.

4. The method according to claim 1, wherein:
    when the UE operates in a half-duplex frequency division duplex (HD-FDD) and a time period of the second search space overlaps with a time period of physical uplink shared channel (PUSCH) transmission, the second search space is not monitored in the overlapped time period.

5. The method according to claim 1, wherein:
    when the UE operates in a half-duplex frequency division duplex (HD-FDD) and a time period of the second search space overlaps with a time period of physical random access channel (PRACH) transmission, the second search space is not monitored in the overlapped time period.

6. The method according to claim 1, wherein:
    when the UE operates in a half-duplex frequency division duplex (HD-FDD) and a time period of the second search space overlaps with a time period of physical uplink control channel (PUCCH) transmission, the second search space is not monitored in the overlapped time period.

7. The method according to claim 1, wherein:
    the first search space is a UE-specific search space (USS), and the second search space is a common search space (CSS).

8. The method according to claim 1, wherein:
    the paging signal includes earthquake and tsunami warning system (ETWS) information or commercial mobile alert system (CMAS) information.

9. The method according to claim 1, wherein:
    the UE is configured to operate in a coverage extension (CE) mode.

10. The method according to claim 1, wherein:
    the UE includes at least two reception antennas, and supports a maximum of 20 MHz bandwidth within one component carrier.

11. A user equipment (UE) configured to receive a paging signal in a wireless communication system comprising:
- a radio frequency (RF) transceiver; and
- a processor operatively connected to the RF transceiver, wherein the processor controls the RF transceiver to implement operations including:
    - receiving gap configuration information indicating a gap period of a search space by controlling the RF transceiver;
    - when a first search space associated with a data signal and a second search space associated with the paging signal are configured in different narrowbands (NBs) in a specific time period, monitoring the second search space in the specific time period without monitoring the first search space in the specific time period based on the gap period; and
    - when the first search space and the second search space are configured in one NB in the specific time period, monitoring the first search space and the second search space in the specific time period without consideration of the gap period.

12. An apparatus for a user equipment (UE) in a wireless communication system comprising:
- a memory including executable code; and
- a processor operatively connected to the memory, wherein the processor is configured to perform specific operations by executing the executable code, the specific operations including:
    - receiving gap configuration information indicating a gap period of a search space;
    - when a first search space associated with a data signal and a second search space associated with the paging signal are configured in different narrowbands (NBs) in a specific time period, monitoring the second search space in the specific time period without monitoring the first search space in the specific time period based on the gap period; and
    - when the first search space and the second search space are configured in one NB in the specific time period, monitoring the first search space and the second search space in the specific time period without consideration of the gap period.

* * * * *